(12) United States Patent
Kacker et al.

(10) Patent No.: US 7,037,989 B2
(45) Date of Patent: May 2, 2006

(54) COPOLYMERS OF ETHYLENE AND/OR α-OLEFINS AND VICINALLY DISUBSTITUTED OLEFINS

(75) Inventors: Smita Kacker, Houston, TX (US);
Enock Berluche, Phillipsburg, NJ (US);
Timothy Daniel Shaffer, Hackettstown, NJ (US); Jo Ann Marie Canich, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 111 days.

(21) Appl. No.: 10/446,325

(22) Filed: May 27, 2003

(65) Prior Publication Data
US 2004/0242814 A1 Dec. 2, 2004

(51) Int. Cl.
*C08F 4/52* (2006.01)

(52) U.S. Cl. ............... 526/161; 526/160; 526/172; 526/170; 526/348.6; 526/348.2; 526/348

(58) Field of Classification Search ........ 526/161, 526/160, 172, 348.6, 348.2, 348
See application file for complete search history.

(56) References Cited

U.S. PATENT DOCUMENTS

| | | | | |
|---|---|---|---|---|
| 2,956,989 A | 10/1960 | Jezl | .......... | 260/88.2 |
| 3,013,002 A | 12/1961 | Breslow et al. | .......... | 260/88.2 |
| 3,058,963 A | 10/1962 | Vandenberg | .......... | 260/88.2 |

(Continued)

FOREIGN PATENT DOCUMENTS

| | | |
|---|---|---|
| CA | 729279 | 3/1966 |
| EP | 0099646 | 2/1984 |
| EP | 0520732 | 12/1992 |
| EP | 0561476 | 9/1993 |
| GB | 497643 | 12/1938 |
| GB | 932658 | 7/1963 |
| GB | 967788 | 8/1964 |
| WO | WO 92/00333 | 1/1992 |
| WO | WO 94/03506 | 2/1994 |
| WO | WO 94/07927 | 4/1994 |
| WO | WO 95/29940 | 11/1995 |

OTHER PUBLICATIONS

"Copolymerization of 2-butene and ethylene with catalysts based on titanium and zirconium complexes", Macromol. Rapid Commun., 21, 385-389 (2000), C. H. Ahn, M. Tahara, T. Uozumi, J. Jin, S. Tsubaki, T. Sano, K. Soga.
"Isotactic Polymerization of Olefins with Homogeneous Zirconium Catalysts," W. Kaminsky, et al, Transition Metals and Organometallics as Catalysts for Olefin Polymerization, W. Kaminsky, H.J. Sinn Eds., Springer Verlag, Berlin, 1988 p. 291-301.
Abstract for FR 94.183.
Abstract for DE 3444111.
"Carbocationic Polymerization of Olefins: A Critical Inventory," p. 53 et seq. J. Wiley & Sons 1975.
"Insertion Polymerization," Encycl. Of Polm. Sci. and Eng., vol. 8, p. 175 Wiley Interscience 1987.
"Isomerization Polymerization of 3-Methyl-1-butene and 4-Methyl-1-pentene," Advances in Polymer Science, Kennedy and Johnson, pp. 58-95 (1975).
"Patent Abstracts of Japan" vol. 6, No. 63 (C-099), Apr. 22, 1982 and JP 57 003804 (Mitsui Petrochemical Industries, Ltd.), Jan. 9, 1982.
"Chemical Abstracts," vol. 105, No. 2, Jul. 14, 1986, Columbus, Ohio, US; abstract No. 7001, Zhang, Y, et al.: Tetrafluorethylene and ethylene terpolymers XP002039969 see abstract & CN 8 510 056 A (Shanghai Institute of Organic Chemistry) Oct. 9, 1985.
"Modified Methylaluminoxane", Type 4 (MMAO-4) Toluene Solution, AKZO Chemicals, Inc.
"Modified Methylaluminoxane", Type 3A (MMAO-3A) Heptane Solution, AKZO Chemicals, Inc.
Natta et al., "Ethylene-Butene-2 Alternating Crystalline Copolymers", J. Am. Chem. Soc., Aug. 5, 1961, pp. 3343-3344, vol. 83.
Cavallo et al., "E-Z Selectivity and Growing-Chain Isomerization Reactions in 2-Butene/Ethene Copolymerization by Group 4 Metallocenes", Polymer Preprints, 2000, 41(1), 395., Mar. 2000.
Longo et al., "Reactivity of Z and E Isomers, Growing Chain Isomerization, and Chain Transfer Reactions of Ethylene/ 2-Butene Copolymerization by Metallocene-Based Catalysts", Macromolecules 2000, 33, 4647-4659.
Leatherman et al., "Ni(II)-Catalyzed Polymerization of trans-2-Butene", Macromolecules 2001, 34, 2748-2750.
Krentsel et al., "Monomer-Isomerization Polymerization Reactions", Polymers and Copolymers of Higher α-Olefins, New York, pp. 22-32.

*Primary Examiner*—David W. Wu
*Assistant Examiner*—Rip A. Lee
(74) *Attorney, Agent, or Firm*—D. W. Miller

(57) ABSTRACT

Substantially random ethylene and/or α-olefin copolymers containing units derived from vicinally disubstituted olefin monomers are described. The vicinally disubstituted olefin monomers may be represented by the generic formula $(R^1)CH=CH(R^2)$, where $R^1$ and $R^2$ independently comprise hydrocarbyl or silyl-hydrocarbyl groups containing 1 or more carbon atoms, or may be linear, branched or cyclic substituted or unsubstituted hydrocarbyl groups having from 1–100 carbon atoms, or they may contain 30 or less carbon atoms. The copolymers may be prepared by coordination polymerization by means of contacting at least one vicinally disubstituted olefin monomer and ethylene and/or α-olefin, optionally with one or more other coordination polymerizable monomers, with a catalyst system comprising a monocyclopentadienyl heteroatom-containing Group 4 transition metal catalyst component.

22 Claims, No Drawings

U.S. PATENT DOCUMENTS

| | | | |
|---|---|---|---|
| 3,250,755 A | 5/1966 | Natta et al. | 260/88.2 |
| 3,481,908 A | 12/1969 | Mortimer | 260/80.73 |
| 3,645,992 A | 2/1972 | Elston | 260/80.78 |
| 3,678,023 A | 7/1972 | Frese | 260/93.7 |
| 3,981,849 A | 9/1976 | Frese et al. | 526/82 |
| 4,011,384 A | 3/1977 | Baxmann et al. | 526/158 |
| 4,187,362 A | 2/1980 | Hepworth et al. | 526/73 |
| 4,218,551 A | 8/1980 | Frese | 526/158 |
| 4,294,947 A | 10/1981 | Doerk et al. | 526/119 |
| 4,883,853 A | 11/1989 | Hobes et al. | 526/329 |
| 5,026,798 A * | 6/1991 | Canich | 526/127 |
| 5,041,584 A | 8/1991 | Crapo et al. | 556/179 |
| 5,055,438 A | 10/1991 | Canich | 502/117 |
| 5,057,475 A | 10/1991 | Canich et al. | 502/104 |
| 5,096,867 A * | 3/1992 | Canich | 502/103 |
| 5,264,405 A | 11/1993 | Canich | 502/103 |
| 5,304,615 A | 4/1994 | Ambler et al. | 526/189 |
| 5,318,935 A | 6/1994 | Canich et al. | 502/117 |
| 5,374,696 A | 12/1994 | Rosen et al. | 526/126 |
| 5,414,040 A | 5/1995 | McKay et al. | 524/576 |
| 5,420,217 A * | 5/1995 | Canich | 526/127 |
| 5,444,145 A | 8/1995 | Brant et al. | 526/348.3 |
| 5,448,001 A | 9/1995 | Baird | 526/134 |
| 5,475,060 A * | 12/1995 | Brekner et al. | 525/289 |
| 5,475,075 A | 12/1995 | Brant et al. | 526/348.3 |
| 5,602,219 A * | 2/1997 | Aulbach et al. | 526/160 |
| 5,621,126 A | 4/1997 | Canich et al. | 556/9 |
| 5,631,391 A | 5/1997 | Canich | 556/11 |
| 5,635,573 A * | 6/1997 | Harrington et al. | 526/170 |
| 5,721,185 A * | 2/1998 | LaPointe et al. | 502/117 |
| 5,763,556 A | 6/1998 | Shaffer et al. | 526/348.4 |
| 5,866,665 A * | 2/1999 | Shaffer et al. | 526/348.4 |
| 5,869,586 A * | 2/1999 | Riedel et al. | 526/170 |
| 5,955,625 A | 9/1999 | Canich | 556/7 |
| 6,022,929 A | 2/2000 | Chen et al. | 525/333.7 |
| 6,100,354 A | 8/2000 | Shaffer et al. | 526/161 |
| 6,316,560 B1 * | 11/2001 | Jacobs et al. | 526/160 |

\* cited by examiner

COPOLYMERS OF ETHYLENE AND/OR α-OLEFINS AND VICINALLY DISUBSTITUTED OLEFINS

FIELD

Embodiments of the present invention relate to ethylene and/or alpha-olefin copolymers comprising at least one vicinally disubstituted olefin monomer and a polymerization process for preparing the copolymers. Other such embodiments are directed to a process for copolymerizing ethylene and/or alpha-olefins and at least one vicinally disubstituted olefin monomer, in the presence of at least one monocyclopentadienyl metallocene catalyst component, and the copolymers resultant there from.

BACKGROUND

Vicinally disubstituted olefin monomers are abundant products and/or by-products of petrochemical processes. However, their current commercial use has generally been limited to isomerization or polymers using the isomers. Commercial manufacture of high polymers (generally those above 10,000 in number average molecular weight) comprising ethylene and/or one or more α-olefins and one or more vicinally disubstituted olefins has, heretofore, not been known.

Insertion, or coordination polymerization is a known chemical reaction sequence for preparing polymers and copolymers of ethylene, α-olefins, non-conjugated diolefins and/or strained ring cyclic olefins. Traditional Ziegler monomers, e.g., ethylene and α-olefins, such as propylene, 1-butene, 1-hexene, and 1-octene, are readily polymerized in the presence of Group 4 transition metals having as ligands one η-5 bound cyclopentadienyl ligand and three α-bound monoanionic ligands, alternatively where one of the monoanionic ligands comprises a heteroatom that may be covalently bound both to the Group 4 metal center and, through a bridging group, to a ring carbon atom of the cyclopentadienyl ligand group.

In view of the above, additional means of manufacturing polyolefins, particularly a means of incorporating vicinally disubstituted olefins in such polyolefins may be desirable. Copolymer compositions comprising ethylene and/or α-olefins and at least one vicinally disubstituted olefin, optionally with other polymerizable olefinically-unsaturated monomers, may provide new compositions useful in many applications.

SUMMARY

Embodiments of this invention comprise substantially random ethylene and/or α-olefin copolymers derived from ethylene and/or α-olefins and at least one vicinally disubstituted olefin monomer. In other embodiments, a process for the preparation of the copolymers is contemplated, comprising contacting at least one vicinally disubstituted olefin monomer and ethylene and/or α-olefins, optionally with one or more other coordination polymerizable monomers, with a catalyst system comprising at least one monocyclopentadienyl heteroatom ligand-containing Group 4 transition metal catalyst component.

Also contemplated as an embodiment, a process for the preparation of substantially random ethylene copolymers derived from ethylene and at least one vicinally disubstituted olefin monomer, comprising contacting the at least one vicinally disubstituted olefin monomer and ethylene, optionally further comprising one or more additional coordination polymerizable monomers, in the substantial absence of geminally disubstituted olefins, with a catalyst system comprising a monocyclopentadienyl heteroatom-containing Group 4 transition metal catalyst component.

Still further contemplated is a process for polymerizing olefins, comprising:
contacting at least one vicinally disubstituted olefin monomer represented by the general formula:

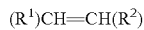

where $R^1$ and $R^2$ comprise 30 or less carbon or silicon atoms or combinations thereof, with the proviso that, $R^1$ and $R^2$ independently comprise hydrocarbyl or silyl-hydrocarbyl moieties;

and ethylene, in the presence of a precatalyst (alternatively referred to herein as a catalyst compound, a catalyst or a catalyst component, which together with an activator comprise a catalyst system) represented by the general formula:

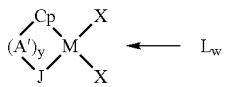

wherein:
M comprises Zr, Hf or Ti;
Cp comprises a cyclopentadienyl ring which may be substituted with from zero to five substituted groups R, when y is zero, and from one to four substituted groups R, when y is one; and each substituted group R comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals wherein one or more hydrogen atoms may be replaced by one or more of a halogen radical, an amido radical, a phosphido radical, an alkoxy radical, an aryloxy radical or any radical containing a Lewis acidic or basic fiunctionality; $C_1$ to $C_{30}$ hydrocarbyl-substituted metalloid radicals wherein the metalloid is selected from one of Group 14 of the Periodic Table of Elements; halogen radicals; amido radicals; phosphido radicals; alkoxy radicals; or alkylborido radicals; or, Cp is a cyclopentadienyl ring in which at least two adjacent R-groups may be joined together and along with the carbon atoms to which they may be attached, form a $C_4$ to $C_{20}$ ring system which may be saturated, partially unsaturated or aromatic, and/or substituted or unsubstituted, the substitutions being selected as one or more R group as defined above;

J comprises a Group 15 or 16 heteroatom which may be substituted with one R' group when J is a group 15 element, and y is one, or a group 16 element and y is zero, or with two R' groups when J is a group 15 element and y is zero, or is unsubstituted when J is a Group 16 element and y is one; and each substituent group R' is, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals wherein one or more hydrogen atoms is replaced by one or more of halogen radicals, amido radicals, phosphido radicals, alkoxy radicals, aryloxy radicals; or alkylborido radicals, with the proviso that all R's are bonded to J through a 1°, 2°, or aromatic carbon atom, and are not directly bonded to a silicon or germanium atom;

each X comprises independently a monoanionic ligand selected from one of hydride; substituted or unsubstituted $C_1$ to $C_{30}$ hydrocarbyl; alkoxide; aryloxide; amide; halide or phosphide; Group 14 organometalloids; or both X's together may form an alkylidene or a cyclometallated hydrocarbyl or other dianionic ligand;

y is 0 or 1; and when y=1, A' is a bridging group covalently bonded to both Cp and J, typically comprising at least one Group 13, 14 or 15 element such as carbon, silicon, boron, germanium, nitrogen or phosphorous with additional substituents R as defined above, so as to complete the valency of the Group 13, 14 or 15 element(s);

L is a neutral Lewis base other than water, such as an olefin, diolefin, aryne, amine, phosphine, ether or sulfide, e.g., diethylether, tetrahydrofuran, dimethylaniline, aniline, trimethylphosphine, n-butylamine; and w is a number from 0 to 3; and wherein the precatalyst is activated with an activator.

Further contemplated is a process for the preparation of substantially random α-olefin copolymers derived from an α-olefin and at least one vicinally disubstituted olefin monomer, comprising contacting the at least one vicinally disubstituted olefin monomer, the α-olefin, and optionally one or more additional coordination polymerizable monomers, with a catalyst system comprising a monocyclopentadienyl heteroatom-containing Group 4 transition metal precatalyst, and wherein said α-olefin is one or more of propylene, 1-butene, 4-methyl-1-pentene, 1-hexene, or 1-octene.

Also contemplated is a polymer comprising, ethylene and/or α-olefin derived units in the range of ≧1 or ≦95 weight percent, and at least one vicinally disubstituted olefin units in the range of ≧5 or ≦99 weight percent, based on the total weight of the polymer, the polymer produced by a process comprising:

contacting the at least one vicinally disubstituted olefin monomer represented by the general formula:

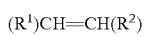

where $R^1$ and $R^2$ may comprise 30 or less carbon or silicon atoms or combinations thereof, with the proviso that, $R^1$ and $R^2$ independently comprise hydrocarbyl or silyl-hydrocarbyl moieties; and the ethylene and/or α-olefin, in the presence of a precatalyst represented by the general formula:

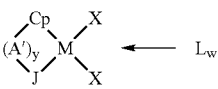

wherein:

M comprises Zr, Hf or Ti;

Cp comprises a cyclopentadienyl ring which may be substituted with from zero to five substituted groups R, when y is zero, and from one to four substituted groups R, when y is one; and each substituted group R comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals, wherein one or more hydrogen atoms may be replaced by one or more of a halogen radical, an amido radical, a phosphido radical, an alkoxy radical, an aryloxy radical or any radical containing a Lewis acidic or basic fulnctionality; $C_1$ to $C_{30}$ hydrocarbyl-substituted metalloid radicals, wherein the metalloid is selected from the one of Group 14 of the Periodic Table of Elements; halogen radicals; amido radicals; phosphido radicals; alkoxy radicals; or alkylborido radicals; or, Cp is a cyclopentadienyl ring in which at least two adjacent R-groups may be joined together and along with the carbon atoms to which they may be attached form a $C_4$ to $C_{20}$ ring system which may be saturated, partially unsaturated or aromatic, and/or substituted or unsubstituted, the substitutions being selected as one or more R group as defined above;

J comprises a Group 15 or 16 heteroatom which may be substituted with one R' group when J is a group 15 element, and y is one, or a group 16 element and y is zero, or with two R' groups when J is a group 15 element and y is zero, or is unsubstituted when J is Group 16 element and y is one; and each substituent group R' is, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals, wherein one or more hydrogen atoms is replaced by one or more of halogen radicals, amido radicals, phosphido radicals, alkoxy radicals, aryloxy radicals, or alkylborido radicals, with the proviso that all R's are bonded to J through a 1°, 2°, or aromatic carbon atom, and are not directly bonded to a silicon or germanium atom;

each X comprises independently a monoanionic ligand selected from one of hydride; substituted or unsubstituted $C_1$ to $C_{30}$ hydrocarbyl; alkoxide; aryloxide; amide; halide or phosphide; Group 14 organometalloids; or both X's together may form an alkylidene or a cyclometallated hydrocarbyl or other dianionic ligand;

y is 0 or 1; and when y=1, A' is a bridging group covalently bonded to both Cp and J, typically comprising at least one Group 13, 14 or 15 element such as carbon, silicon, boron, germanium, nitrogen or phosphorous with additional substituents R as defined above so as to complete the valency of the Group 13, 14 or 15 element(s);

L is a neutral Lewis base other than water, such as an olefin, diolefin, aryne, amine, phosphine, ether or sulfide, e.g., diethylether, tetrahydrofuran, dimethylaniline, aniline, trimethylphosphine, n-butylamine; and w is a number from 0 to 3;

wherein the precatalyst is activated with an activator;

wherein the polymer is substantially free of geminally disubstituted olefins.

Also contemplated is a polymer comprising, propylene and/or 1-butene derived units in the range of ≧1 or ≦95 weight percent, and at least one vicinally disubstituted olefin units in the range of ≧5 or ≦99 weight percent, based on the total weight of the polymer.

Further contemplated is an ethylene, vicinally disubstituted olefin copolymer, comprising ethylene derived units in the range of ≧1 or ≦95 weight percent, and at least one vicinally disubstituted olefin units in the range of ≧5 or ≦99 weight percent, the weight percents based on the total weight of said polymer, wherein said polymer comprises >80% tri-substituted chain end unsaturation.

DESCRIPTION

The term "substantially random" when used to describe the copolymers of embodiments of this invention, means that the copolymer comprises (A) sequences of an alternating comonomer structure comprising ethylene and/or α-olefins and at least one vicinally disubstituted olefin monomer randomly interrupted by (B) ethylene (and/or other α-olefin sequences), with the feature that the copolymer is substantially free from consecutive sequences of the vicinally disubstituted monomer. By substantially free we intend the limits below for —(E)$_b$— where the determination is accomplished by NMR. The copolymer may be represented as a copolymer comprising randomly incorporated —E—V)$_a$— and —(E)$_b$— sequences where E represents a (—CH$_2$—CH$_2$—) unit derived from ethylene and/or similar units of other α-olefins (for example propylene, 1-butene, 4-methyl-1-pentene, 1-hexene, or 1-octene), and V represents a (R$^1$)CH=CH(R$^2$) unit derived from a vicinally disubstituted monomer, R$^1$ and R$^2$ independently comprising hydrocarbyl or silyl-hydrocarbyl radicals as further defined below. The values of a and b are the respective mole fractions of each unit comprising the copolymer, where a+b=1. Thus "a" can be from 0.03 to 0.99, or $\geq 0.04$, or $\geq 0.05$, or $\geq 0.06$, or, $\geq 0.07$, or $\geq 0.08$, or, $\geq 0.09$ or $\geq 0.1$, or $\geq 0.2$, or $\geq 0.3$, or $\geq 0.4$, or $\geq 0.5$, or $\geq 0.6$, or $\geq 0,7$, or $\geq 0.8$, or $\geq 0.9$, or $\leq 0.99$, or $\leq 0.97$, or $\leq 0.95$, or $\leq 0.91$, or $\leq 0.88$, or $\leq 0.85$, or $\leq 0.80$, and "b" can be from 0.01 to 0.97, or $\geq 0.02$, or $\geq 0.03$, or $\geq 0.035$, or $\geq 0.04$, or $\geq 0.045$, or $\geq 0.075$, or $\geq 0.1$, or $\geq 0.2$, or $\geq 0.3$, or $\geq 0.4$, or $\geq 0.5$ or $\geq 0.6$ or $\geq 0.7$, or $\leq 0.97$, or $\leq 0.95$, or $\leq 0.93$, or $\leq 0.91$, or $\leq 0.88$, or $\leq 0.85$, or $\leq 0.80$. Where 2-butene, for example, is used as the at least one vicinally disubstituted olefin in the reaction process, an incorporation of the 2-butene relative to the ethylene and/or α-olefin, approaching a 50/50 mol. % ratio is contemplated. At such incorporation levels, the value of "b" will approach zero and the polymer may approach a statistically alternating copolymer of ethylene and/or α-olefin, and the at least one vicinally disubstituted olefin. We intend that other α-olefins other than ethylene may be used in copolymerization either in addition to or instead of ethylene, with the at least one vicinally disubstituted monomers. Such combinations, using V as a symbol for the at least one vicinally disubstituted monomer, and P for propylene, and/or B for butene-1, and/or H for hexene-1, and/or O for octene-1, may be represented, in reference to the copolymer formulas above, by EV, PV, BV, HV, OV, EPV, EBV, EHV, EOV, PBV, PHV, POV, BHV, BOV, HOV, EPBV, EPHV, EPOV, EBHV, EBOV, EHOV, PBHV, PBOV, BHOV, EPBHV, EPBOV, EBHOV, PBHOV, EPBHOV. Other monomers and combinations of monomers can be represented in a similar manner.

The term "copolymer", as used herein, may mean a polymer derived from two or more monomeric types. Accordingly, polymers described above as for instance, EPV and EPBV containing, respectively, ethylene, propylene and at least one vicinally disubstituted olefin derived units, and ethylene, propylene, 1-butene and at least one vicinally disubstituted olefin derived units, will also be referred to as copolymers. Copolymers with more than two monomeric types are sometimes also referred to as terpolymers. For copolymers containing more than one non-vicinally disubstituted monomer, the molar amounts of the non-vicinally disubstituted monomer would be combined and represented by E in the formulas, —(E)$_b$— and —(E—V)$_a$—. Likewise, for copolymers containing more than one vicinally disubstituted monomer, the molar amounts of the vicinally disubstituted monomers would be combined and represented by V in the formula —(E—V)$_a$—.

Depending upon the level of incorporated vicinally disubstituted olefin monomer, or monomers, polymers ranging from crystalline to elastomeric are contemplated. Use of the term "elastomer" or "elastomeric" is meant in this application as recognized in the art, that is the copolymers are largely amorphous, they do not contain a significant amount of crystalline segments, for example $\leq 15$ wt. % as determined by differential scanning calorimetry (DSC). A description of elastomeric ethylene-α-olefin copolymers with respect to crystallinity appears U.S. Pat. No. 5,767,208 incorporated by reference for purposes of U.S. patent practice. Disruption of any crystalline structure, the E units referred to above, may also or additionally be achieved by the further incorporation of the other coordination polymerization monomers capable of copolymerization with the polymerization catalyst of embodiments of the invention.

Ethylene and/or α-olefin derived units in the polymers of embodiments of our invention may be present in the polymers at a total of $\geq 1$, or $\geq 2.5$, or $\geq 5$, or $\geq 7.5$, or $\geq 10$, or $\geq 12.5$, or $\geq 15$, or $\geq 20$, or $\geq 25$, or $\geq 30$, or $\geq 35$, or $\geq 40$, or $\geq 45$, or $\geq 50$ or $\geq 55$, or $\geq 60$, or $\geq 65$ or $\geq 70$, or $\leq 95$ or $\leq 90$ or $\leq 85$ or $\leq 80$ weight percent, based on the total monomeric content of the polymers. The remainder of the polymers may be derived from the at least one vicinally disubstituted monomer.

The copolymers of embodiments of the invention may have a high degree of terminal, chain-end unsaturation. Those copolymers of embodiments of the invention having $\geq 5$ mol. % of the at least one vicinally disubstituted monomer derived units, may have predominantly tri-substituted chain end unsaturation. By predominantly we intend $\geq 45\%$, or $\geq 50\%$, or $\geq 60\%$, or $\geq 70\%$, or $\geq 80\%$, or $\geq 90\%$ or 100%, chain-end unsaturation, as determined by nuclear magnetic resonance (NMR) spectrometry, or infrared (IR) spectrometry.

The polymers of embodiments of the invention may have a $M_n$ (number-average molecular weight) value from 300 to 300,000, or between from 700 to 200,000, or less than 100,000. For low weight molecular weight applications, such as those copolymers useful in lubricating and fuel oil compositions, a $M_n$ of 300 to 20,000 is contemplated, or less than or equal to 10,000. Additionally, copolymer of embodiments of the invention will comprise a molecular weight distribution (MWD) in the range of $\geq 1$, or $\geq 1.5$ or $\leq 6$, or $\leq 4$ or $\leq 3$.

Polymerization Process

The generic process for the preparation of embodiments of the invention copolymers comprises contacting at least one vicinally disubstituted olefin monomer and ethylene and/or α-olefins, optionally with one or more other coordination polymerizable monomers, with a catalyst system comprising a monocyclopentadienyl heteroatom-containing Group 4 transition metal catalyst component. The contacting may be conducted by combining the activated catalyst composition with the polymerizable monomers under suitable coordination polymerization conditions. The catalyst component may be one additionally comprising a Group 15 or 16 heteroatom covalently bound both to the Group 4 transition metal center and, through a bridging group, to a ring carbon of the cyclopentadienyl group-containing ligand. Such catalysts are known, see U.S. Pat. Nos. 5,055,438, 5,096,867, 5,264,505, 5,408,017, 5,504,169 and WO 92/00333. See also, U.S. Pat. Nos. 5,374,696, 5,470,993, 5,494,874; and, WO 93/19104 and EP 0 514 828 A. For catalysts useful for preparation of cyclic olefin (cyclopentene and/or norbornene, for example) containing copolymers, see WO-94/17113, U.S. Pat. No. 5,635,573, and WO 96/002444. Additionally, the unbridged monocyclopentadienyl heteroatom-containing Group 4 transition metal catalyst components of U.S. Pat. Nos. 5,907,021 and 5,767,208, may be suitable in accordance with embodiments of the invention. Each of the foregoing references are incorporated by reference for the purposes of U.S. patent practice.

In embodiments of the process of this invention, the catalyst system may be employed in liquid phase (solution, slurry, suspension, bulk phase or combinations thereof), in high pressure liquid, or supercritical fluid or gas phase processes. Each of these processes may be employed in single, parallel or series reactors. The liquid processes comprise contacting the ethylene and/or α-olefin and at least one vicinally disubstituted olefui monomer with the catalyst system described herein, in a suitable diluent or solvent and allowing the monomers to react for a sufficient time to produce copolymers of embodiments of the invention. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use a supported catalyst and may be conducted in any manner known to be suitable for producing ethylene homopolymers or copolymers via coordination polymerization. Illustrative examples may be found in U.S. Pat. Nos. 4,543,399, 4,588,790, 5,028,670, 5,382,638, 5,352,749, 5,436,304, 5,453,471, 5,463,999, and WO 95/07942. Each is incorporated by reference for purposes of U.S. patent practice.

It is also within the scope of the invention to use more than one monocyclopentadienyl heteroatom-containing Group 4 transition metal catalyst compound and/or more than one activator either as a mixture in a single reactor (alternatively referred to as a mixed catalyst system), or in two or more reactors in series. When using series reactors, one monocyclopentadienyl heteroatom-containing Group 4 transition metal catalyst compound and one activator and be fed into the first reactor, and optionally a different monocyclopentadienyl heteroatom-containing Group 4 transition metal catalyst compound and /or activator can be fed into the second reactor. In all processes, the monocyclopentadienyl heteroatom-containing Group 4 transition metal catalyst compound may be fed into the reactor separately from the activator, or can be pre-mixed and fed into the reactor together.

The mixed catalyst system may also include one or more monocyclopentadienyl heteroatom-containing Group 4 transition metal catalyst compound(s), a different catalyst system than the Group 4 transition metal catalyst compound(s), and one or more activator(s) either as a mixture in a single reactor, or in two or more reactors in series. The different catalyst systems include but are not limited to bridged and unbridged, substituted or unsubstituted metallocene compounds, such as: dimethylsilyl (tetramethylcyclopentadienyl)(cyclododecylamido)titanium dichloride or dimethyl, dimethylsilyl (tetramethylcyclopentadienyl)(t-butylamido)titanium dichloride or dimethyl, dimethylsilylbis(tetrahydroindenyl) zirconium dichloride or dimethyl dimethylsilylbis (tetrahydroindenyl)hafnium dichloride or dimethyl, dimethylsilylbis(indenyl)zirconium dichloride or dimethyl, dimethylsilylbis(indenyl)hafnium dichloride or dimethyl, ethylenebis(indenyl)zirconium dichloride or dimethyl, ethylenebis(indenyl)hafnium dichloride or dimethyl, dimethylsilylbis(2-methylindenyl)zirconium dichloride or dimethyl dimethylsilylbis(2-methylindenyl)hafnium dichloride or dimethyl, dimethylsilylbis(2-methyl-4-phenylindenyl)zirconium dichloride or dimethyl, dimethylsilylbis(2-methyl-4-phenylindenyl)hafnium dichloride or dimethyl, dimethylsilylbis(2-methyl-4-naphthylindenyl)zirconium dichloride or dimethyl, dimethylsilylbis(2-methyl-4-naphthylindenyl)hafnium dichloride or dimethyl, ethylenebis(2-methylindenyl) zirconium dichloride or dimethyl, ethylenebis(2-methylindenyl)hafnium dichloride or dimethyl, ethylenebis (2-methyl-4-phenylindenyl)zirconium dichloride or dimethyl, ethylenebis(2-methyl-4-phenylindenyl)hafnium dichloride or dimethyl, ethylenebis(2-methyl-4-naphthylindenyl)zirconium dichloride or dimethyl, ethylenebis(2-methyl-4-naphthylindenyl)hafnium dichloride or dimethyl, dimethylsilyl(fluorenyl) (cyclopentadienyl)hafnium dichloride or dimethyl, diphenylsilyl(fluorenyl) (cyclopentadienyl)hafnium dichloride or dimethyl or di(p-triethylsilylphenyl) methylene(2,7-di-t-butylfluorenyl)cyclopentadienyl)hafnium dimethyl. The different catalyst system may also comprise monocyclopentadienyl heteroatom-containing Group 4 transition metal catalyst compounds that have a tertiary (3°) carbon atom directly bonded to J.

Generally, the polymerization reaction temperature may vary from −50° C. to 250° C. The reaction temperature conditions may be from −20° C. to 220°, or below 200° C. The pressure may vary from 1 mm Hg to 2500 bar, or from 0.1 bar to 1600 bar, or from 1.0 to 500 bar. The multiboron activators of U.S. Pat. No. 5,278,119 may additionally be employed to facilitate the preparation of the low molecular weight copolymers of the invention. Embodiments of the invention copolymers may have an insignificant number or, that is substantially no, diads, triads, tetrads, or pentads, comprising homopolymerized or sequentially polymerized, vicinally disubstituted olefins. By substantially no we intend ≦1 wt. % or ≦0.5%, or 0%, as determined by NMR.

The optional coordination polymerizable monomers that may be incorporated in the substantially random ethylene copolymers may also be randomly incorporated at the beginning or within-the E sequences of embodiments of the invention copolymer.

Vicinally Disubstituted Olefins

The vicinally disubstituted olefins useful in accordance with the invention comprise vicinally disubstituted olefins described by the formula:

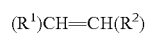

where $R^1$ and $R^2$ may independently comprise hydrocarbyl or silyl-hydrocarbyl groups containing one or more carbon or silicon atoms, or may be linear, branched or cyclic substituted or unsubstituted hydrocarbyl or silyl-hydrocarbyl groups having from 1–100 carbon or silicon atoms, or they may contain 30 or less carbon or silicon atoms, however, $R^1$ and $R^2$ may generally be independently hydrocarbyl or silyl-hydrocarbyl, the inclusion of non-carbon or -silicon atoms, such as for example B, O, S, Se, Te, N, P, Ge, Sn, Pb, As, F, Cl, Br, or I, are contemplated, where such non-carbon or -silicon moieties are sufficiently far removed from the double bond so as not to interfere with the coordination polymerization reaction with the catalyst and so to retain the generally hydrocarbyl characteristic. By sufficiently far removed from the double bond, we intend that the number of carbon atoms, or the number of carbon and silicon atoms, separating the double bond and the non-carbon or -silicon moiety may be 6 or greater, e.g. 7, or 8, or 9, or 10, or 11, or 12, or 13, or 14 or more. The number of such carbon atoms, or carbon and silicon atoms, is counted from immediately adjacent to the double bond to immediately adjacent to the non-carbon or -silicon moiety. Non-limiting examples of vicinally disubstituted olefins comprise, cis and/or trans (and or E and/or Z) isomers of 2-butene, 2-pentene, 2-hexene, 3-hexene, 2-heptene, 3-heptene, 2-octene, 3-octene, 4-octene, 2-nonene, 3-nonene, 4-nonene, 2-decene, 3-decene, 4-decene, 5-decene, 2-undecene, 3-undecene, 4-undecene, 5-undecene, 2-dodecene, 3-dodecene, 4-dodecene, 5-dodecene, 6-dodecene, 2-tridecene, 3-tridecene, 4-tridecene, 5-tridecene, 6-tridecene, 2-tetradecene, 3-tetradecene, 4-tetradecene, 5-tetradecene, 6-tetradecene, 7-tetradecene, 2-pentadecene, 3-pentadecene, 4-pentadecene, 5-pentadecene, 6-pentadecene, 7-pentadecene, 2-hexadecene, 3-hexadecene, 4-hexadecene, 5-hexadecene, 6-hexadecene, 7-hexadecene, 8-hexadecene, 2-heptadecene, 3-heptadecene, 4-heptadecene, 5-heptadecene, 6-heptadecene, 7-heptadecene, 8-heptadecene, 2-octadecene, 3-octadecene, 4-octadecene, 5-octadecene, 6-octadecene, 7-octadecene, 8-octadecene, 9-octadecene, 2-nonadecene, 3-nonadecene, 4-nonadecene, 5-nonadecene, 6-nonadecene, 7-nonadecene, 8-nonadecene, 9-nonadecene, 2-eicosene, 3-eicosene, 4-eicosene, 5-eicosene, 6-eicosene, 7-eicosene, 8-eicosene, 9-eicosene, 10-eicosene, 2-heneicosene, 3-heneicosene, 4-heneicosene, 5-heneicosene, 6-heneicosene, 7-heneicosene, 8-heneicosene, 9-heneicosene, 10-heneicosene, 2-docosene, 3-docosene, 4-docosene, 5-docosene, 6-docosene, 7-docosene, 8-docosene, 9-docosene, 10-docosene, 11-docosene, 2-tricosene, 3-tricosene, 4-tricosene, 5-tricosene, 6-tricosene, 7-tricosene, 8-tricosene, 9-tricosene, 10-tricosene, 11-tricosene, 2-tetracosene, 3-tetracosene, 4-tetracosene, 5-tetracosene, 6-tetracosene, 7-tetracosene, 8-tetracosene, 9-tetracosene, 10-tetracosene, 11-tetracosene, 12-tetracosene, 2-pentacosene, 3-pentacosene, 4-pentacosene, 5-pentacosene, 6-pentacosene, 7-pentacosene, 8-pentacosene, 9-pentacosene, 10-pentacosene, 11-pentacosene, 12-pentacosene, 2-bexacosene, 3-hexacosene, 4-hexacosene, 5-hexacosene, 6-hexacosene, 7-hexacosene, 8-hexacosene, 9-hexacosene, 10-hexacosene, 11-hexacosene, 12-hexacosene, 13-hexacosene, 2-heptacosene, 3-heptacosene, 4-heptacosene, 5-heptacosene, 6-heptacosene, 7-heptacosene, 8-heptacosene, 9-heptacosene, 10-heptacosene, 1-heptacosene, 12-heptacosene, 13-heptacosene, 2-octacosene, 3-octacosene, 4-octacosene, 5-octacosene, 6-octacosene, 7-octacosene, 8-oetacosene, 9-octacosene, 10-octacosene, 11-octacosene, 12-octacosene, 13-octacosene, 14-octacosene, 2-nonacosene, 3-nonacosene, 4-nonacosene, 5-nonacosene, 6-nonacosene, 7-nonacosene, 8-nonacosene, 9-nonacosene, 10-nonacosene, 11-nonacosene, 12-nonacosene, 13-nonacosene, 14-nonacosene, 2-triacontene, 3-triacontene, 4-triacontene, 5-triacontene, 6-triacontene, 7-triacontene, 8-triacontene, 9-triacontene, 10-triacontene, 11-triacontene, 12-triacontene, 13-triacontene, 14-triacontene, 15-triacontene, 4-methyl-2-pentene, 4-methyl-2-hexene, 5-methyl-2-hexene, 2-methyl-3-hexene, 4-methyl-2-heptene, 5-methyl-2-heptene, 6-methyl-2-heptene, 2-methyl-3-heptene, 5-methyl-3-heptene, 6-methyl-3-heptene, 4-methyl-2-octene, 5-methyl-2-octene, 6-methyl-2-octene, 7-methyl-2-octene, 2-methyl-3-octene, 5-methyl-3-octene, 6-methyl-3-octene, 7-methyl-3-octene, 4-methyl-2-nonene, 5-methyl-2-nonene, 6-methyl-2-nonene, 7-methyl-2-nonene, 8-methyl-2-nonene, 2-methyl-3-nonene, 5-methyl-3-nonene, 6-methyl-3-nonene, 7-methyl-3-nonene, 8-methyl-3-nonene, 2-methyl-4-nonene, 3-methyl-4-nonene, 4-methyl-2-decene, 5-methyl-2-decene, 6-methyl-2-decene, 7-methyl-2-decene, 8-methyl-2-decene, 9-methyl-2-decene, 2-methyl-3-decene, 5-methyl-3-decene, 6-methyl-3-decene, 7-methyl-3-decene, 8-methyl-3-decene, 9-methyl-3-decene, 2-methyl-4-decene, 3-methyl-4-decene, 6-methyl-4-decene, 7-methyl-4-decene, 8-methyl-4-decene, 8-methyl-4-decene, 2-methyl-5-decene, 3-methyl-5-decene, 4-methyl-5-decene, 4-phenyl-2-pentene, 5-phenyl-2-pentene, 4-phenyl-2-hexene, 5-phenyl-2-hexene, 6-phenyl-2-hexene, 4-phenyl-2-heptene, 5-phenyl-2-heptene, 6-phenyl-2-heptene, 7-phenyl-2-heptene, 4-phenyl-2-octene, 5-phenyl-2-octene, 6-phenyl-2-octene, 7-phenyl-2-octene, 8-phenyl-2-octene, 4-phenyl-2-nonene, 5-phenyl-2-nonene, 6-phenyl-2-nonene, 7-phenyl-2-nonene, 8-phenyl-2-nonene, 9-phenyl-2-nonene, 4-phenyl-2-dccene, 5-phenyl-3-decene, 6-phenyl-2-decene, 7-phenyl-3-decene, 8-phenyl-2-decene, 9-phenyl-3-decene, 10-phenyl-2-decene, trimethyl(prop-1-enyl)silane, ethyldimethyl(prop-1-enyl)silane, ethyl(prop-1-enyl)silane, propyldimethyl(prop-1-enyl)silane, propyl(prop-1-enyl)silane, butyldimethyl(prop-1-enyl)silane, butyl(prop-1-enyl)silane, trimethyl(but-1-enyl)silane, ethyldimethyl(but-1-enyl)silane, ethyl(but-1-enyl)silane, propyldimethyl(but-1-enyl)silane, propyl(but-1-enyl)silane, butyldimethyl(but-1-enyl)silane, butyl(but-1-enyl)silane, trimethyl(but-2-enyl)silane, ethyldimethyl(but-2-enyl)silane, ethyl(but-2-enyl)silane, propyldimethyl(but-2-enyl)silane, propyl(but-2-enyl)silane, butyldimethyl(but-2-enyl)silane, butyl(but-2-enyl)silane, trimethyl(pent-1-enyl)silane, ethyldimethyl(pent-1-enyl)silane, ethyl(pent-1-enyl)silane, propyldimethyl(pent-1-enyl)silane, propyl(pent-1-enyl)silane, butyldimethyl(pent-1-enyl)silane, butyl(pent-1-enyl)silane, trimethyl(pent-2-enyl)silane, ethyldimethyl(pent-2-enyl)silane, ethyl(pent-2-enyl)silane, propyldimethyl(pent-2-enyl)silane, propyl(pent-2-enyl)silane, butyldimethyl(pent-2-enyl)silane, butyl(pent-2-enyl)silane, trimethyl(pent-3-enyl)silane, ethyidimethyl(pent-3-enyl)silane, ethyl(pent-3-enyl)silane, propyldimethyl(pent-3-enyl)silane, propyl(pent-3-enyl)silane, butyldimethyl(pent-3-enyl)silane, butyl(pent-3-enyl)silane, trimethyl(hex-4-enyl)silane, trimethyl(hept-5-enyl)silane, trimethyl(oct-6-enyl)

silane, trimethyl(non-7-enyl)silane, trimethyl(dec-8-enyl)silane, dimethyl(non-7-enyl)amine, diethyl(non-7-enyl)amine, dipropyl(non-7-enyl)amine, dimethyl(dec-7-enyl)amine, diethyl(dec-7-enyl)amine, dipropyl(dec-7-enyl)amine, dimethyl(dec-8-enyl)amine, diethyl(dec-8-enyl)amine, dipropyl(dec-8-enyl)amine, dimethyl(undec-7-enyl)amine, diethyl(undec-7-enyl)amine, dipropyl(undec-7-enyl)amine, dimethyl(undec-8-enyl)amine, diethyl(undec-8-enyl)amine, dipropyl(undec-8-enyl)amine, dimethyl(undec-9-enyl)amine, diethyl(undec-9-enyl)amine, dipropyl(undec-9-enyl)amine, dimethyl(dodec-7-enyl)amine, diethyl(dodec-7-enyl)amine, dipropyl(dodec-7-enyl)amine, dimethyl(dodec-8-enyl)amine, diethyl(dodec-8-enyl)amine, dipropyl(dodec-8-enyl)amine, dimethyl(dodec-9-enyl)amine, diethyl(dodec-9-enyl)amine, dipropyl(dodec-9-enyl)amine, dimethyl(dodec-10-enyl)amine, diethyl(dodec-10-enyl)amine, dipropyl(dodec-10-enyl)amine, dimethyl(non-7-enyl)phosphane, diethyl(non-7-enyl)phosphane, dipropyl(non-7-enyl)phosphane, dimethyl(dec-7-enyl)phosphane, diethyl(dec-7-enyl)phosphane, dipropyl(dec-7-enyl)phosphane, dimethyl(dec-8-enyl)phosphane, diethyl(dec-8-enyl)phosphane, dipropyl(dec-8-enyl)phosphane, dimethyl(non-7-enyl)borane, diethyl(non-7-enyl)borane, dipropyl(non-7-enyl)borane, dimethyl(dec-7-enyl)borane, diethyl(dec-7-enyl)borane, dipropyl(dec-7-enyl)borane, dimethyl(dec-8-enyl)borane, diethyl(dec-8-enyl)borane, dipropyl(dec-8-enyl)borane, 9-methoxynon-2-ene, 9-ethoxynon-2-ene, 9-propoxynon-2-ene, 9-methoxydec-2-ene, 9-ethoxydec-2-ene, 9-propoxydec-2-ene, 10-methoxydec-2-ene, 10-ethoxydec-2-ene, 10-propoxydec-2-ene, 9-methoxyundec-2-ene, 9-ethoxyundec-2-ene, 9-propoxyundec-2-ene, 10-methoxyundec-2-ene, 10-ethoxyundec-2-ene, 10-propoxyundec-2-ene, 10-methoxyundec-2-ene, 10-ethoxyundec-2-ene, 10-propoxyundec-2-ene, 9-methoxydodec-2-ene, 9-ethoxydodec-2-ene, 9-propoxydodec-2-ene, 10-methoxydodec-2-ene, 10-ethoxydodec-2-ene, 10-propoxydodec-2-ene, 10-methoxydodec-2-ene, 10-ethoxydodec-2-ene, 10-propoxydodec-2-ene, 11-methoxydodec-2-ene, 11-ethoxydodec-2-ene, 11-propoxydodec-2-ene, 9-methylsulfanylnon-2-ene, 9-ethylsulfanylnon-2-ene, 9-propylsulfanylnon-2-ene, 9-methylsulfanyldec-2-ene, 9-ethylsulfanyldec-2-ene, 9-propylsulfanyldec-2-ene, 10-methylsulfanyldec-2-ene, 10-ethylsulfanyldec-2-ene, 10-propylsulfanyldec-2-ene, 9-methylsulfanylundec-2-ene, 9-ethylsulfanylundec-2-ene, 9-propylsulfanylundec-2-ene, 10-methylsulfanylundec-2-ene, 10-ethylsulfanylundec-2-ene, 10-propylsulfanylundec-2-ene, 10-methylsulfanylundec-2-ene, 10-ethylsulfanylundec-2-ene, 10-propylsulfanylundec-2-ene, 9-methylsulfanyldodec-2-ene, 9-ethylsulfanyldodec-2-ene, 9-propylsulfanyldodec-2-ene, 10-methylsulfanyldodec-2-ene, 10-ethylsulfanyldodec-2-ene, 10-propisulfanyldodec-2-ene, 10-methylsulfanyldodec-2-ene, 10-ethylsulfanyldodec-2-ene, 10-propylsulfanyldodec-2-ene, 11-methylsulfanyldodec-2-ene, 11-ethylsulfanyldec-2-ene, 11-propylsulfanyldodec-2-ene, 9-methylselanylnon-2-ene, 9-ethylselanylnon-2-ene, 9-propylselanylnon-2-ene, 9-methylselanyldec-2-ene, 9-ethylselanyldec-2-ene, 9-propylselanyldec-2-ene, 10-methylselanyldec-2-ene, 10-ethylselanyldec-2-ene, 10-propylselanyldec-2-ene, 9-bromonon-2-ene, 9-chloronon-2-ene, 9-iodonon-2-ene, 9-fluoronon-2-ene, 9-bromodec-2-ene, 9-chlorodec-2-ene, 9-iodoodec-2-ene, 9-fluorodec-2-ene, 10-bromodec-2-ene, 10-chlorodec-2-ene, 10-iododec-2-ene, 10-fluorodec-2-ene, 9-bromoundec-2-ene, 9-chloroundec-2-ene, 9-iodooundec-2-ene, 9-fluoroundec-2-ene, 10-bromoundec-2-ene, 10-chloroundec-2-ene, 10-iodoundec-2-ene, 10-fluoroundec-2-ene, 11-bromoundec-2-ene, 11-chloroundec-2-ene, 11-iodoundec-2-ene, 11-fluoroundec-2-ene, 9-bromododec-2-ene, 9-chlorododec-2-ene, 9-iodoododec-2-ene, 9-fluorododec-2-ene, 10-bromododec-2-ene, 10-chlorododec-2-ene, 10-iodododec-2-ene, 10-fluorododec-2-ene, 11-bromododec-2-ene, 11-chlorododec-2-ene, 11-iodododec-2-ene, 11-fluorododec-2-ene, 12-bromododec-2-ene, 12-chlorododec-2-ene, 12-iodoododec-2-ene, 12-fluorododec-2-ene, 9,9,9-trifluoronon-2-ene, 9,9-difluoronon-2-ene, 9,9,9-trifluorodec-2-ene, 9,9-difluorodec-2-ene, 10,10,10-trifluorodec-2-ene, 10,10-difluorodec-2-ene, 9,9,9-trifluoroundec-2-ene, 9,9-difluoroundec-2-ene, 10,10,10-trifluoroundec-2-ene, 10,10-difluoroundec-2-ene, 11,11,11-trifluoroundec-2-ene, 11,11-difluoroundec-2-ene, 9,9,9-trifluorododec-2-ene, 9,9-difluorododec-2-ene, 10,10,10-trifluorododec-2-ene, 10,10-difluorododec-2-ene, 11,11,11-trifluorododec-2-ene, 11,11-difluorododec-2-ene, 12,12,12-trifluorododec-2-ene, 12,12-difluorododec-2-ene, 2-oct-6-enyloxirane, 2-non-7-enyloxirane, 2-dec-8-enyloxirane, 2-undec-9-enyloxirane, 2-dodec-10-enyloxirane, and combinations thereof. Vicinally disubstituted olefins, for the purposes of this specification, do not include cyclic olefins wherein the olefinic group is entirely within a cyclic structure, for example cyclopentene or cyclohexene.

We further intend that polymers of embodiments of our invention will be substantially free of geminally disubstituted olefins. By substantially free of, we intend $\leq 5$ mole %, or $\leq 3\%$ or $\leq 1\%$ or $\leq 0.5\%$ or $\leq 0.1\%$, or none intentionally added, or detectable by currently available techniques (NMR). Geminally disubstituted olefins include isobutylene, 3-trimethylsilyl-2-methyl-1-propene, 2-methyl-1-butene, 2-methyl-1-pentene, 2-ethyl-1-pentene, 2-methyl-1-hexene, 2-methyl-1-heptene, 6-dimethylamino-2-methyl-1-hexene, or α-methylstyrene as representative compounds, or other moieties as described in U.S. Pat. No. 5,866,665, (at col. 5, lines 3–29), incorporated herein by reference.

The optional coordination polymerizable monomers which may be copolymerized in accordance with embodiments of the invention, include one or more of: $C_3$–$C_{30}$ α-olefins, $C_6$–$C_{30}$ vinylaromatic olefins including styrene and hydrocarbyl-substituted styrene monomers wherein the substituent is on the aromatic ring, $C_6$–$C_{30}$ substituted α-olefins, $C_4$–$C_{30}$ diolefins, $C_5$–$C_{30}$ cyclic olefins and cyclic diolefins, and $C_3$–$C_{30}$ acetylenically unsaturated monomers. Macromers having more than 30 carbon atoms, up to 100 carbons atoms and more may similarly be used.

Non-limiting examples of α-olefins include propylene, 1-butene, 1-pentene, 1-hexene, 1-heptene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 5-methyl-1-nonene, 3-methyl-1- pentene, 3,5,5-trimethyl-1-hexene, vinylcyclohexane, vinylnorbornane, or combinations thereof. Styrene, para-methylstyrene, para-t-butylstyrene, and vinylnaphthylene are non-limiting examples of vinylaromatic olefins. Diolefins include those described in the literature for ethylene copolymers, including for EPDM rubber, the disclosure of U.S. Pat. No. 5,767,208 above, may be relevant in this regard. Examples include straight chain acyclic diolefins, branched acyclic diolefins, single ring alicyclic diolefins, multi-ring alicyclic fused and bridged ring diolefins, cycloalkenyl-substituted alkenes or combinations thereof. Non-limiting examples include 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 9-methyl-1,9-decadiene, norbornadiene, dicyclopentadiene, 5-ethylidene-2-norbornene, vinylcyclohexene, 5-vinyl-2-norbornene, or combinations thereof.

The $C_6$–$C_{30}$ substituted α-olefins include those containing at least one non-carbon Group 13 to 17 atom bound to a carbon atom of the substituted α-olefin where such substitution if silicon may be adjacent to the double bond or terminal to the double bond, or anywhere in between, and where inclusion of non-carbon and -silicon atoms such as for example B, O, S, Se, Te, N, P, Ge, Sn, Pb, As, F, Cl, Br, or I, are contemplated, where such non-carbon or -silicon moieties are sufficiently far removed from the double bond so as not to interfere with the coordination polymerization reaction with the catalyst and so to retain the generally hydrocarbyl characteristic. By sufficiently far removed from the double bond we intend that the number of carbon atoms, or the number of carbon and silicon atoms, separating the double bond and the non-carbon or -silicon moiety may be 6 or greater, e.g. 7, or 8, or 9, or 10, or 11, or 12, or 13, or 14 or more. The number of such carbon atoms, or carbon and silicon atoms, is counted from immediately adjacent to the double bond to immediately adjacent to the non-carbon or -silicon moiety. Examples include allyltrimethylsilane, 8,8,8-trifluoro-1-octene, 8-methoxyoct-1-ene, 8-methylsulfanyloct-1-ene, 8-dimethylaminooct-1-ene, or combinations thereof. The use of functional group-containing α-olefins where the functional group is closer to the double bond is also within the scope of embodiments of the invention when such olefins may be incorporated in the same manner as are their α-olefin analogs. See, "Metallocene Catalysts and Borane Reagents in The Block/Graft Reactions of Polyolefins", T. C. Chung, et al, *Polym. Mater. Sci. Eng.*, v. 73, p. 463 (1995), and the masked α-olefin monomers of U.S. Pat. No. 5,153,282. Such monomers permit the preparation of both functional-group containing copolymers capable of subsequent derivatization, and of functional macromers which may be used as graft and block type polymeric segments. All documents cited herein are incorporated by reference for purposes of U.S. patent practice.

Cyclic olefins capable of copolymerization in accordance with the invention include cyclopentene, norbornene, alkyl-substituted norbornenes, cyclohexene, cycloheptene, combinations thereof and those described in see WO-94/17113, U.S. Pat. Nos. 5,635,573, 5,270,393 and 5,324,801. These documents are incorporated by reference for purposes of U.S. patent practice.

For the copolymerization of vicinally disubstituted olefins with ethylene, and/or α-olefins, the molar ratio of vicinally disubstituted olefin to ethylene, and/or α-olefin contemplated may be from 1000:1 to 1:1000, or from 500:1 to 1:20, or from 100:1 to 1:1. The optional coordination polymerizable monomers may be introduced in any ratio consistent with desired incorporation ratios.

Catalyst

The monocyclopentadienyl heteroatom-containing Group 4 transition metal catalyst components of the invention are derived from the monocyclopentadienyl Group 4 metallocene compounds well-known and described in the documents listed above, and others in the patent literature. These

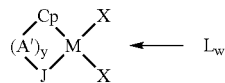

compounds (precatalysts) may be represented by the general formula:
wherein:

M comprises Zr, Hf or Ti;

Cp comprises a cyclopentadienyl ring which may be substituted with from zero to five substituted groups R when y is zero, and from one to four substituted groups R when y is one; and each substituted group R comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals, wherein one or more hydrogen atoms may be replaced by one or more of a halogen radical, an amido radical, a phosphido radical, an alkoxy radical, an aryloxy radical or any radical containing a Lewis acidic or basic functionality; $C_1$ to $C_{30}$ hydrocarbyl-substituted metalloid radicals wherein the metalloid may be selected from the one of Group 14 of the Periodic Table of Elements; halogen radicals; am ido radicals; phosphido radicals; alkoxy radicals; or alkylborido radicals; or, Cp is a cyclopentadienyl ring in which at least two adjacent R-groups may be joined together and along with the carbon atoms to which they may be attached form a $C_4$ to $C_{20}$ ring system which may be saturated, partially unsaturated or aromatic, and/or substituted or unsubstituted, the substitutions being selected as one or more R group as defined above;

J comprises a Group 15 or 16 heteroatom which may be substituted with one R' group when J is a group 15 element and y is one, or a group 16 element and y is zero, or with two R' groups when J is a group 15 element and y is zero, or is unsubstituted when J is Group 16 element and y is one; and each substituent group R' comprises, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals wherein one or more hydrogen atoms is replaced by one or more of halogen radicals, amido radicals, phosphido radicals, alkoxy radicals, aryloxy radicals; or alkylborido radicals, with the proviso that all R's are bonded to J through a 1°, 2°, or aromatic carbon atom, and are not directly bonded to a silicon or germanium atom, or R' comprises an aliphatic, alicyclic or aromatic hydrocarbyl or substituted hydrocarbyl radical that is bonded to J through a 1°, 2°, or aromatic carbon atom;

each X comprises independently a monoanionic ligand selected from one of hydride; substituted or unsubstituted $C_1$ to $C_{30}$ hydrocarbyl; alkoxide; aryloxide;

amide; halide or phosphide; Group 14 organometalloids; or both X's together may form an alkylidene or a cyclometallated hydrocarbyl or other dianionic ligand; with the proviso that X may not be Cp as herein above defined;

y is 0 or 1; and when y=1, A' is a bridging group covalently bonded to both Cp and J, typically comprising at least one Group 13, 14 or 15 element such as carbon, silicon, boron, germanium, nitrogen or phosphorous with additional substituents R as defined above so as to complete the valency of the Group 13, 14 or 15 element(s);

L is a neutral Lewis base other than water, such as an olefin, diolefin, aryne, amine, phosphine, ether or sulfide, e.g., diethylether, tetrahydrofuran, dimethylaniline, aniline, trimethylphosphine, or n-butylamine; and w is a number from 0 to 3.

Compounds (precatalysts) contemplated include:
dimethylsilyl(tetramethylcyclopentadienyl)(cyclododecylamido)titanium dichloride,
dimethylsilyl(tetramethylcyclopentadienyl)(cyclododecylamido)titanium dimethyl,
dimethylsilyl(tetramethylcyclopentadienyl)(cyclohexylamido)titanium dichloride,
dimethylsilyl(tetramethylcyclopentadienyl)(cyclohexylamido)titanium dimethyl,
dimethylsilyl(tetramethylcyclopentadienyl)(cyclopentylamido)titanium dichloride,
dimethylsilyl(tetramethylcyclopentadienyl)(cyclopentylamido)titanium dimethyl,
dimethylsilyl(tetramethylcyclopentadienyl)(n-butylamido)titanium dichloride,
dimethylsilyl(tetramethylcyclopentadienyl)(n-butylamido)titanium dimethyl,
dimethylsilyl(tetramethylcyclopentadienyl)(n-dodecylamido)titanium dichloride,
dimethylsilyl(tetramethylcyclopentadienyl)(n-dodecylamido)titanium dimethyl,
dimethylsilyl(tetramethylcyclopentadienyl)(n-propylamido)titanium dichloride,
dimethylsilyl(tetramethylcyclopentadienyl)(n-propylamido)titanium dimethyl,
dimethylsilyl(tetramethylcyclopentadienyl)(sec-butylamido)titanium dichloride,
dimethylsilyl(tetramethylcyclopentadienyl)(sec-butylamido)titanium dimethyl,
dimethylsilyl(tetramethylcyclopentadienyl)(ethylamido)titanium dichloride,
dimethylsilyl(tetramethylcyclopentadienyl)(ethylamido)titanium dimethyl,
dimethylsilyl(tetramethylcyclopentadienyl)(n-decylamido)titanium dichloride,
dimethylsilyl(tetramethylcyclopentadienyl)(n-decylamido)titanium dimethyl,
dimethylsilyl(tetramethylcyclopentadienyl)(benzylamido)titanium dichloride,
dimethylsilyl(tetramethylcyclopentadienyl)(benzylamido)titanium dimethyl,
dimethylsilyl(tetramethylcyclopentadienyl)(neopentylamido)titanium dichloride,
dimethylsilyl(tetramethylcyclopentadienyl)(neopentylamido)titanium dimethyl,
dimethylsilyl(tetramethylcyclopentadienyl)(methylamido)titanium dichloride,
dimethylsilyl(tetramethylcyclopentadienyl)(methylamido)titanium dimethyl,
dimethylsilyl(tetramethylcyclopentadienyl)(phenylamido)titanium dichloride,
dimethylsilyl(tetramethylcyclopentadienyl)(phenylamido)titanium dimethyl,
dimethylsilyl(tetramethylcyclopentadienyl)(2-methylphenylamido)titanium dichloride,
dimethylsilyl(tetramethylcyclopentadienyl)(2-methylphenylamido)titanium dimethyl,
dimethylsilyl(tetramethylcyclopentadienyl)(3-methylphenylamido)titanium dichloride,
dimethylsilyl(tetramethylcyclopentadienyl)(3-methylphenylamido)titanium dimethyl,
dimethylsilyl(tetramethylcyclopentadienyl)(2,6-dimethylphenylamido)titanium dichloride,
dimethylsilyl(tetramethylcyclopentadienyl)(2,6-dimethylphenylamido)titanium dimethyl,
dimethylsilyl(tetramethylcyclopentadienyl)(3,5-dimethylphenylamido)titanium dichloride,
dimethylsilyl(tetramethylcyclopentadienyl)(3,5-dimethylphenylamido)titanium dimethyl,
dimethylsilyl(tetramethylcyclopentadienyl)(2,4,6-trimethylphenylamido)titanium dichloride,
dimethylsilyl(tetramethylcyclopentadienyl)(2,4,6-trimethylphenylamido)titanium dimethyl,
dimethylsilyl(tetramethylcyclopentadienyl)(2-isopropylphenylamido)titanium dichloride,
dimethylsilyl(tetramethylcyclopentadienyl)(2-isopropylphenylamido)titanium dimethyl,
dimethylsilyl(tetramethylcyclopentadienyl)(2,6-diisopropyl-phenylamido)titanium dimethyl,
dimethylsilyl(tetramethylcyclopentadienyl)(2,6-diisopropyl-phenylamido)titanium dichloride,
dimethylsilyl(tetramethylcyclopentadienyl)(2-t-butylphenylamido)titanium dimethyl,
dimethylsilyl(tetramethylcyclopentadienyl)(2-t-butylphenylamido)titanium dichloride,
dimethylsilyl(tetramethylcyclopentadienyl)(3-t-butylphenylamido)titanium dimethyl,
dimethylsilyl(tetramethylcyclopentadienyl)(3-t-butylphenylamido)titanium dichloride,
dimethylsilyl(tetramethylcyclopentadienyl)(2-ethylhexylamido)titanium dichloride,
dimethylsilyl(tetramethylcyclopentadienyl)(2-ethylhexylamido)titanium dimethyl,
dimethylsilyl(tetramethylcyclopentadienyl)(n-hexylamido)titanium dichloride,
dimethylsilyl(tetramethylcyclopentadienyl)(n-hexylamido)titanium dimethyl,
dimethylsilyl(tetramethylcyclopentadienyl)(n-pentylamido)titanium dichloride,
dimethylsilyl(tetramethylcyclopentadienyl)(n-pentylamido)titanium dimethyl,
dimethylsilyl(tetramethylcyclopentadienyl)(2-norbornylamido)titanium dichloride,
dimethylsilyl(tetramethylcyclopentadienyl)(2-norbornylamido)titanium dimethyl,
dimethylsilyl(3-methylcyclopentadienyl)(cyclododecylamido)titanium dichloride,
dimethylsilyl(3-methylcyclopentadienyl)(cyclododecylamido)titanium dimethyl, dimethylsilyl(3-methylcyclopentadienyl) (cyclohexylamido)titanium dichloride,
dimethylsilyl(3-methylcyclopentadienyl) (cyclohexylamido)titanium dimethyl,
dimethylsilyl(3-methylcyclopentadienyl) (cyclopentylamido)titanium dichloride,
dimethylsilyl(3-methylcyclopentadienyl) (cyclopentylamido)titanium dimethyl,
dimethylsilyl(3-methylcyclopentadienyl)(n-butylamido) titanium dichloride,
dimethylsilyl(3-methylcyclopentadienyl)(n-butylamido) titanium dimethyl,
dimethylsilyl(3-methylcyclopentadienyl)(n-dodecylamido)titanium dichloride,
dimethylsilyl(3-methylcyclopentadienyl)(n-dodecylamido)titanium dimethyl,
dimethylsilyl(3-methylcyclopentadienyl)(n-propylamido)titanium dichloride,
dimethylsilyl(3-methylcyclopentadienyl)(n-propylamido)titanium dimethyl,
dimethylsilyl(3-methylcyclopentadienyl)(sec-butylamido)titanium dichloride,
dimethylsilyl(3-methylcyclopentadienyl)(sec-butylamido)titanium dimethyl,
dimethylsilyl(3-methylcyclopentadienyl)(ethylamido) titanium dichloride,
dimethylsilyl(3-methylcyclopentadienyl)(ethylamido) titanium dimethyl,
dimethylsilyl(3-methylcyclopentadienyl)(n-decylamido) titanium dichloride,
dimethylsilyl(3-methylcyclopentadienyl)(n-decylamido) titanium dimethyl,
dimethylsilyl(3-methylcyclopentadienyl)(benzylamido) titanium dichloride,
dimethylsilyl(3-methylcyclopentadienyl)(benzylamido) titanium dimethyl,
dimethylsilyl(3-methylcyclopentadienyl) (neopentylamido)titanium dichloride,
dimethylsilyl(3-methylcyclopentadienyl) (neopentylamido)titanium dimethyl,
dimethylsilyl(3-methylcyclopentadienyl)(methylamido) titanium dichloride,
dimethylsilyl(3-methylcyclopentadienyl)(methylamido) titanium dimethyl,
dimethylsilyl(3-methylcyclopentadienyl)(phenylamido) titanium dichloride,
dimethylsilyl(3-methylcyclopentadienyl)(phenylamido) titanium dimethyl,
dimethylsilyl(3-methylcyclopentadienyl)(2-methyl-phenylamido)titanium dichloride,
dimethylsilyl(3-methylcyclopentadienyl)(2-methyl-phenylamido)titanium dimethyl,
dimethylsilyl(3-methylcyclopentadienyl)(3-methyl-phenylamido)titanium dichloride,
dimethylsilyl(3-methylcyclopentadienyl)(3-methyl-phenylamido)titanium dimethyl,
dimethylsilyl(3-methylcyclopentadienyl)(2,6-dimethylphenylamido)titanium dichloride,
dimethylsilyl(3-methylcyclopentadienyl)(2,6-dimethylphenylamido)titanium dimethyl,
dimethylsilyl(3-methylcyclopentadienyl)(3,5-dimethylphenylamido)titanium dichloride,
dimethylsilyl(3-methylcyclopentadienyl)(3,5-dimethylphenylamido)titanium dimethyl,
dimethylsilyl(3-methylcyclopentadienyl)(2-isopropyl-phenylamido)titanium dichloride,
dimethylsilyl(3-methylcyclopentadienyl)(2-isopropyl-phenylamido)titanium dimethyl,
dimethylsilyl(3-methylcyclopentadienyl)(2-isopropyl-phenylamido)titanium dichloride,
dimethylsilyl(3-methylcyclopentadienyl)(2,6-diisopropyl-phenylamido)titanium dimethyl,
dimethylsilyl(3-methylcyclopentadienyl)(2,6-diisopropyl-phenylamido)titanium dichloride,
dimethylsilyl(3-methylcyclopentadienyl)(2-t-butyl-phenylamido)titanium dimethyl,
dimethylsilyl(3-methylcyclopentadienyl)(2-t-butyl-phenylamido)titanium dichloride,
dimethylsilyl(3-methylcyclopentadienyl)(3-t-butyl-phenylamido)titanium dimethyl,
dimethylsilyl(3-methylcyclopentadienyl)(3-t-butyl-phenylamido)titanium dichloride,
dimethylsilyl(3-methylcyclopentadienyl)(2-ethylhexylamido)titanium dichloride,
dimethylsilyl(3-methylcyclopentadienyl)(2-ethylhexylamido)titanium dimethyl,
dimethylsilyl(3-methylcyclopentadienyl)(n-hexylamido) titanium dichloride,
dimethylsilyl(3-methylcyclopentadienyl)(n-hexylamido) titanium dimethyl,
dimethylsilyl(3-methylcyclopentadienyl)(n-pentylamido) titanium dichloride,
dimethylsilyl(3-methylcyclopentadienyl)(n-pentylamido) titanium dimethyl,
dimethylsilyl(3-methylcyclopentadienyl)(2-norbornylamido)titanium dichloride,
dimethylsilyl(3-methylcyclopentadienyl)(2-norbornylamido)titanium dimethyl,
dimethylsilyl(cyclopentadienyl)(cyclododecylamido) titanium dichloride,
dimethylsilyl(cyclopentadienyl)(cyclododecylamido) titanium dimethyl,
dimethylsilyl(cyclopentadienyl)(cyclohexylamido) titanium dichloride,
dimethylsilyl(cyclopentadienyl)(cyclohexylamido) titanium dimethyl,
dimethylsilyl(cyclopentadienyl)(cyclopentylamido) titanium dichloride,
dimethylsilyl(cyclopentadienyl)(cyclopentylamido) titanium dimethyl,
dimethylsilyl(cyclopentadienyl)(n-butylamido)titanium dichloride,
dimethylsilyl(cyclopentadienyl)(n-butylamido)titanium dimethyl,
dimethylsilyl(cyclopentadienyl)(n-dodecylamido) titanium dichloride,
dimethylsilyl(cyclopentadienyl)(n-dodecylamido) titanium dimethyl,
dimethylsilyl(cyclopentadienyl)(n-propylamido)titanium dichloride,
dimethylsilyl(cyclopentadienyl)(n-propylamido)titanium dimethyl,
dimethylsilyl(cyclopentadienyl)(sec-butylamido)titanium dichloride, dimethylsilyl(cyclopentadienyl)(sec-butylamido)titanium dimethyl,
dimethylsilyl(cyclopentadienyl)(ethylamido)titanium dichloride,
dimethylsilyl(cyclopentadienyl)(ethylamido)titanium dimethyl,
dimethylsilyl(cyclopentadienyl)(n-decylamido)titanium dichloride,
dimethylsilyl(cyclopentadienyl)(n-decylamido)titanium dimethyl,
dimethylsilyl(cyclopentadienyl)(benzylamido)titanium dichloride,
dimethylsilyl(cyclopentadienyl)(benzylamido)titanium dimethyl,
dimethylsilyl(cyclopentadienyl)(neopentylamido)titanium dichloride,
dimethylsilyl(cyclopentadienyl)(neopentylamido)titanium dimethyl,
dimethylsilyl(cyclopentadienyl)(methylamido)titanium dichloride,
dimethylsilyl(cyclopentadienyl)(methylamido)titanium dimethyl,
dimethylsilyl(cyclopentadienyl)(phenylamido)titanium dichloride,
dimethylsilyl(cyclopentadienyl)(phenylamido)titanium dimethyl,
dimethylsilyl(cyclopentadienyl)(2-methyl-phenylamido)titanium dichloride,
dimethylsilyl(cyclopentadienyl)(2-methyl-phenylamido)titanium dimethyl,
dimethylsilyl(cyclopentadienyl)(3-methyl-phenylamido)titanium dichloride,
dimethylsilyl(cyclopentadienyl)(3-methyl-phenylamido)titanium dimethyl,
dimethylsilyl(cyclopentadienyl)(2,6-dimethylphenylamido)titanium dichloride,
dimethylsilyl(cyclopentadienyl)(2,6-dimethylphenylamido)titanium dimethyl,
dimethylsilyl(cyclopentadienyl)(3,5-dimethylphenylamido)titanium dichloride,
dimethylsilyl(cyclopentadienyl)(3,5-dimethylphenylamido)titanium dimethyl,
dimethylsilyl(cyclopentadienyl)(2,4,6-trimethylphenylamido)titanium dichloride,
dimethylsilyl(cyclopentadienyl)(2,4,6-trimethylphenylamido)titanium dimethyl,
dimethylsilyl(cyclopentadienyl)(2-isopropyl-phenylamido)titanium dichloride,
dimethylsilyl(cyclopentadienyl)(2-isopropyl-phenylamido)titanium dimethyl,
dimethylsilyl(cyclopentadienyl)(2,6-diisopropyl-phenylamido)titanium dimethyl,
dimethylsilyl(cyclopentadienyl)(2,6-diisopropyl-phenylamido)titanium dichloride,
dimethylsilyl(cyclopentadienyl)(2-t-butyl-phenylamido)titanium dimethyl,
dimethylsilyl(cyclopentadienyl)(2-t-butyl-phenylamido)titanium dichloride,
dimethylsilyl(cyclopentadienyl)(3-t-butyl-phenylamido)titanium dimethyl,
dimethylsilyl(cyclopentadienyl)(3-t-butyl-phenylamido)titanium dichloride,
dimethylsilyl(cyclopentadienyl)(2-ethylhexylamido)titanium dichloride,
dimethylsilyl(cyclopentadienyl)(2-ethylhexylamido)titanium dimethyl,
dimethylsilyl(cyclopentadienyl)(n-hexylamido)titanium dichloride,
dimethylsilyl(cyclopentadienyl)(n-hexylamido)titanium dimethyl,
dimethylsilyl(cyclopentadienyl)(n-pentylamido)titanium dichloride,
dimethylsilyl(cyclopentadienyl)(n-pentylamido)titanium dimethyl,
dimethylsilyl(cyclopentadienyl)(2-norbornylamido)titanium dichloride,
dimethylsilyl(cyclopentadienyl)(2-norbornylamido)titanium dimethyl,
diphenylsilyl(tetramethylcyclopentadienyl)(cyclododecylamido)titanium dichloride,
diphenylsilyl(tetramethylcyclopentadienyl)(cyclododecylamido)titanium dimethyl,
diphenylsilyl(tetramethylcyclopentadienyl)(cyclohexylamido)titanium dichloride,
diphenylsilyl(tetramethylcyclopentadienyl)(cyclohexylamido)titanium dimethyl,
diphenylsilyl(tetramethylcyclopentadienyl)(cyclopentylamido)titanium dichloride,
diphenylsilyl(tetramethylcyclopentadienyl)(cyclopentylamido)titanium dimethyl,
diphenylsilyl(tetramethylcyclopentadienyl)(n-butylamido)titanium dichloride,
diphenylsilyl(tetramethylcyclopentadienyl)(n-butylamido)titanium dimethyl,
diphenylsilyl(tetramethylcyclopentadienyl)(n-dodecylamido)titanium dichloride,
diphenylsilyl(tetramethylcyclopentadienyl)(n-dodecylamido)titanium dimethyl,
diphenylsilyl(tetramethylcyclopentadienyl)(n-propylamido)titanium dichloride,
diphenylsilyl(tetramethylcyclopentadienyl)(n-propylamido)titanium dimethyl,
diphenylsilyl(tetramethylcyclopentadienyl)(sec-butylamido)titanium dichloride,
diphenylsilyl(tetramethylcyclopentadienyl)(sec-butylamido)titanium dimethyl,
diphenylsilyl(tetramethylcyclopentadienyl)(ethylamido)titanium dichloride,
diphenylsilyl(tetramethylcyclopentadienyl)(ethylamido)titanium dimethyl,
diphenylsilyl(tetramethylcyclopentadienyl)(n-decylamido)titanium dichloride,
diphenylsilyl(tetramethylcyclopentadienyl)(n-decylamido)titanium dimethyl,
diphenylsilyl(tetramethylcyclopentadienyl)(benzylamido)titanium dichloride,
diphenylsilyl(tetramethylcyclopentadienyl)(benzylamido)titanium dimethyl,
diphenylsilyl(tetramethylcyclopentadienyl)(neopentylamido)titanium dichloride,
diphenylsilyl(tetramethylcyclopentadienyl)(neopentylamido)titanium dimethyl,
diphenylsilyl(tetramethylcyclopentadienyl)(methylamido)titanium dichloride, diphenylsilyl(tetramethylcyclopentadienyl)(methylamido)titanium dimethyl,
diphenylsilyl(tetramethylcyclopentadienyl)(phenylamido)titanium dichloride,
diphenylsilyl(tetramethylcyclopentadienyl)(phenylamido)titanium dimethyl,
diphenylsilyl(tetramethylcyclopentadienyl)(2-methyl-phenylamido)titanium dichloride,
diphenylsilyl(tetramethylcyclopentadienyl)(2-methyl-phenylamido)titanium dimethyl,
diphenylsilyl(tetramethylcyclopentadienyl)(3-methyl-phenylamido)titanium dichloride,
diphenylsilyl(tetramethylcyclopentadienyl)(3-methyl-phenylamido)titanium dimethyl,
diphenylsilyl(tetramethylcyclopentadienyl)(2,6-dimethylphenylamido)titanium dichloride,
diphenylsilyl(tetramethylcyclopentadienyl)(2,6-dimethylphenylamido)titanium dimethyl,
diphenylsilyl(tetramethylcyclopentadienyl)(3,5-dimethylphenylamido)titanium dichloride,
diphenylsilyl(tetramethylcyclopentadienyl)(3,5-dimethylphenylamido)titanium dimethyl,
diphenylsilyl(tetramethylcyclopentadienyl)(2,4,6-trimethylphenylamido)titanium dichloride,
diphenylsilyl(tetramethylcyclopentadienyl)(2,4,6-trimethylphenylamido)titanium dimethyl,
diphenylsilyl(tetramethylcyclopentadienyl)(2-isopropyl-phenylamido)titanium dichloride,
diphenylsilyl(tetramethylcyclopentadienyl)(2-isopropyl-phenylamido)titanium dimethyl,
diphenylsilyl(tetramethylcyclopentadienyl)(2,6-diisopropyl-phenylamido)titanium dimethyl,
diphenylsilyl(tetramethylcyclopentadienyl)(2,6-diisopropyl-phenylamido)titanium dichloride,
diphenylsilyl(tetramethylcyclopentadienyl)(2-t-butyl-phenylamido)titanium dimethyl,
diphenylsilyl(tetramethylcyclopentadienyl)(2-t-butyl-phenylamido)titanium dichloride,
diphenylsilyl(tetramethylcyclopentadienyl)(3-t-butyl-phenylamido)titanium dimethyl,
diphenylsilyl(tetramethylcyclopentadienyl)(3-t-butyl-phenylamido)titanium dichloride,
diphenylsilyl(tetramethylcyclopentadienyl)(2-ethylhexylamido)titanium dichloride,
diphenylsilyl(tetramethylcyclopentadienyl)(2-ethylhexylamido)titanium dimethyl,
diphenylsilyl(tetramethylcyclopentadienyl)(n-hexylamido)titanium dichloride,
diphenylsilyl(tetramethylcyclopentadienyl)(n-hexylamido)titanium dimethyl,
diphenylsilyl(tetramethylcyclopentadienyl)(n-pentylamido)titanium dichloride,
diphenylsilyl(tetramethylcyclopentadienyl)(n-pentylamido)titanium dimethyl,
diphenylsilyl(tetramethylcyclopentadienyl)(2-norbornylamido)titanium dichloride,
diphenylsilyl(tetramethylcyclopentadienyl)(2-norbornylamido)titanium dimethyl,
dimethylsilyl(fluorenyl)(cyclododecylamido)titanium dichloride,
dimethylsilyl(fluorenyl)(cyclododecylamido)titanium dimethyl,
dimethylsilyl(fluorenyl)(cyclohexylamido)titanium dichloride,
dimethylsilyl(fluorenyl)(cyclohexylamido)titanium dimethyl,
dimethylsilyl(fluorenyl)(cyclopentylamido)titanium dichloride,
dimethylsilyl(fluorenyl)(cyclopentylamido)titanium dimethyl,
dimethylsilyl(fluorenyl)(n-butylamido)titanium dichloride,
dimethylsilyl(fluorenyl)(n-butylamido)titanium dimethyl,
dimethylsilyl(fluorenyl)(n-dodecylamido)titanium dichloride,
dimethylsilyl(fluorenyl)(n-dodecylamido)titanium dimethyl,
dimethylsilyl(fluorenyl)(n-propylamido)titanium dichloride,
dimethylsilyl(fluorenyl)(n-propylamido)titanium dimethyl,
dimethylsilyl(fluorenyl)(sec-butylamido)titanium dichloride,
dimethylsilyl(fluorenyl)(sec-butylamido)titanium dimethyl,
dimethylsilyl(fluorenyl)(ethylamido)titanium dichloride,
dimethylsilyl(fluorenyl)(ethylamido)titanium dimethyl,
dimethylsilyl(fluorenyl)(n-decylamido)titanium dichloride,
dimethylsilyl(fluorenyl)(n-decylamido)titanium dimethyl,
dimethylsilyl(fluorenyl)(benzylamido)titanium dichloride,
dimethylsilyl(fluorenyl)(benzylamido)titanium dimethyl,
dimethylsilyl(fluorenyl)(neopentylamido)titanium dichloride,
dimethylsilyl(fluorenyl)(neopentylamido)titanium dimethyl,
dimethylsilyl(fluorenyl)(methylamido)titanium dichloride,
dimethylsilyl(fluorenyl)(methylamido)titanium dimethyl,
dimethylsilyl(fluorenyl)(phenylamido)titanium dichloride,
dimethylsilyl(fluorenyl)(phenylamido)titanium dimethyl,
dimethylsilyl(fluorenyl)(2-methyl-phenylamido)titanium dichloride,
dimethylsilyl(fluorenyl)(2-methyl-phenylamido)titanium dimethyl,
dimethylsilyl(fluorenyl)(3-methyl-phenylamido)titanium dichloride,
dimethylsilyl(fluorenyl)(3-methyl-phenylamido)titanium dimethyl,
dimethylsilyl(fluorenyl)(2,6-dimethylphenylamido)titanium dichloride,
dimethylsilyl(fluorenyl)(2,6-dimethylphenylamido)titanium dimethyl,
dimethylsilyl(fluorenyl)(3,5-dimethylphenylamido)titanium dichloride,
dimethylsilyl(fluorenyl)(3,5-dimethylphenylamido)titanium dimethyl,
dimethylsilyl(fluorenyl)(2,4,6-trimethylphenylamido)titanium dichloride,
dimethylsilyl(fluorenyl)(2,4,6-trimethylphenylamido)titanium dimethyl, dimethylsilyl(fluorenyl)(2-isopropyl-phenylamido)titanium dichloride,
dimethylsilyl(fluorenyl)(2-isopropyl-phenylamido)titanium dimethyl,
dimethylsilyl(fluorenyl)(2,6-diisopropyl-phenylamido)titanium dimethyl,
dimethylsilyl(fluorenyl)(2,6-diisopropyl-phenylamido)titanium dichloride,
dimethylsilyl(fluorenyl)(2-t-butyl-phenylamido)titanium dimethyl,
dimethylsilyl(fluorenyl)(2-t-butyl-phenylamido)titanium dichloride,
dimethylsilyl(fluorenyl)(3-t-butyl-phenylamido)titanium dimethyl,
dimethylsilyl(fluorenyl)(3-t-butyl-phenylamido)titanium dichloride,
dimethylsilyl(fluorenyl)(2-ethylhexylamido)titanium dichloride,
dimethylsilyl(fluorenyl)(2-ethylhexylamido)titanium dimethyl,
dimethylsilyl(fluorenyl)(n-hexylamido)titanium dichloride,
dimethylsilyl(fluorenyl)(n-hexylamido)titanium dimethyl,
dimethylsilyl(fluorenyl)(n-pentylamido)titanium dichloride,
dimethylsilyl(fluorenyl)(n-pentylamido)titanium dimethyl,
dimethylsilyl(fluorenyl)(2-norbornylamido)titanium dichloride,
dimethylsilyl(fluorenyl)(2-norbornylamido)titanium dimethyl,
diphenylsilyl(fluorenyl)(cyclododecylamido)titanium dichloride,
diphenylsilyl(fluorenyl)(cyclododecylamido)titanium dimethyl,
diphenylsilyl(fluorenyl)(cyclohexylamido)titanium dichloride,
diphenylsilyl(fluorenyl)(cyclohexylamido)titanium dimethyl,
diphenylsilyl(fluorenyl)(cyclopentylamido)titanium dichloride,
diphenylsilyl(fluorenyl)(cyclopentylamido)titanium dimethyl,
diphenylsilyl(fluorenyl)(n-butylamido)titanium dichloride,
diphenylsilyl(fluorenyl)(n-butylamido)titanium dimethyl,
diphenylsilyl(fluorenyl)(n-dodecylamido)titanium dichloride,
diphenylsilyl(fluorenyl)(n-dodecylamido)titanium dimethyl,
diphenylsilyl(fluorenyl)(n-propylamido)titanium dichloride,
diphenylsilyl(fluorenyl)(n-propylamido)titanium dimethyl,
diphenylsilyl(fluorenyl)(sec-butylamido)titanium dichloride,
diphenylsilyl(fluorenyl)(sec-butylamido)titanium dimethyl,
diphenylsilyl(fluorenyl)(ethylamido)titanium dichloride,
diphenylsilyl(fluorenyl)(ethylamido)titanium dimethyl,
diphenylsilyl(fluorenyl)(n-decylamido)titanium dichloride,
diphenylsilyl(fluorenyl)(n-decylamido)titanium dimethyl,
diphenylsilyl(fluorenyl)(benzylamido)titanium dichloride,
diphenylsilyl(fluorenyl)(benzylamido)titanium dimethyl,
diphenylsilyl(fluorenyl)(neopentylamido)titanium dichloride,
diphenylsilyl(fluorenyl)(neopentylamido)titanium dimethyl,
diphenylsilyl(fluorenyl)(methylamido)titanium dichloride,
diphenylsilyl(fluorenyl)(methylamido)titanium dimethyl,
diphenylsilyl(fluorenyl)(phenylamido)titanium dichloride,
diphenylsilyl(fluorenyl)(phenylamido)titanium dimethyl,
diphenylsilyl(fluorenyl)(2-methyl-phenylamido)titanium dichloride,
diphenylsilyl(fluorenyl)(2-methyl-phenylamido)titanium dimethyl,
diphenylsilyl(fluorenyl)(3-methyl-phenylamido)titanium dichloride,
diphenylsilyl(fluorenyl)(3-methyl-phenylamido)titanium dimethyl,
diphenylsilyl(fluorenyl)(2,6-dimethylphenylamido)titanium dichloride,
diphenylsilyl(fluorenyl)(2,6-dimethylphenylamido)titanium dimethyl,
diphenylsilyl(fluorenyl)(3,5-dimethylphenylamido)titanium dichloride,
diphenylsilyl(fluorenyl)(3,5-dimethylphenylamido)titanium dimethyl,
diphenylsilyl(fluorenyl)(2,4,6-trimethylphenylamido)titanium dichloride,
diphenylsilyl(fluorenyl)(2,4,6-trimethylphenylamido)titanium dimethyl,
diphenylsilyl(fluorenyl)(2-isopropyl-phenylamido)titanium dichloride,
diphenylsilyl(fluorenyl)(2-isopropyl-phenylamido)titanium dimethyl,
diphenylsilyl(fluorenyl)(2,6-diisopropyl-phenylamido)titanium dimethyl,
diphenylsilyl(fluorenyl)(2,6-diisopropyl-phenylamido)titanium dichloride,
diphenylsilyl(fluorenyl)(2-t-butyl-phenylamido)titanium dimethyl,
diphenylsilyl(fluorenyl)(2-t-butyl-phenylamido)titanium dichloride,
diphenylsilyl(fluorenyl)(3-t-butyl-phenylamido)titanium dimethyl,
diphenylsilyl(fluorenyl)(3-t-butyl-phenylamido)titanium dichloride,
diphenylsilyl(fluorenyl)(2-ethylhexylamido)titanium dichloride,
diphenylsilyl(fluorenyl)(2-ethylhexylamido)titanium dimethyl,
diphenylsilyl(fluorenyl)(n-hexylamido)titanium dichloride,
diphenylsilyl(fluorenyl)(n-hexylamido)titanium dimethyl,
diphenylsilyl(fluorenyl)(n-pentylamido)titanium dichloride, diphenylsilyl(fluorenyl)(n-pentylamido)titanium dimethyl,
diphenylsilyl(fluorenyl)(2-norbornylamido)titanium dichloride,
diphenylsilyl(fluorenyl)(2-norbornylamido)titanium dimethyl,
dimethylsilyl(indenyl)(cyclododecylamido)titanium dichloride,
dimethylsilyl(indenyl)(cyclododecylamido)titanium dimethyl,
dimethylsilyl(indenyl)(cyclohexylamido)titanium dichloride,
dimethylsilyl(indenyl)(cyclohexylamido)titanium dimethyl,
dimethylsilyl(indenyl)(cyclopentylamido)titanium dichloride,
dimethylsilyl(indenyl)(cyclopentylamido)titanium dimethyl,
dimethylsilyl(indenyl)(n-butylamido)titanium dichloride,
dimethylsilyl(indenyl)(n-butylamido)titanium dimethyl,
dimethylsilyl(indenyl)(n-dodecylamido)titanium dichloride,
dimethylsilyl(indenyl)(n-dodecylamido)titanium dimethyl,
dimethylsilyl(indenyl)(n-propylamido)titanium dichloride,
dimethylsilyl(indenyl)(n-propylamido)titanium dimethyl,
dimethylsilyl(indenyl)(sec-butylamido)titanium dichloride,
dimethylsilyl(indenyl)(sec-butylamido)titanium dimethyl,
dimethylsilyl(indenyl)(ethylamido)titanium dichloride,
dimethylsilyl(indenyl)(ethylamido)titanium dimethyl,
dimethylsilyl(indenyl)(n-decylamido)titanium dichloride,
dimethylsilyl(indenyl)(n-decylamido)titanium dimethyl,
dimethylsilyl(indenyl)(benzylamido)titanium dichloride,
dimethylsilyl(indenyl)(benzylamido)titanium dimethyl,
dimethylsilyl(indenyl)(neopentylamido)titanium dichloride,
dimethylsilyl(indenyl)(neopentylamido)titanium dimethyl,
dimethylsilyl(indenyl)(methylamido)titanium dichloride,
dimethylsilyl(indenyl)(methylamido)titanium dimethyl,
dimethylsilyl(indenyl)(phenylamido)titanium dichloride,
dimethylsilyl(indenyl)(phenylamido)titanium dimethyl,
dimethylsilyl(indenyl)(2-methyl-phenylamido)titanium dichloride,
dimethylsilyl(indenyl)(2-methyl-phenylamido)titanium dimethyl,
dimethylsilyl(indenyl)(3-methyl-phenylamido)titanium dichloride,
dimethylsilyl(indenyl)(3-methyl-phenylamido)titanium dimethyl,
dimethylsilyl(indenyl)(2,6-dimethylphenylamido) titanium dichloride,
dimethylsilyl(indenyl)(2,6-dimethylphenylamido) titanium dimethyl,
dimethylsilyl(indenyl)(3,5-dimethylphenylamido) titanium dichloride,
dimethylsilyl(indenyl)(3,5-dimethylphenylamido) titanium dimethyl,
dimethylsilyl(indenyl)(2,4,6-trimethylphenylamido) titanium dichloride,
dimethylsilyl(indenyl)(2,4,6-trimethylphenylamido) titanium dimethyl,
dimethylsilyl(indenyl)(2-isopropyl-phenylamido) titanium dichloride,
dimethylsilyl(indenyl)(2-isopropyl-phenylamido) titanium dimethyl,
dimethylsilyl(indenyl)(2,6-diisopropyl-phenylamido) titanium dimethyl,
dimethylsilyl(indenyl)(2,6-diisopropyl-phenylamido) titanium dichloride,
dimethylsilyl(indenyl)(2-t-butyl-phenylamido)titanium dimethyl,
dimethylsilyl(indenyl)(2-t-butyl-phenylamido)titanium dichloride,
dimethylsilyl(indenyl)(3-t-butyl-phenylamido)titanium dimethyl,
dimethylsilyl(indenyl)(3-t-butyl-phenylamido)titanium dichloride,
dimethylsilyl(indenyl)(2-ethylhexylamido)titanium dichloride,
dimethylsilyl(indenyl)(2-ethylhexylamido)titanium dimethyl,
dimethylsilyl(indenyl)(n-hexylamido)titanium dichloride,
dimethylsilyl(indenyl)(n-hexylamido)titanium dimethyl,
dimethylsilyl(indenyl)(n-pentylamido)titanium dichloride,
dimethylsilyl(indenyl)(n-pentylamido)titanium dimethyl,
dimethylsilyl(indenyl)(2-norbornylamido)titanium dichloride,
dimethylsilyl(indenyl)(2-norbornylamido)titanium dimethyl,
diphenylsilyl(indenyl)(cyclododecylamido)titanium dichloride,
diphenylsilyl(indenyl)(cyclododecylamido)titanium dimethyl,
diphenylsilyl(indenyl)(cyclohexylamido)titanium dichloride,
diphenylsilyl(indenyl)(cyclohexylamido)titanium dimethyl,
diphenylsilyl(indenyl)(cyclopentylamido)titanium dichloride,
diphenylsilyl(indenyl)(cyclopentylamido)titanium dimethyl,
diphenylsilyl(indenyl)(n-butylamido)titanium dichloride,
diphenylsilyl(indenyl)(n-butylamido)titanium dimethyl,
diphenylsilyl(indenyl)(n-dodecylamido)titanium dichloride,
diphenylsilyl(indenyl)(n-dodecylamido)titanium dimethyl,
diphenylsilyl(indenyl)(n-propylamido)titanium dichloride,
diphenylsilyl(indenyl)(n-propylamido)titanium dimethyl,
diphenylsilyl(indenyl)(sec-butylamido)titanium dichloride,
diphenylsilyl(indenyl)(sec-butylamido)titanium dimethyl,
diphenylsilyl(indenyl)(ethylamido)titanium dichloride,
diphenylsilyl(indenyl)(ethylamido)titanium dimethyl,
diphenylsilyl(indenyl)(n-decylamido)titanium dichloride, diphenylsilyl(indenyl)(n-decylamido)titanium dimethyl,
diphenylsilyl(indenyl)(benzylamido)titanium dichloride,
diphenylsilyl(indenyl)(benzylamido)titanium dimethyl,
diphenylsilyl(indenyl)(neopentylamido)titanium dichloride,
diphenylsilyl(indenyl)(neopentylamido)titanium dimethyl,
diphenylsilyl(indenyl)(methylamido)titanium dichloride,
diphenylsilyl(indenyl)(methylamido)titanium dimethyl,
diphenylsilyl(indenyl)(phenylamido)titanium dichloride,
diphenylsilyl(indenyl)(phenylamido)titanium dimethyl,
diphenylsilyl(indenyl)(2-methylphenylamido)titanium dichloride,
diphenylsilyl(indenyl)(2-methylphenylamido)titanium dimethyl,
diphenylsilyl(indenyl)(3-methylphenylamido)titanium dichloride,
diphenylsilyl(indenyl)(3-methylphenylamido)titanium dimethyl,
diphenylsilyl(indenyl)(2,6-dimethylphenylamido)titanium dichloride,
diphenylsilyl(indenyl)(2,6-dimethylphenylamido)titanium dimethyl,
diphenylsilyl(indenyl)(3,5-dimethylphenylamido)titanium dichloride,
diphenylsilyl(indenyl)(3,5-dimethylphenylamido)titanium dimethyl,
diphenylsilyl(indenyl)(2,4,6-trimethylphenylamido)titanium dichloride,
diphenylsilyl(indenyl)(2,4,6-trimethylphenylamido)titanium dimethyl,
diphenylsilyl(indenyl)(2-isopropylphenylamido)titanium dichloride,
diphenylsilyl(indenyl)(2-isopropylphenylamido)titanium dimethyl,
diphenylsilyl(indenyl)(2,6-diisopropylphenylamido)titanium dimethyl,
diphenylsilyl(indenyl)(2,6-diisopropylphenylamido)titanium dichloride,
diphenylsilyl(indenyl)(2-t-butylphenylamido)titanium dimethyl,
diphenylsilyl(indenyl)(2-t-butylphenylamido)titanium dichloride,
diphenylsilyl(indenyl)(3-t-butyl-phenylamido)titanium dimethyl,
diphenylsilyl(indenyl)(3-t-butyl-phenylamido)titanium dichloride,
diphenylsilyl(indenyl)(2-ethylhexylamido)titanium dichloride,
diphenylsilyl(indenyl)(2-ethylhexylamido)titanium dimethyl,
diphenylsilyl(indenyl)(n-hexylamido)titanium dichloride,
diphenylsilyl(indenyl)(n-hexylamido)titanium dimethyl,
diphenylsilyl(indenyl)(n-pentylamido)titanium dichloride,
diphenylsilyl(indenyl)(n-pentylamido)titanium dimethyl,
diphenylsilyl(indenyl)(2-norbornylamido)titanium dichloride,
diphenylsilyl(indenyl)(2-norbornylamido)titanium dimethyl,
dimethylsilyl(tetramethylcyclopentadienyl)(cyclododecylamido)zirconium dichloride,
dimethylsilyl(tetramethylcyclopentadienyl)(cyclododecylamido)zirconium dimethyl,
dimethylsilyl(tetramethylcyclopentadienyl)(cyclohexylamido)zirconium dichloride,
dimethylsilyl(tetramethylcyclopentadienyl)(cyclohexylamido)zirconium dimethyl,
dimethylsilyl(tetramethylcyclopentadienyl)(cyclopentylamido)zirconium dichloride,
dimethylsilyl(tetramethylcyclopentadienyl)(cyclopentylamido)zirconium dimethyl,
dimethylsilyl(tetramethylcyclopentadienyl)(n-butylamido)zirconium dichloride,
dimethylsilyl(tetramethylcyclopentadienyl)(n-butylamido)zirconium dimethyl,
dimethylsilyl(tetramethylcyclopentadienyl)(n-dodecylamido)zirconium dichloride,
dimethylsilyl(tetramethylcyclopentadienyl)(n-dodecylamido)zirconium dimethyl,
dimethylsilyl(tetramethylcyclopentadienyl)(n-propylamido)zirconium dichloride,
dimethylsilyl(tetramethylcyclopentadienyl)(n-propylamido)zirconium dimethyl,
dimethylsilyl(tetramethylcyclopentadienyl)(sec-butylamido)zirconium dichloride,
dimethylsilyl(tetramethylcyclopentadienyl)(sec-butylamido)zirconium dimethyl,
dimethylsilyl(tetramethylcyclopentadienyl)(ethylamido)zirconium dichloride,
dimethylsilyl(tetramethylcyclopentadienyl)(ethylamido)zirconium dimethyl,
dimethylsilyl(tetramethylcyclopentadienyl)(n-decylamido)zirconium dichloride,
dimethylsilyl(tetramethylcyclopentadienyl)(n-decylamido)zirconium dimethyl,
dimethylsilyl(tetramethylcyclopentadienyl)(benzylamido)zirconium dichloride,
dimethylsilyl(tetramethylcyclopentadienyl)(benzylamido)zirconium dimethyl,
dimethylsilyl(tetramethylcyclopentadienyl)(neopentylamido)zirconium dichloride,
dimethylsilyl(tetramethylcyclopentadienyl)(neopentylamido)zirconium dimethyl,
dimethylsilyl(tetramethylcyclopentadienyl)(methylamido)zirconium dichloride,
dimethylsilyl(tetramethylcyclopentadienyl)(methylamido)zirconium dimethyl,
dimethylsilyl(tetramethylcyclopentadienyl)(phenylamido)zirconium dichloride,
dimethylsilyl(tetramethylcyclopentadienyl)(phenylamido)zirconium dimethyl,
dimethylsilyl(tetramethylcyclopentadienyl)(2-methyl-phenylamido)zirconium dichloride,
dimethylsilyl(tetramethylcyclopentadienyl)(2-methyl-phenylamido)zirconium dimethyl,
dimethylsilyl(tetramethylcyclopentadienyl)(3-methyl-phenylamido)zirconium dichloride,
dimethylsilyl(tetramethylcyclopentadienyl)(3-methyl-phenylamido)zirconium dimethyl,
dimethylsilyl(tetramethylcyclopentadienyl)(2,6-dimethylphenylamido)zirconium dichloride,
dimethylsilyl(tetramethylcyclopentadienyl)(2,6-dimethylphenylamido)zirconium dimethyl, dimethylsilyl(tetramethylcyclopentadienyl)(3,5-dimethylphenylamido)zirconium dichloride,
dimethylsilyl(tetramethylcyclopentadienyl)(3,5-dimethylphenylamido)zirconium dimethyl,
dimethylsilyl(tetramethylcyclopentadienyl)(2,4,6-trimethylphenylamido)zirconium dichloride,
dimethylsilyl(tetramethylcyclopentadienyl)(2,4,6-trimethylphenylamido)zirconium dimethyl,
dimethylsilyl(tetramethylcyclopentadienyl)(2-isopropyl-phenylamido)zirconium dichloride,
dimethylsilyl(tetramethylcyclopentadienyl)(2-isopropyl-phenylamido)zirconium dimethyl,
dimethylsilyl(tetramethylcyclopentadienyl)(2,6-diisopropyl-phenylamido)zirconium dimethyl,
dimethylsilyl(tetramethylcyclopentadienyl)(2,6-diisopropyl-phenylamido)zirconium dichloride,
dimethylsilyl(tetramethylcyclopentadienyl)(2-t-butyl-phenylamido)zirconium dimethyl,
dimethylsilyl(tetramethylcyclopentadienyl)(2-t-butyl-phenylamido)zirconium dichloride,
dimethylsilyl(tetramethylcyclopentadienyl)(3-t-butyl-phenylamido)zirconium dimethyl,
dimethylsilyl(tetramethylcyclopentadienyl)(3-t-butyl-phenylamido)zirconium dichloride,
dimethylsilyl(tetramethylcyclopentadienyl)(2-ethylhexylamido)zirconium dichloride,
dimethylsilyl(tetramethylcyclopentadienyl)(2-ethylhexylamido)zirconium dimethyl,
dimethylsilyl(tetramethylcyclopentadienyl)(n-hexylamido)zirconium dichloride,
dimethylsilyl(tetramethylcyclopentadienyl)(n-hexylamido)zirconium dimethyl,
dimethylsilyl(tetramethylcyclopentadienyl)(n-pentylamido)zirconium dichloride,
dimethylsilyl(tetramethylcyclopentadienyl)(n-pentylamido)zirconium dimethyl,
dimethylsilyl(tetramethylcyclopentadienyl)(2-norbornylamido)zirconium dichloride,
dimethylsilyl(tetramethylcyclopentadienyl)(2-norbornylamido)zirconium dimethyl,
dimethylsilyl(3-methylcyclopentadienyl)(cyclododecylamido)zirconium dichloride,
dimethylsilyl(3-methylcyclopentadienyl)(cyclododecylamido)zirconium dimethyl,
dimethylsilyl(3-methylcyclopentadienyl)(cyclohexylamido)zirconium dichloride,
dimethylsilyl(3-methylcyclopentadienyl)(cyclohexylamido)zirconium dimethyl,
dimethylsilyl(3-methylcyclopentadienyl)(cyclopentylamido)zirconium dichloride,
dimethylsilyl(3-methylcyclopentadienyl)(cyclopentylamido)zirconium dimethyl,
dimethylsilyl(3-methylcyclopentadienyl)(n-butylamido)zirconium dichloride,
dimethylsilyl(3-methylcyclopentadienyl)(n-butylamido)zirconium dimethyl,
dimethylsilyl(3-methylcyclopentadienyl)(n-dodecylamido)zirconium dichloride,
dimethylsilyl(3-methylcyclopentadienyl)(n-dodecylamido)zirconium dimethyl,
dimethylsilyl(3-methylcyclopentadienyl)(n-propylamido)zirconium dichloride,
dimethylsilyl(3-methylcyclopentadienyl)(n-propylamido)zirconium dimethyl,
dimethylsilyl(3-methylcyclopentadienyl)(sec-butylamido)zirconium dichloride,
dimethylsilyl(3-methylcyclopentadienyl)(sec-butylamido)zirconium dimethyl,
dimethylsilyl(3-methylcyclopentadienyl)(ethylamido)zirconium dichloride,
dimethylsilyl(3-methylcyclopentadienyl)(ethylamido)zirconium dimethyl,
dimethylsilyl(3-methylcyclopentadienyl)(n-decylamido)zirconium dichloride,
dimethylsilyl(3-methylcyclopentadienyl)(n-decylamido)zirconium dimethyl,
dimethylsilyl(3-methylcyclopentadienyl)(benzylamido)zirconium dichloride,
dimethylsilyl(3-methylcyclopentadienyl)(benzylamido)zirconium dimethyl,
dimethylsilyl(3-methylcyclopentadienyl)(neopentylamido)zirconium dichloride,
dimethylsilyl(3-methylcyclopentadienyl)(neopentylamido)zirconium dimethyl,
dimethylsilyl(3-methylcyclopentadienyl)(methylamido)zirconium dichloride,
dimethylsilyl(3-methylcyclopentadienyl)(methylamido)zirconium dimethyl,
dimethylsilyl(3-methylcyclopentadienyl)(phenylamido)zirconium dichloride,
dimethylsilyl(3-methylcyclopentadienyl)(phenylamido)zirconium dimethyl,
dimethylsilyl(3-methylcyclopentadienyl)(2-methyl-phenylamido)zirconium dichloride,
dimethylsilyl(3-methylcyclopentadienyl)(2-methyl-phenylamido)zirconium dimethyl,
dimethylsilyl(3-methylcyclopentadienyl)(3-methyl-phenylamido)zirconium dichloride,
dimethylsilyl(3-methylcyclopentadienyl)(3-methyl-phenylamido)zirconium dimethyl,
dimethylsilyl(3-methylcyclopentadienyl)(2,6-dimethylphenylamido)zirconium dichloride,
dimethylsilyl(3-methylcyclopentadienyl)(2,6-dimethylphenylamido)zirconium dimethyl,
dimethylsilyl(3-methylcyclopentadienyl)(3,5-dimethylphenylamido)zirconium dichloride,
dimethylsilyl(3-methylcyclopentadienyl)(3,5-dimethylphenylamido)zirconium dimethyl,
dimethylsilyl(3-methylcyclopentadienyl)(2-isopropyl-phenylamido)zirconium dichloride,
dimethylsilyl(3-methylcyclopentadienyl)(2-isopropyl-phenylamido)zirconium dimethyl,
dimethylsilyl(3-methylcyclopentadienyl)(2-isopropyl-phenylamido)zirconium dichloride,
dimethylsilyl(3-methylcyclopentadienyl)(2,6-diisopropyl-phenylamido)zirconium dimethyl,
dimethylsilyl(3-methylcyclopentadienyl)(2,6-diisopropyl-phenylamido)zirconium dichloride,
dimethylsilyl(3-methylcyclopentadienyl)(2-t-butyl-phenylamido)zirconium dimethyl,
dimethylsilyl(3-methylcyclopentadienyl)(2-t-butyl-phenylamido)zirconium dichloride,
dimethylsilyl(3-methylcyclopentadienyl)(3-t-butyl-phenylamido)zirconium dimethyl, dimethylsilyl(3-methylcyclopentadienyl)(3-t-butyl-phenylamido)zirconium dichloride,
dimethylsilyl(3-methylcyclopentadienyl)(2-ethylhexylamido)zirconium dichloride,
dimethylsilyl(3-methylcyclopentadienyl)(2-ethylhexylamido)zirconium dimethyl,
dimethylsilyl(3-methylcyclopentadienyl)(n-hexylamido)zirconium dichloride,
dimethylsilyl(3-methylcyclopentadienyl)(n-hexylamido)zirconium dimethyl,
dimethylsilyl(3-methylcyclopentadienyl)(n-pentylamido)zirconium dichloride,
dimethylsilyl(3-methylcyclopentadienyl)(n-pentylamido)zirconium dimethyl,
dimethylsilyl(3-methylcyclopentadienyl)(2-norbornylamido)zirconium dichloride,
dimethylsilyl(3-methylcyclopentadienyl)(2-norbornylamido)zirconium dimethyl,
dimethylsilyl(cyclopentadienyl)(cyclododecylamido)zirconium dichloride,
dimethylsilyl(cyclopentadienyl)(cyclododecylamido)zirconium dimethyl,
dimethylsilyl(cyclopentadienyl)(cyclohexylamido)zirconium dichloride,
dimethylsilyl(cyclopentadienyl)(cyclohexylamido)zirconium dimethyl,
dimethylsilyl(cyclopentadienyl)(cyclopentylamido)zirconium dichloride,
dimethylsilyl(cyclopentadienyl)(cyclopentylamido)zirconium dimethyl,
dimethylsilyl(cyclopentadienyl)(n-butylamido)zirconium dichloride,
dimethylsilyl(cyclopentadienyl)(n-butylamido)zirconium dimethyl,
dimethylsilyl(cyclopentadienyl)(n-dodecylamido)zirconium chloride,
dimethylsilyl(cyclopentadienyl)(n-dodecylamido)zirconium dimethyl,
dimethylsilyl(cyclopentadienyl)(n-propylamido)zirconium dichloride,
dimethylsilyl(cyclopentadienyl)(n-propylamido)zirconium dimethyl,
dimethylsilyl(cyclopentadienyl)(sec-butylamido)zirconium dichloride,
dimethylsilyl(cyclopentadienyl)(sec-butylamido)zirconium dimethyl,
dimethylsilyl(cyclopentadienyl)(ethylamido)zirconium dichloride,
dimethylsilyl(cyclopentadienyl)(ethylamido)zirconium dimethyl,
dimethylsilyl(cyclopentadienyl)(n-decylamido)zirconium dichloride,
dimethylsilyl(cyclopentadienyl)(n-decylamido)zirconium dimethyl,
dimethylsilyl(cyclopentadienyl)(benzylamido)zirconium dichloride,
dimethylsilyl(cyclopentadienyl)(benzylamido)zirconium dimethyl,
dimethylsilyl(cyclopentadienyl)(neopentylamido)zirconium dichloride,
dimethylsilyl(cyclopentadienyl)(neopentylamido)zirconium dimethyl,
dimethylsilyl(cyclopentadienyl)(methylamido)zirconium dichloride,
dimethylsilyl(cyclopentadienyl)(methylamido)zirconium dimethyl,
dimethylsilyl(cyclopentadienyl)(phenylamido)zirconium dichloride,
dimethylsilyl(cyclopentadienyl)(phenylamido)zirconium dimethyl,
dimethylsilyl(cyclopentadienyl)(2-methyl-phenylamido)zirconium dichloride,
dimethylsilyl(cyclopentadienyl)(2-methyl-phenylamido)zirconium dimethyl,
dimethylsilyl(cyclopentadienyl)(3-methyl-phenylamido)zirconium dichloride,
dimethylsilyl(cyclopentadienyl)(3-methyl-phenylamido)zirconium dimethyl,
dimethylsilyl(cyclopentadienyl)(2,6-dimethylphenylamido)zirconium dichloride,
dimethylsilyl(cyclopentadienyl)(2,6-dimethylphenylamido)zirconium dimethyl,
dimethylsilyl(cyclopentadienyl)(3,5-dimethylphenylamido)zirconium dichloride,
dimethylsilyl(cyclopentadienyl)(3,5-dimethylphenylamido)zirconium dimethyl,
dimethylsilyl(cyclopentadienyl)(2,4,6-trimethylphenylamido)zirconium dichloride,
dimethylsilyl(cyclopentadienyl)(2,4,6-trimethylphenylamido)zirconium dimethyl,
dimethylsilyl(cyclopentadienyl)(2-isopropyl-phenylamido)zirconium dichloride,
dimethylsilyl(cyclopentadienyl)(2-isopropyl-phenylamido)zirconium dimethyl,
dimethylsilyl(cyclopentadienyl)(2,6-diisopropyl-phenylamido)zirconium dimethyl,
dimethylsilyl(cyclopentadienyl)(2,6-diisopropyl-phenylamido)zirconium dichloride,
dimethylsilyl(cyclopentadienyl)(2-t-butyl-phenylamido)zirconium dimethyl,
dimethylsilyl(cyclopentadienyl)(2-t-butyl-phenylamido)zirconium dichloride,
dimethylsilyl(cyclopentadienyl)(3-t-butyl-phenylamido)zirconium dimethyl,
dimethylsilyl(cyclopentadienyl)(3-t-butyl-phenylamido)zirconium dichloride,
dimethylsilyl(cyclopentadienyl)(2-ethylhexylamido)zirconium dichloride,
dimethylsilyl(cyclopentadienyl)(2-ethylhexylamido)zirconium dimethyl,
dimethylsilyl(cyclopentadienyl)(n-hexylamido)zirconium dichloride,
dimethylsilyl(cyclopentadienyl)(n-hexylamido)zirconium dimethyl,
dimethylsilyl(cyclopentadienyl)(n-pentylamido)zirconium dichloride,
dimethylsilyl(cyclopentadienyl)(n-pentylamido)zirconium dimethyl,
dimethylsilyl(cyclopentadienyl)(2-norbornylamido)zirconium dichloride,
dimethylsilyl(cyclopentadienyl)(2-norbornylamido)zirconium dimethyl,
diphenylsilyl(tetramethylcyclopentadienyl)(cyclododecylamido)zirconium dichloride, diphenylsilyl(tetramethylcyclopentadienyl)(cyclododecylamido)zirconium dimethyl,
diphenylsilyl(tetramethylcyclopentadienyl)(cyclohexylamido)zirconium dichloride,
diphenylsilyl(tetramethylcyclopentadienyl)(cyclohexylamido)zirconium dimethyl,
diphenylsilyl(tetramethylcyclopentadienyl)(cyclopentylamido)zirconium dichloride,
diphenylsilyl(tetramethylcyclopentadienyl)(cyclopentylamido)zirconium dimethyl,
diphenylsilyl(tetramethylcyclopentadienyl)(n-butylamido)zirconium dichloride,
diphenylsilyl(tetramethylcyclopentadienyl)(n-butylamido)zirconium dimethyl,
diphenylsilyl(tetramethylcyclopentadienyl)(n-dodecylamido)zirconium dichloride,
diphenylsilyl(tetramethylcyclopentadienyl)(n-dodecylamido)zirconium dimethyl,
diphenylsilyl(tetramethylcyclopentadienyl)(n-propylamido)zirconium dichloride,
diphenylsilyl(tetramethylcyclopentadienyl)(n-propylamido)zirconium dimethyl,
diphenylsilyl(tetramethylcyclopentadienyl)(sec-butylamido)zirconium dichloride,
diphenylsilyl(tetramethylcyclopentadienyl)(sec-butylamido)zirconium dimethyl,
diphenylsilyl(tetramethylcyclopentadienyl)(ethylamido)zirconium dichloride,
diphenylsilyl(tetramethylcyclopentadienyl)(ethylamido)zirconium dimethyl,
diphenylsilyl(tetramethylcyclopentadienyl)(n-decylamido)zirconium dichloride,
diphenylsilyl(tetramethylcyclopentadienyl)(n-decylamido)zirconium dimethyl,
diphenylsilyl(tetramethylcyclopentadienyl)(benzylamido)zirconium dichloride,
diphenylsilyl(tetramethylcyclopentadienyl)(benzylamido)zirconium dimethyl,
diphenylsilyl(tetramethylcyclopentadienyl)(neopentylamido)zirconium dichloride,
diphenylsilyl(tetramethylcyclopentadienyl)(neopentylamido)zirconium dimethyl,
diphenylsilyl(tetramethylcyclopentadienyl)(methylamido)zirconium dichloride,
diphenylsilyl(tetramethylcyclopentadienyl)(methylamido)zirconium dimethyl,
diphenylsilyl(tetramethylcyclopentadienyl)(phenylamido)zirconium dichloride,
diphenylsilyl(tetramethylcyclopentadienyl)(phenylamido)zirconium dimethyl,
diphenylsilyl(tetramethylcyclopentadienyl)(2-methyl-phenylamido)zirconium dichloride,
diphenylsilyl(tetramethylcyclopentadienyl)(2-methyl-phenylamido)zirconium dimethyl,
diphenylsilyl(tetramethylcyclopentadienyl)(3-methyl-phenylamido)zirconium dichloride,
diphenylsilyl(tetramethylcyclopentadienyl)(3-methyl-phenylamido)zirconium dimethyl,
diphenylsilyl(tetramethylcyclopentadienyl)(2,6-dimethylphenylamido)zirconium dichloride,
diphenylsilyl(tetramethylcyclopentadienyl)(2,6-dimethylphenylamido)zirconium dimethyl,
diphenylsilyl(tetramethylcyclopentadienyl)(3,5-dimethylphenylamido)zirconium dichloride,
diphenylsilyl(tetramethylcyclopentadienyl)(3,5-dimethylphenylamido)zirconium dimethyl,
diphenylsilyl(tetramethylcyclopentadienyl)(2,4,6-trimethylphenylamido)zirconium dichloride,
diphenylsilyl(tetramethylcyclopentadienyl)(2,4,6-trimethylphenylamido)zirconium dimethyl,
diphenylsilyl(tetramethylcyclopentadienyl)(2-isopropyl-phenylamido)zirconium dichloride,
diphenylsilyl(tetramethylcyclopentadienyl)(2-isopropyl-phenylamido)zirconium dimethyl,
diphenylsilyl(tetramethylcyclopentadienyl)(2,6-diisopropyl-phenylamido)zirconium dimethyl,
diphenylsilyl(tetramethylcyclopentadienyl)(2,6-diisopropyl-phenylamido)zirconium dichloride,
diphenylsilyl(tetramethylcyclopentadienyl)(2-t-butyl-phenylamido)zirconium dimethyl,
diphenylsilyl(tetramethylcyclopentadienyl)(2-t-butyl-phenylamido)zirconium dichloride,
diphenylsilyl(tetramethylcyclopentadienyl)(3-t-butyl-phenylamido)zirconium dimethyl,
diphenylsilyl(tetramethylcyclopentadienyl)(3-t-butyl-phenylamido)zirconium dichloride,
diphenylsilyl(tetramethylcyclopentadienyl)(2-ethylhexylamido)zirconium dichloride,
diphenylsilyl(tetramethylcyclopentadienyl)(2-ethylhexylamido)zirconium dimethyl,
diphenylsilyl(tetramethylcyclopentadienyl)(n-hexylamido)zirconium dichloride,
diphenylsilyl(tetramethylcyclopentadienyl)(n-hexylamido)zirconium dimethyl,
diphenylsilyl(tetramethylcyclopentadienyl)(n-pentylamido)zirconium dichloride,
diphenylsilyl(tetramethylcyclopentadienyl)(n-pentylamido)zirconium dimethyl,
diphenylsilyl(tetramethylcyclopentadienyl)(2-norbornylamido)zirconium dichloride,
diphenylsilyl(tetramethylcyclopentadienyl)(2-norbornylamido)zirconium dimethyl,
dimethylsilyl(fluorenyl)(cyclododecylamido)zirconium dichloride,
dimethylsilyl(fluorenyl)(cyclododecylamido)zirconium dimethyl,
dimethylsilyl(fluorenyl)(cyclohexylamido)zirconium dichloride,
dimethylsilyl(fluorenyl)(cyclohexylamido)zirconium dimethyl,
dimethylsilyl(fluorenyl)(cyclopentylamido)zirconium dichloride,
dimethylsilyl(fluorenyl)(cyclopentylamido)zirconium dimethyl,
dimethylsilyl(fluorenyl)(n-butylamido)zirconium dichloride,
dimethylsilyl(fluorenyl)(n-butylamido)zirconium dimethyl,
dimethylsilyl(fluorenyl)(n-dodecylamido)zirconium dichloride,
dimethylsilyl(fluorenyl)(n-dodecylamido)zirconium dimethyl,
dimethylsilyl(fluorenyl)(n-propylamido)zirconium dichloride, dimethylsilyl(fluorenyl)(n-propylamido)zirconium dimethyl,
dimethylsilyl(fluorenyl)(sec-butylamido)zirconium dichloride,
dimethylsilyl(fluorenyl)(sec-butylamido)zirconium dimethyl,
dimethylsilyl(fluorenyl)(ethylamido)zirconium dichloride,
dimethylsilyl(fluorenyl)(ethylamido)zirconium dimethyl,
dimethylsilyl(fluorenyl)(n-decylamido)zirconium dichloride,
dimethylsilyl(fluorenyl)(n-decylamido)zirconium dimethyl,
dimethylsilyl(fluorenyl)(benzylamido)zirconium dichloride,
dimethylsilyl(fluorenyl)(benzylamido)zirconium dimethyl,
dimethylsilyl(fluorenyl)(neopentylamido)zirconium dichloride,
dimethylsilyl(fluorenyl)(neopentylamido)zirconium dimethyl,
dimethylsilyl(fluorenyl)(methylamido)zirconium dichloride,
dimethylsilyl(fluorenyl)(methylamido)zirconium dimethyl,
dimethylsilyl(fluorenyl)(phenylamido)zirconium dichloride,
dimethylsilyl(fluorenyl)(phenylamido)zirconium dimethyl,
dimethylsilyl(fluorenyl)(2-methyl-phenylamido)zirconium dichloride,
dimethylsilyl(fluorenyl)(2-methyl-phenylamido)zirconium dimethyl,
dimethylsilyl(fluorenyl)(3-methyl-phenylamido)zirconium dichloride,
dimethylsilyl(fluorenyl)(3-methyl-phenylamido)zirconium dimethyl,
dimethylsilyl(fluorenyl)(2,6-dimethylphenylamido)zirconium dichloride,
dimethylsilyl(fluorenyl)(2,6-dimethylphenylamido)zirconium dimethyl,
dimethylsilyl(fluorenyl)(3,5-dimethylphenylamido)zirconium dichloride,
dimethylsilyl(fluorenyl)(3,5-dimethylphenylamido)zirconium dimethyl,
dimethylsilyl(fluorenyl)(2,4,6-trimethylphenylamido)zirconium dichloride,
dimethylsilyl(fluorenyl)(2,4,6-trimethylphenylamido)zirconium dimethyl,
dimethylsilyl(fluorenyl)(2-isopropyl-phenylamido)zirconium dichloride,
dimethylsilyl(fluorenyl)(2-isopropyl-phenylamido)zirconium dimethyl,
dimethylsilyl(fluorenyl)(2,6-diisopropyl-phenylamido)zirconium dimethyl,
dimethylsilyl(fluorenyl)(2,6-diisopropyl-phenylamido)zirconium dichloride,
dimethylsilyl(fluorenyl)(2-t-butyl-phenylamido)zirconium dimethyl,
dimethylsilyl(fluorenyl)(2-t-butyl-phenylamido)zirconium dichloride,
dimethylsilyl(fluorenyl)(3-t-butyl-phenylamido)zirconium dimethyl,
dimethylsilyl(fluorenyl)(3-t-butyl-phenylamido)zirconium dichloride,
dimethylsilyl(fluorenyl)(2-ethylhexylamido)zirconium dichloride,
dimethylsilyl(fluorenyl)(2-ethylhexylamido)zirconium dimethyl,
dimethylsilyl(fluorenyl)(n-hexylamido)zirconium dichloride,
dimethylsilyl(fluorenyl)(n-hexylamido)zirconium dimethyl,
dimethylsilyl(fluorenyl)(n-pentylamido)zirconium dichloride,
dimethylsilyl(fluorenyl)(n-pentylamido)zirconium dimethyl,
dimethylsilyl(fluorenyl)(2-norbornylamido)zirconium dichloride,
dimethylsilyl(fluorenyl)(2-norbornylamido)zirconium dimethyl,
diphenylsilyl(fluorenyl)(cyclododecylamido)zirconium dichloride,
diphenylsilyl(fluorenyl)(cyclododecylamido)zirconium dimethyl,
diphenylsilyl(fluorenyl)(cyclohexylamido)zirconium dichloride,
diphenylsilyl(fluorenyl)(cyclohexylamido)zirconium dimethyl,
diphenylsilyl(fluorenyl)(cyclopentylamido)zirconium dichloride,
diphenylsilyl(fluorenyl)(cyclopentylamido)zirconium dimethyl,
diphenylsilyl(fluorenyl)(n-butylamido)zirconium dichloride,
diphenylsilyl(fluorenyl)(n-butylamido)zirconium dimethyl,
diphenylsilyl(fluorenyl)(n-dodecylamido)zirconium dichloride,
diphenylsilyl(fluorenyl)(n-dodecylamido)zirconium dimethyl,
diphenylsilyl(fluorenyl)(n-propylamido)zirconium dichloride,
diphenylsilyl(fluorenyl)(n-propylamido)zirconium dimethyl,
diphenylsilyl(fluorenyl)(sec-butylamido)zirconium dichloride,
diphenylsilyl(fluorenyl)(sec-butylamido)zirconium dimethyl,
diphenylsilyl(fluorenyl)(ethylamido)zirconium dichloride,
diphenylsilyl(fluorenyl)(ethylamido)zirconium dimethyl,
diphenylsilyl(fluorenyl)(n-decylamido)zirconium dichloride,
diphenylsilyl(fluorenyl)(n-decylamido)zirconium dimethyl,
diphenylsilyl(fluorenyl)(benzylamido)zirconium dichloride,
diphenylsilyl(fluorenyl)(benzylamido)zirconium dimethyl,
diphenylsilyl(fluorenyl)(neopentylamido)zirconium dichloride, diphenylsilyl(fluorenyl)(neopentylamido)zirconium dimethyl,
diphenylsilyl(fluorenyl)(methylamido)zirconium dichloride,
diphenylsilyl(fluorenyl)(methylamido)zirconium dimethyl,
diphenylsilyl(fluorenyl)(phenylamido)zirconium dichloride,
diphenylsilyl(fluorenyl)(phenylamido)zirconium dimethyl,
diphenylsilyl(fluorenyl)(2-methyl-phenylamido)zirconium dichloride,
diphenylsilyl(fluorenyl)(2-methyl-phenylamido)zirconium dimethyl,
diphenylsilyl(fluorenyl)(3-methyl-phenylamido)zirconium dichloride,
diphenylsilyl(fluorenyl)(3-methyl-phenylamido)zirconium dimethyl,
diphenylsilyl(fluorenyl)(2,6-dimethylphenylamido)zirconium dichloride,
diphenylsilyl(fluorenyl)(2,6-dimethylphenylamido)zirconium dimethyl,
diphenylsilyl(fluorenyl)(3,5-dimethylphenylamido)zirconium dichloride,
diphenylsilyl(fluorenyl)(3,5-dimethylphenylamido)zirconium dimethyl,
diphenylsilyl(fluorenyl)(2,4,6-trimethylphenylamido)zirconium dichloride,
diphenylsilyl(fluorenyl)(2,4,6-trimethylphenylamido)zirconium dimethyl,
diphenylsilyl(fluorenyl)(2-isopropyl-phenylamido)zirconium dichloride,
diphenylsilyl(fluorenyl)(2-isopropyl-phenylamido)zirconium dimethyl,
diphenylsilyl(fluorenyl)(2,6-diisopropyl-phenylamido)zirconium dimethyl,
diphenylsilyl(fluorenyl)(2,6-diisopropyl-phenylamido)zirconium dichloride,
diphenylsilyl(fluorenyl)(2-t-butyl-phenylamido)zirconium dimethyl,
diphenylsilyl(fluorenyl)(2-t-butyl-phenylamido)zirconium dichloride,
diphenylsilyl(fluorenyl)(3-t-butyl-phenylamido)zirconium dimethyl,
diphenylsilyl(fluorenyl)(3-t-butyl-phenylamido)zirconium dichloride,
diphenylsilyl(fluorenyl)(2-ethylhexylamido)zirconium dichloride,
diphenylsilyl(fluorenyl)(2-ethylhexylamido)zirconium dimethyl,
diphenylsilyl(fluorenyl)(n-hexylamido)zirconium dichloride,
diphenylsilyl(fluorenyl)(n-hexylamido)zirconium dimethyl,
diphenylsilyl(fluorenyl)(n-pentylamido)zirconium dichloride,
diphenylsilyl(fluorenyl)(n-pentylamido)zirconium dimethyl,
diphenylsilyl(fluorenyl)(2-norbornylamido)zirconium dichloride,
diphenylsilyl(fluorenyl)(2-norbornylamido)zirconium dimethyl,
dimethylsilyl(indenyl)(cyclododecylamido)zirconium dichloride,
dimethylsilyl(indenyl)(cyclododecylamido)zirconium dimethyl,
dimethylsilyl(indenyl)(cyclohexylamido)zirconium dichloride,
dimethylsilyl(indenyl)(cyclohexylamido)zirconium dimethyl,
dimethylsilyl(indenyl)(cyclopentylamido)zirconium dichloride,
dimethylsilyl(indenyl)(cyclopentylamido)zirconium dimethyl,
dimethylsilyl(indenyl)(n-butylamido)zirconium dichloride,
dimethylsilyl(indenyl)(n-butylamido)zirconium dimethyl,
dimethylsilyl(indenyl)(n-dodecylamido)zirconium dichloride,
dimethylsilyl(indenyl)(n-dodecylamido)zirconium dimethyl,
dimethylsilyl(indenyl)(n-propylamido)zirconium dichloride,
dimethylsilyl(indenyl)(n-propylamido)zirconium dimethyl,
dimethylsilyl(indenyl)(sec-butylamido)zirconium dichloride,
dimethylsilyl(indenyl)(sec-butylamido)zirconium dimethyl,
dimethylsilyl(indenyl)(ethylamido)zirconium dichloride,
dimethylsilyl(indenyl)(ethylamido)zirconium dimethyl,
dimethylsilyl(indenyl)(n-decylamido)zirconium dichloride,
dimethylsilyl(indenyl)(n-decylamido)zirconium dimethyl,
dimethylsilyl(indenyl)(benzylamido)zirconium dichloride,
dimethylsilyl(indenyl)(benzylamido)zirconium dimethyl,
dimethylsilyl(indenyl)(neopentylamido)zirconium dichloride,
dimethylsilyl(indenyl)(neopentylamido)zirconium dimethyl,
dimethylsilyl(indenyl)(methylamido)zirconium dichloride,
dimethylsilyl(indenyl)(methylamido)zirconium dimethyl,
dimethylsilyl(indenyl)(phenylamido)zirconium dichloride,
dimethylsilyl(indenyl)(phenylamido)zirconium dimethyl,
dimethylsilyl(indenyl)(2-methyl-phenylamido)zirconium dichloride,
dimethylsilyl(indenyl)(2-methyl-phenylamido)zirconium dimethyl,
dimethylsilyl(indenyl)(3-methyl-phenylamido)zirconium dichloride,
dimethylsilyl(indenyl)(3-methyl-phenylamido)zirconium dimethyl,
dimethylsilyl(indenyl)(2,6-dimethylphenylamido)zirconium dichloride,
dimethylsilyl(indenyl)(2,6-dimethylphenylamido)zirconium dimethyl,
dimethylsilyl(indenyl)(3,5-dimethylphenylamido)zirconium dichloride, dimethylsilyl(indenyl)(3,5-dimethylphenylamido) zirconium dimethyl,
dimethylsilyl(indenyl)(2,4,6-trimethylphenylamido) zirconium dichloride,
dimethylsilyl(indenyl)(2,4,6-trimethylphenylamido) zirconium dimethyl,
dimethylsilyl(indenyl)(2-isopropyl-phenylamido) zirconium dichloride,
dimethylsilyl(indenyl)(2-isopropyl-phenylamido) zirconium dimethyl,
dimethylsilyl(indenyl)(2,6-diisopropyl-phenylamido) zirconium dimethyl,
dimethylsilyl(indenyl)(2,6-diisopropyl-phenylamido) zirconium dichloride,
dimethylsilyl(indenyl)(2-t-butyl-phenylamido)zirconium dimethyl,
dimethylsilyl(indenyl)(2-t-butyl-phenylamido)zirconium dichloride,
dimethylsilyl(indenyl)(3-t-butyl-phenylamido)zirconium dimethyl,
dimethylsilyl(indenyl)(3-t-butyl-phenylamido)zirconium dichloride,
dimethylsilyl(indenyl)(2-ethylhexylamido)zirconium dichloride,
dimethylsilyl(indenyl)(2-ethylhexylamido)zirconium dimethyl,
dimethylsilyl(indenyl)(n-hexylamido)zirconium dichloride,
dimethylsilyl(indenyl)(n-hexylamido)zirconium dimethyl,
dimethylsilyl(indenyl)(n-pentylamido)zirconium dichloride,
dimethylsilyl(indenyl)(n-pentylamido)zirconium dimethyl,
dimethylsilyl(indenyl)(2-norbornylamido)zirconium dichloride,
dimethylsilyl(indenyl)(2-norbornylamido)zirconium dimethyl,
diphenylsilyl(indenyl)(cyclododecylamido)zirconium dichloride,
diphenylsilyl(indenyl)(cyclododecylamido)zirconium dimethyl,
diphenylsilyl(indenyl)(cyclohexylamido)zirconium dichloride,
diphenylsilyl(indenyl)(cyclohexylamido)zirconium dimethyl,
diphenylsilyl(indenyl)(cyclopentylamido)zirconium dichloride,
diphenylsilyl(indenyl)(cyclopentylamido)zirconium dimethyl,
diphenylsilyl(indenyl)(n-butylamido)zirconium dichloride,
diphenylsilyl(indenyl)(n-butylamido)zirconium dimethyl,
diphenylsilyl(indenyl)(n-dodecylamido)zirconium dichloride,
diphenylsilyl(indenyl)(n-dodecylamido)zirconium dimethyl,
diphenylsilyl(indenyl)(n-propylamido)zirconium dichloride,
diphenylsilyl(indenyl)(n-propylamido)zirconium dimethyl,
diphenylsilyl(indenyl)(sec-butylamido)zirconium dichloride,
diphenylsilyl(indenyl)(sec-butylamido)zirconium dimethyl,
diphenylsilyl(indenyl)(ethylamido)zirconium dichloride,
diphenylsilyl(indenyl)(ethylamido)zirconium dimethyl,
diphenylsilyl(indenyl)(n-decylamido)zirconium dichloride,
diphenylsilyl(indenyl)(n-decylamido)zirconium dimethyl,
diphenylsilyl(indenyl)(benzylamido)zirconium dichloride,
diphenylsilyl(indenyl)(benzylamido)zirconium dimethyl,
diphenylsilyl(indenyl)(neopentylamido)zirconium dichloride,
diphenylsilyl(indenyl)(neopentylamido)zirconium dimethyl,
diphenylsilyl(indenyl)(methylamido)zirconium dichloride,
diphenylsilyl(indenyl)(methylamido)zirconium dimethyl,
diphenylsilyl(indenyl)(phenylamido)zirconium dichloride,
diphenylsilyl(indenyl)(phenylamido)zirconium dimethyl,
diphenylsilyl(indenyl)(2-methylphenylamido)zirconium dichloride,
diphenylsilyl(indenyl)(2-methylphenylamido)zirconium dimethyl,
diphenylsilyl(indenyl)(3-methylphenylamido)zirconium dichloride,
diphenylsilyl(indenyl)(3-methylphenylamido)zirconium dimethyl,
diphenylsilyl(indenyl)(2,6-dimethylphenylamido) zirconium dichloride,
diphenylsilyl(indenyl)(2,6-dimethylphenylamido) zirconium dimethyl,
diphenylsilyl(indenyl)(3,5-dimethylphenylamido) zirconium dichloride,
diphenylsilyl(indenyl)(3,5-dimethylphenylamido) zirconium dimethyl,
diphenylsilyl(indenyl)(2,4,6-trimethylphenylamido) zirconium dichloride,
diphenylsilyl(indenyl)(2,4,6-trimethylphenylamido) zirconium dimethyl,
diphenylsilyl(indenyl)(2-isopropylphenylamido) zirconium dichloride,
diphenylsilyl(indenyl)(2-isopropylphenylamido) zirconium dimethyl,
diphenylsilyl(indenyl)(2,6-diisopropylphenylamido) zirconium dimethyl,
diphenylsilyl(indenyl)(2,6-diisopropylphenylamido) zirconium dichloride,
diphenylsilyl(indenyl)(2-t-butylphenylamido)zirconium dimethyl,
diphenylsilyl(indenyl)(2-t-butylphenylamido)zirconium dichloride,
diphenylsilyl(indenyl)(3-t-butyl-phenylamido)zirconium dimethyl,
diphenylsilyl(indenyl)(3-t-butyl-phenylamido)zirconium dichloride,
diphenylsilyl(indenyl)(2-ethylhexylamido)zirconium dichloride, diphenylsilyl(indenyl)(2-ethylhexylamido)zirconium dimethyl,
diphenylsilyl(indenyl)(n-hexylamido)zirconium dichloride,
diphenylsilyl(indenyl)(n-hexylamido)zirconium dimethyl,
diphenylsilyl(indenyl)(n-pentylamido)zirconium dichloride,
diphenylsilyl(indenyl)(n-pentylamido)zirconium dimethyl,
diphenylsilyl(indenyl)(2-norbornylamido)zirconium dichloride,
diphenylsilyl(indenyl)(2-norbornylamido)zirconium dimethyl,
dimethylsilyl(tetramethylcyclopentadienyl)(cyclododecylamido)hafnium dichloride,
dimethylsilyl(tetramethylcyclopentadienyl)(cyclododecylamido)hafnium dimethyl,
dimethylsilyl(tetramethylcyclopentadienyl)(cyclohexylamido)hafnium dichloride,
dimethylsilyl(tetramethylcyclopentadienyl)(cyclohexylamido)hafnium dimethyl,
dimethylsilyl(tetramethylcyclopentadienyl)(cyclopentylamido)hafnium dichloride,
dimethylsilyl(tetramethylcyclopentadienyl)(cyclopentylamido)hafnium dimethyl,
dimethylsilyl(tetramethylcyclopentadienyl)(n-butylamido)hafnium dichloride,
dimethylsilyl(tetramethylcyclopentadienyl)(n-butylamido)hafnium dimethyl,
dimethylsilyl(tetramethylcyclopentadienyl)(n-dodecylamido)hafnium dichloride,
dimethylsilyl(tetramethylcyclopentadienyl)(n-dodecylamido)hafnium dimethyl,
dimethylsilyl(tetramethylcyclopentadienyl)(n-propylamido)hafnium dichloride,
dimethylsilyl(tetramethylcyclopentadienyl)(n-propylamido)hafnium dimethyl,
dimethylsilyl(tetramethylcyclopentadienyl)(sec-butylamido)hafnium dichloride,
dimethylsilyl(tetramethylcyclopentadienyl)(sec-butylamido)hafnium dimethyl,
dimethylsilyl(tetramethylcyclopentadienyl)(ethylamido)hafnium dichloride,
dimethylsilyl(tetramethylcyclopentadienyl)(ethylamido)hafnium dimethyl,
dimethylsilyl(tetramethylcyclopentadienyl)(n-decylamido)hafnium dichloride,
dimethylsilyl(tetramethylcyclopentadienyl)(n-decylamido)hafnium dimethyl,
dimethylsilyl(tetramethylcyclopentadienyl)(benzylamido)hafnium dichloride,
dimethylsilyl(tetramethylcyclopentadienyl)(benzylamido)hafnium dimethyl,
dimethylsilyl(tetramethylcyclopentadienyl)(neopentylamido)hafnium dichloride,
dimethylsilyl(tetramethylcyclopentadienyl)(neopentylamido)hafnium dimethyl,
dimethylsilyl(tetramethylcyclopentadienyl)(methylamido)hafnium dichloride,
dimethylsilyl(tetramethylcyclopentadienyl)(methylamido)hafnium dimethyl,
dimethylsilyl(tetramethylcyclopentadienyl)(phenylamido)hafnium dichloride,
dimethylsilyl(tetramethylcyclopentadienyl)(phenylamido)hafnium dimethyl,
dimethylsilyl(tetramethylcyclopentadienyl)(2-methyl-phenylamido)hafnium dichloride,
dimethylsilyl(tetramethylcyclopentadienyl)(2-methyl-phenylamido)hafnium dimethyl,
dimethylsilyl(tetramethylcyclopentadienyl)(3-methyl-phenylamido)hafnium dichloride,
dimethylsilyl(tetramethylcyclopentadienyl)(3-methyl-phenylamido)hafnium dimethyl,
dimethylsilyl(tetramethylcyclopentadienyl)(2,6-dimethylphenylamido)hafnium dichloride,
dimethylsilyl(tetramethylcyclopentadienyl)(2,6-dimethylphenylamido)hafnium dimethyl,
dimethylsilyl(tetramethylcyclopentadienyl)(3,5-dimethylphenylamido)hafnium dichloride,
dimethylsilyl(tetramethylcyclopentadienyl)(3,5-dimethylphenylamido)hafnium dimethyl,
dimethylsilyl(tetramethylcyclopentadienyl)(2,4,6-trimethylphenylamido)hafnium dichloride,
dimethylsilyl(tetramethylcyclopentadienyl)(2,4,6-trimethylphenylamido)hafnium dimethyl,
dimethylsilyl(tetramethylcyclopentadienyl)(2-isopropyl-phenylamido)hafnium dichloride,
dimethylsilyl(tetramethylcyclopentadienyl)(2-isopropyl-phenylamido)hafnium dimethyl,
dimethylsilyl(tetramethylcyclopentadienyl)(2,6-diisopropyl-phenylamido)hafnium dimethyl,
dimethylsilyl(tetramethylcyclopentadienyl)(2,6-diisopropyl-phenylamido)hafnium dichloride,
dimethylsilyl(tetramethylcyclopentadienyl)(2-t-butyl-phenylamido)hafnium dimethyl,
dimethylsilyl(tetramethylcyclopentadienyl)(2-t-butyl-phenylamido)hafnium dichloride,
dimethylsilyl(tetramethylcyclopentadienyl)(3-t-butyl-phenylamido)hafnium dimethyl,
dimethylsilyl(tetramethylcyclopentadienyl)(3-t-butyl-phenylamido)hafnium dichloride,
dimethylsilyl(tetramethylcyclopentadienyl)(2-ethylhexylamido)hafnium dichloride,
dimethylsilyl(tetramethylcyclopentadienyl)(2-ethylhexylamido)hafnium dimethyl,
dimethylsilyl(tetramethylcyclopentadienyl)(n-hexylamido)hafnium dichloride,
dimethylsilyl(tetramethylcyclopentadienyl)(n-hexylamido)hafnium dimethyl,
dimethylsilyl(tetramethylcyclopentadienyl)(n-pentylamido)hafnium dichloride,
dimethylsilyl(tetramethylcyclopentadienyl)(n-pentylamido)hafnium dimethyl,
dimethylsilyl(tetramethylcyclopentadienyl)(2-norbornylamido)hafnium dichloride,
dimethylsilyl(tetramethylcyclopentadienyl)(2-norbornylamido)hafnium dimethyl,
dimethylsilyl(3-methylcyclopentadienyl)(cyclododecylamido)hafnium dichloride,
dimethylsilyl(3-methylcyclopentadienyl)(cyclododecylamido)hafnium dimethyl,
dimethylsilyl(3-methylcyclopentadienyl)(cyclohexylamido)hafnium dichloride, dimethylsilyl(3-methylcyclopentadienyl)(cyclohexylamido)hafnium dimethyl,
dimethylsilyl(3-methylcyclopentadienyl)(cyclopentylamido)hafnium dichloride,
dimethylsilyl(3-methylcyclopentadienyl)(cyclopentylamido)hafnium dimethyl,
dimethylsilyl(3-methylcyclopentadienyl)(n-butylamido)hafnium dichloride,
dimethylsilyl(3-methylcyclopentadienyl)(n-butylamido)hafnium dimethyl,
dimethylsilyl(3-methylcyclopentadienyl)(n-dodecylamido)hafnium dichloride,
dimethylsilyl(3-methylcyclopentadienyl)(n-dodecylamido)hafnium dimethyl,
dimethylsilyl(3-methylcyclopentadienyl(n-propylamido)hafnium dichloride,
dimethylsilyl(3-methylcyclopentadienyl)(n-propylamido)hafnium dimethyl,
dimethylsilyl(3-methylcyclopentadienyl)(sec-butylamido)hafnium dichloride,
dimethylsilyl(3-methylcyclopentadienyl)(sec-butylamido)hafnium dimethyl,
dimethylsilyl(3-methylcyclopentadienyl)(ethylamido)hafnium dichloride,
dimethylsilyl(3-methylcyclopentadienyl)(ethylamido)hafnium dimethyl,
dimethylsilyl(3-methylcyclopentadienyl)(n-decylamido)hafnium dichloride,
dimethylsilyl(3-methylcyclopentadienyl)(n-decylamido)hafnium dimethyl,
dimethylsilyl(3-methylcyclopentadienyl)(benzylamido)hafnium dichloride,
dimethylsilyl(3-methylcyclopentadienyl)(benzylamido)hafnium dimethyl,
dimethylsilyl(3-methylcyclopentadienyl)(neopentylamido)hafnium dichloride,
dimethylsilyl(3-methylcyclopentadienyl)(neopentylamido)hafnium dimethyl,
dimethylsilyl(3-methylcyclopentadienyl)(methylamido)hafnium dichloride,
dimethylsilyl(3-methylcyclopentadienyl)(methylamido)hafnium dimethyl,
dimethylsilyl(3-methylcyclopentadienyl)(phenylamido)hafnium dichloride,
dimethylsilyl(3-methylcyclopentadienyl)(phenylamido)hafnium dimethyl,
dimethylsilyl(3-methylcyclopentadienyl)(2-methyl-phenylamido)hafnium dichloride,
dimethylsilyl(3-methylcyclopentadienyl)(2-methyl-phenylamido)hafnium dimethyl,
dimethylsilyl(3-methylcyclopentadienyl)(3-methyl-phenylamido)hafnium dichloride,
dimethylsilyl(3-methylcyclopentadienyl)(3-methyl-phenylamido)hafnium dimethyl,
dimethylsilyl(3-methylcyclopentadienyl)(2,6-dimethylphenylamido)hafnium dichloride,
dimethylsilyl(3-methylcyclopentadienyl)(2,6-dimethylphenylamido)hafnium dimethyl,
dimethylsilyl(3-methylcyclopentadienyl)(3,5-dimethylphenylamido)hafnium dichloride,
dimethylsilyl(3-methylcyclopentadienyl)(3,5-dimethylphenylamido)hafnium dimethyl,
dimethylsilyl(3-methylcyclopentadienyl)(2-isopropyl-phenylamido)hafnium dichloride,
dimethylsilyl(3-methylcyclopentadienyl)(2-isopropyl-phenylamido)hafnium dimethyl,
dimethylsilyl(3-methylcyclopentadienyl)(2-isopropyl-phenylamido)hafnium dichloride,
dimethylsilyl(3-methylcyclopentadienyl)(2,6-diisopropyl-phenylamido)hafnium dimethyl,
dimethylsilyl(3-methylcyclopentadienyl)(2,6-diisopropyl-phenylamido)hafnium dichloride,
dimethylsilyl(3-methylcyclopentadienyl)(2-t-butyl-phenylamido)hafnium dimethyl,
dimethylsilyl(3-methylcyclopentadienyl)(2-t-butyl-phenylamido)hafnium dichloride,
dimethylsilyl(3-methylcyclopentadienyl)(3-t-butyl-phenylamido)hafnium dimethyl,
dimethylsilyl(3-methylcyclopentadienyl)(3-t-butyl-phenylamido)hafnium dichloride,
dimethylsilyl(3-methylcyclopentadienyl)(2-ethylhexylamido)hafnium dichloride,
dimethylsilyl(3-methylcyclopentadienyl)(2-ethylhexylamido)hafnium dimethyl,
dimethylsilyl(3-methylcyclopentadienyl)(n-hexylamido)hafnium dichloride,
dimethylsilyl(3-methylcyclopentadienyl)(n-hexylamido)hafnium dimethyl,
dimethylsilyl(3-methylcyclopentadienyl)(n-pentylamido)hafnium dichloride,
dimethylsilyl(3-methylcyclopentadienyl)(n-pentylamido)hafnium dimethyl,
dimethylsilyl(3-methylcyclopentadienyl)(2-norbornylamido)hafnium dichloride,
dimethylsilyl(3-methylcyclopentadienyl)(2-norbornylamido)hafnium dimethyl,
dimethylsilyl(cyclopentadienyl)(cyclododecylamido)hafnium dichloride,
dimethylsilyl(cyclopentadienyl)(cyclododecylamido)hafnium dimethyl,
dimethylsilyl(cyclopentadienyl)(cyclohexylamido)hafnium dichloride,
dimethylsilyl(cyclopentadienyl)(cyclohexylamido)hafnium dimethyl,
dimethylsilyl(cyclopentadienyl)(cyclopentylamido)hafnium dichloride,
dimethylsilyl(cyclopentadienyl)(cyclopentylamido)hafnium dimethyl,
dimethylsilyl(cyclopentadienyl)(n-butylamido)hafnium dichloride,
dimethylsilyl(cyclopentadienyl)(n-butylamido)hafnium dimethyl,
dimethylsilyl(cyclopentadienyl)(n-dodecylamido)hafnium dichloride,
dimethylsilyl(cyclopentadienyl)(n-dodecylamido)hafnium dimethyl,
dimethylsilyl(cyclopentadienyl)(n-propylamido)hafnium dichloride,
dimethylsilyl(cyclopentadienyl)(n-propylamido)hafnium dimethyl,
dimethylsilyl(cyclopentadienyl)(sec-butylamido)hafnium dichloride,
dimethylsilyl(cyclopentadienyl)(sec-butylamido)hafnium dimethyl, dimethylsilyl(cyclopentadienyl)(ethylamido)hafnium dichloride,
dimethylsilyl(cyclopentadienyl)(ethylamido)hafnium dimethyl,
dimethylsilyl(cyclopentadienyl)(n-decylamido)hafnium dichloride,
dimethylsilyl(cyclopentadienyl)(n-decylamido)hafnium dimethyl,
dimethylsilyl(cyclopentadienyl)(benzylamido)hafnium dichloride,
dimethylsilyl(cyclopentadienyl)(benzylamido)hafnium dimethyl,
dimethylsilyl(cyclopentadienyl)(neopentylamido)hafnium dichloride,
dimethylsilyl(cyclopentadienyl)(neopentylamido)hafnium dimethyl,
dimethylsilyl(cyclopentadienyl)(methylamido)hafnium dichloride,
dimethylsilyl(cyclopentadienyl)(methylamido)hafnium dimethyl,
dimethylsilyl(cyclopentadienyl)(phenylamido)hafnium dichloride,
dimethylsilyl(cyclopentadienyl)(phenylamido)hafnium dimethyl,
dimethylsilyl(cyclopentadienyl)(2-methyl-phenylamido)hafnium dichloride,
dimethylsilyl(cyclopentadienyl)(2-methyl-phenylamido)hafnium dimethyl,
dimethylsilyl(cyclopentadienyl)(3-methyl-phenylamido)hafnium dichloride,
dimethylsilyl(cyclopentadienyl)(3-methyl-phenylamido)hafnium dimethyl,
dimethylsilyl(cyclopentadienyl)(2,6-dimethylphenylamido)hafnium dichloride,
dimethylsilyl(cyclopentadienyl)(2,6-dimethylphenylamido)hafnium dimethyl,
dimethylsilyl(cyclopentadienyl)(3,5-dimethylphenylamido)hafnium dichloride,
dimethylsilyl(cyclopentadienyl)(3,5-dimethylphenylamido)hafnium dimethyl,
dimethylsilyl(cyclopentadienyl)(2,4,6-trimethylphenylamido)hafnium dichloride,
dimethylsilyl(cyclopentadienyl)(2,4,6-trimethylphenylamido)hafnium dimethyl,
dimethylsilyl(cyclopentadienyl)(2-isopropyl-phenylamido)hafnium dichloride,
dimethylsilyl(cyclopentadienyl)(2-isopropyl-phenylamido)hafnium dimethyl,
dimethylsilyl(cyclopentadienyl)(2,6-diisopropyl-phenylamido)hafnium dimethyl,
dimethylsilyl(cyclopentadienyl)(2,6-diisopropyl-phenylamido)hafnium dichloride,
dimethylsilyl(cyclopentadienyl)(2-t-butyl-phenylamido)hafnium dimethyl,
dimethylsilyl(cyclopentadienyl)(2-t-butyl-phenylamido)hafnium dichloride,
dimethylsilyl(cyclopentadienyl)(3-t-butyl-phenylamido)hafnium dimethyl,
dimethylsilyl(cyclopentadienyl)(3-t-butyl-phenylamido)hafnium dichloride,
dimethylsilyl(cyclopentadienyl)(2-ethylhexylamido)hafnium dichloride,
dimethylsilyl(cyclopentadienyl)(2-ethylhexylamido)hafnium dimethyl,
dimethylsilyl(cyclopentadienyl)(n-hexylamido)hafnium dichloride,
dimethylsilyl(cyclopentadienyl)(n-hexylamido)hafnium dimethyl,
dimethylsilyl(cyclopentadienyl)(n-pentylamido)hafnium dichloride,
dimethylsilyl(cyclopentadienyl)(n-pentylamido)hafnium dimethyl,
dimethylsilyl(cyclopentadienyl)(2-norbornylamido)hafnium dichloride,
dimethylsilyl(cyclopentadienyl)(2-norbornylamido)hafnium dimethyl,
diphenylsilyl(tetramethylcyclopentadienyl)(cyclododecylamido)hafnium dichloride,
diphenylsilyl(tetramethylcyclopentadienyl)(cyclododecylamido)hafnium dimethyl,
diphenylsilyl(tetramethylcyclopentadienyl)(cyclohexylamido)hafnium dichloride,
diphenylsilyl(tetramethylcyclopentadienyl)(cyclohexylamido)hafnium dimethyl,
diphenylsilyl(tetramethylcyclopentadienyl)(cyclopentylamido)hafnium dichloride,
diphenylsilyl(tetramethylcyclopentadienyl)(cyclopentylamido)hafnium dimethyl,
diphenylsilyl(tetramethylcyclopentadienyl)(n-butylamido)hafnium dichloride,
diphenylsilyl(tetramethylcyclopentadienyl)(n-butylamido)hafnium dimethyl,
diphenylsilyl(tetramethylcyclopentadienyl)(n-dodecylamido)hafnium dichloride,
diphenylsilyl(tetramethylcyclopentadienyl)(n-dodecylamido)hafnium dimethyl,
diphenylsilyl(tetramethylcyclopentadienyl)(n-propylamido)hafnium dichloride,
diphenylsilyl(tetramethylcyclopentadienyl)(n-propylamido)hafnium dimethyl,
diphenylsilyl(tetramethylcyclopentadienyl)(sec-butylamido)hafnium dichloride,
diphenylsilyl(tetramethylcyclopentadienyl)(sec-butylamido)hafnium dimethyl,
diphenylsilyl(tetramethylcyclopentadienyl)(ethylamido)hafnium dichloride,
diphenylsilyl(tetramethylcyclopentadienyl)(ethylamido)hafnium dimethyl,
diphenylsilyl(tetramethylcyclopentadienyl)(n-decylamido)hafnium dichloride,
diphenylsilyl(tetramethylcyclopentadienyl)(n-decylamido)hafnium dimethyl,
diphenylsilyl(tetramethylcyclopentadienyl)(benzylamido)hafnium dichloride,
diphenylsilyl(tetramethylcyclopentadienyl)(benzylamido)hafnium dimethyl,
diphenylsilyl(tetramethylcyclopentadienyl)(neopentylamido)hafnium dichloride,
diphenylsilyl(tetramethylcyclopentadienyl)(neopentylamido)hafnium dimethyl,
diphenylsilyl(tetramethylcyclopentadienyl)(methylamido)hafnium dichloride,
diphenylsilyl(tetramethylcyclopentadienyl)(methylamido)hafnium dimethyl, diphenylsilyl(tetramethylcyclopentadienyl)(phenylamido)hafnium dichloride,
diphenylsilyl(tetramethylcyclopentadienyl)(phenylamido)hafnium dimethyl,
diphenylsilyl(tetramethylcyclopentadienyl)(2-methyl-phenylamido)hafnium dichloride,
diphenylsilyl(tetramethylcyclopentadienyl)(2-methyl-phenylamido)hafnium dimethyl,
diphenylsilyl(tetramethylcyclopentadienyl)(3-methyl-phenylamido)hafnium dichloride,
diphenylsilyl(tetramethylcyclopentadienyl)(3-methyl-phenylamido)hafnium dimethyl,
diphenylsilyl(tetramethylcyclopentadienyl)(2,6-dimethylphenylamido)hafnium dichloride,
diphenylsilyl(tetramethylcyclopentadienyl)(2,6-dimethylphenylamido)hafnium dimethyl,
diphenylsilyl(tetramethylcyclopentadienyl)(3,5-dimethylphenylamido)hafnium dichloride,
diphenylsilyl(tetramethylcyclopentadienyl)(3,5-dimethylphenylamido)hafnium dimethyl,
diphenylsilyl(tetramethylcyclopentadienyl)(2,4,6-trimethylphenylamido)hafnium dichloride,
diphenylsilyl(tetramethylcyclopentadienyl)(2,4,6-trimethylphenylamido)hafnium dimethyl,
diphenylsilyl(tetramethylcyclopentadienyl)(2-isopropyl-phenylamido)hafnium dichloride,
diphenylsilyl(tetramethylcyclopentadienyl)(2-isopropyl-phenylamido)hafnium dimethyl,
diphenylsilyl(tetramethylcyclopentadienyl)(2,6-diisopropyl-phenylamido)hafnium dimethyl,
diphenylsilyl(tetramethylcyclopentadienyl)(2,6-diisopropyl-phenylamido)hafnium dichloride,
diphenylsilyl(tetramethylcyclopentadienyl)(2-t-butyl-phenylamido)hafnium dimethyl,
diphenylsilyl(tetramethylcyclopentadienyl)(2-t-butyl-phenylamido)hafnium dichloride,
diphenylsilyl(tetramethylcyclopentadienyl)(3-t-butyl-phenylamido)hafnium dimethyl,
diphenylsilyl(tetramethylcyclopentadienyl)(3-t-butyl-phenylamido)hafnium dichloride,
diphenylsilyl(tetramethylcyclopentadienyl)(2-ethylhexylamido)hafnium dichloride,
diphenylsilyl(tetramethylcyclopentadienyl)(2-ethylhexylamido)hafnium dimethyl,
diphenylsilyl(tetramethylcyclopentadienyl)(n-hexylamido)hafnium dichloride,
diphenylsilyl(tetramethylcyclopentadienyl)(n-hexylamido)hafnium dimethyl,
diphenylsilyl(tetramethylcyclopentadienyl)(n-pentylamido)hafnium dichloride,
diphenylsilyl(tetramethylcyclopentadienyl)(n-pentylamido)hafnium dimethyl,
diphenylsilyl(tetramethylcyclopentadienyl)(2-norbornylamido)hafnium dichloride,
diphenylsilyl(tetramethylcyclopentadienyl)(2-norbornylamido)hafnium dimethyl,
dimethylsilyl(fluorenyl)(cyclododecylamido)hafnium dichloride,
dimethylsilyl(fluorenyl)(cyclododecylamido)hafnium dimethyl,
dimethylsilyl(fluorenyl)(cyclohexylamido)hafnium dichloride,
dimethylsilyl(fluorenyl)(cyclohexylamido)hafnium dimethyl,
dimethylsilyl(fluorenyl)(cyclopentylamido)hafnium dichloride,
dimethylsilyl(fluorenyl)(cyclopentylamido)hafnium dimethyl,
dimethylsilyl(fluorenyl)(n-butylamido)hafnium dichloride,
dimethylsilyl(fluorenyl)(n-butylamido)hafnium dimethyl,
dimethylsilyl(fluorenyl)(n-dodecylamido)hafnium dichloride,
dimethylsilyl(fluorenyl)(n-dodecylamido)hafnium dimethyl,
dimethylsilyl(fluorenyl)(n-propylamido)hafnium dichloride,
dimethylsilyl(fluorenyl)(n-propylamido)hafnium dimethyl,
dimethylsilyl(fluorenyl)(sec-butylamido)hafnium dichloride,
dimethylsilyl(fluorenyl)(sec-butylamido)hafnium dimethyl,
dimethylsilyl(fluorenyl)(ethylamido)hafnium dichloride,
dimethylsilyl(fluorenyl)(ethylamido)hafnium dimethyl,
dimethylsilyl(fluorenyl)(n-decylamido)hafnium dichloride,
dimethylsilyl(fluorenyl)(n-decylamido)hafnium dimethyl,
dimethylsilyl(fluorenyl)(benzylamido)hafnium dichloride,
dimethylsilyl(fluorenyl)(benzylamido)hafnium dimethyl,
dimethylsilyl(fluorenyl)(neopentylamido)hafnium dichloride,
dimethylsilyl(fluorenyl)(neopentylamido)hafnium dimethyl,
dimethylsilyl(fluorenyl)(methylamido)hafnium dichloride,
dimethylsilyl(fluorenyl)(methylamido)hafnium dimethyl,
dimethylsilyl(fluorenyl)(phenylamido)hafnium dichloride,
dimethylsilyl(fluorenyl)(phenylamido)hafnium dimethyl,
dimethylsilyl(fluorenyl)(2-methyl-phenylamido)hafnium dichloride,
dimethylsilyl(fluorenyl)(2-methyl-phenylamido)hafnium dimethyl,
dimethylsilyl(fluorenyl)(3-methyl-phenylamido)hafnium dichloride,
dimethylsilyl(fluorenyl)(3-methyl-phenylamido)hafnium dimethyl,
dimethylsilyl(fluorenyl)(2,6-dimethylphenylamido)hafnium dichloride,
dimethylsilyl(fluorenyl)(2,6-dimethylphenylamido)hafnium dimethyl,
dimethylsilyl(fluorenyl)(3,5-dimethylphenylamido)hafnium dichloride,
dimethylsilyl(fluorenyl)(3,5-dimethylphenylamido)hafnium dimethyl,
dimethylsilyl(fluorenyl)(2,4,6-trimethylphenylamido)hafnium dichloride,
dimethylsilyl(fluorenyl)(2,4,6-trimethylphenylamido)hafnium dimethyl,
dimethylsilyl(fluorenyl)(2-isopropyl-phenylamido)hafnium dichloride, dimethylsilyl(fluorenyl)(2-isopropyl-phenylamido) hafnium dimethyl,
dimethylsilyl(fluorenyl)(2,6-diisopropyl-phenylamido) hafnium dimethyl,
dimethylsilyl(fluorenyl)(2,6-diisopropyl-phenylamido) hafnium dichloride,
dimethylsilyl(fluorenyl)(2-t-butyl-phenylamido)hafnium dimethyl,
dimethylsilyl(fluorenyl)(2-t-butyl-phenylamido)hafnium dichloride,
dimethylsilyl(fluorenyl)(3-t-butyl-phenylamido)hafnium dimethyl,
dimethylsilyl(fluorenyl)(3-t-butyl-phenylamido)hafnium dichloride,
dimethylsilyl(fluorenyl)(2-ethylhexylamido)hafnium dichloride,
dimethylsilyl(fluorenyl)(2-ethylhexylamido)hafnium dimethyl,
dimethylsilyl(fluorenyl)(n-hexylamido)hafnium dichloride,
dimethylsilyl(fluorenyl)(n-hexylamido)hafnium dimethyl,
dimethylsilyl(fluorenyl)(n-pentylamido)hafnium dichloride,
dimethylsilyl(fluorenyl)(n-pentylamido)hafnium dimethyl,
dimethylsilyl(fluorenyl)(2-norbornylamido)hafnium dichloride,
dimethylsilyl(fluorenyl)(2-norbornylamido)hafnium dimethyl,
diphenylsilyl(fluorenyl)(cyclododecylamido)hafnium dichloride,
diphenylsilyl(fluorenyl)(cyclododecylamido)hafnium dimethyl,
diphenylsilyl(fluorenyl)(cyclohexylamido)hafnium dichloride,
diphenylsilyl(fluorenyl)(cyclohexylamido)hafnium dimethyl,
diphenylsilyl(fluorenyl)(cyclopentylamido)hafnium dichloride,
diphenylsilyl(fluorenyl)(cyclopentylamido)hafnium dimethyl,
diphenylsilyl(fluorenyl)(n-butylamido)hafnium dichloride,
diphenylsilyl(fluorenyl)(n-butylamido)hafnium dimethyl,
diphenylsilyl(fluorenyl)(n-dodecylamido)hafnium dichloride,
diphenylsilyl(fluorenyl)(n-dodecylamido)hafnium dimethyl,
diphenylsilyl(fluorenyl)(n-propylamido)hafnium dichloride,
diphenylsilyl(fluorenyl)(n-propylamido)hafnium dimethyl,
diphenylsilyl(fluorenyl)(sec-butylamido)hafnium dichloride,
diphenylsilyl(fluorenyl)(sec-butylamido)hafnium dimethyl,
diphenylsilyl(fluorenyl)(ethylamido)hafnium dichloride,
diphenylsilyl(fluorenyl)(ethylamido)hafnium dimethyl,
diphenylsilyl(fluorenyl)(n-decylamido)hafnium dichloride,
diphenylsilyl(fluorenyl)(n-decylamido)hafnium dimethyl,
diphenylsilyl(fluorenyl)(benzylamido)hafnium dichloride,
diphenylsilyl(fluorenyl)(benzylamido)hafnium dimethyl,
diphenylsilyl(fluorenyl)(neopentylamido)hafnium dichloride,
diphenylsilyl(fluorenyl)(neopentylamido)hafnium dimethyl,
diphenylsilyl(fluorenyl)(methylamido)hafnium dichloride,
diphenylsilyl(fluorenyl)(methylamido)hafnium dimethyl,
diphenylsilyl(fluorenyl)(phenylamido)hafnium dichloride,
diphenylsilyl(fluorenyl)(phenylamido)hafnium dimethyl,
diphenylsilyl(fluorenyl)(2-methyl-phenylamido)hafnium dichloride,
diphenylsilyl(fluorenyl)(2-methyl-phenylamido)hafnium dimethyl,
diphenylsilyl(fluorenyl)(3-methyl-phenylamido)hafnium dichloride,
diphenylsilyl(fluorenyl)(3-methyl-phenylamido)hafnium dimethyl,
diphenylsilyl(fluorenyl)(2,6-dimethylphenylamido) hafnium dichloride,
diphenylsilyl(fluorenyl)(2,6-dimethylphenylamido) hafnium dimethyl,
diphenylsilyl(fluorenyl)(3,5-dimethylphenylamido) hafnium dichloride,
diphenylsilyl(fluorenyl)(3,5-dimethylphenylamido) hafnium dimethyl,
diphenylsilyl(fluorenyl)(2,4,6-trimethylphenylamido) hafnium dichloride,
diphenylsilyl(fluorenyl)(2,4,6-trimethylphenylamido) hafnium dimethyl,
diphenylsilyl(fluorenyl)(2-isopropyl-phenylamido) hafnium dimethyl,
diphenylsilyl(fluorenyl)(2-isopropyl-phenylamido) hafnium dimethyl,
diphenylsilyl(fluorenyl)(2,6-diisopropyl-phenylamido) hafnium dimethyl,
diphenylsilyl(fluorenyl)(2,6-diisopropyl-phenylamido) hafnium dichloride,
diphenylsilyl(fluorenyl)(2-t-butyl-phenylamido)hafnium dimethyl,
diphenylsilyl(fluorenyl)(2-t-butyl-phenylamido)hafnium dichloride,
diphenylsilyl(fluorenyl)(3-t-butyl-phenylamido)hafnium dimethyl,
diphenylsilyl(fluorenyl)(3-t-butyl-phenylamido)hafnium dichloride,
diphenylsilyl(fluorenyl)(2-ethylhexylamido)hafnium dichloride,
diphenylsilyl(fluorenyl)(2-ethylhexylamido)hafnium dimethyl,
diphenylsilyl(fluorenyl)(n-hexylamido)hafnium dichloride,
diphenylsilyl(fluorenyl)(n-hexylamido)hafnium dimethyl,
diphenylsilyl(fluorenyl)(n-pentylamido)hafnium dichloride,
diphenylsilyl(fluorenyl)(n-pentylamido)hafnium dimethyl, diphenylsilyl(fluorenyl)(2-norbornylamido)hafnium dichloride,
diphenylsilyl(fluorenyl)(2-norbornylamido)hafnium dimethyl,
dimethylsilyl(indenyl)(cyclododecylamido)hafnium dichloride,
dimethylsilyl(indenyl)(cyclododecylamido)hafnium dimethyl,
dimethylsilyl(indenyl)(cyclohexylamido)hafnium dichloride,
dimethylsilyl(indenyl)(cyclohexylamido)hafnium dimethyl,
dimethylsilyl(indenyl)(cyclopentylamido)hafnium dichloride,
dimethylsilyl(indenyl)(cyclopentylamido)hafnium dimethyl,
dimethylsilyl(indenyl)(n-butylamido)hafnium dichloride,
dimethylsilyl(indenyl)(n-butylamido)hafnium dimethyl,
dimethylsilyl(indenyl)(n-dodecylamido)hafnium dichloride,
dimethylsilyl(indenyl)(n-dodecylamido)hafnium dimethyl,
dimethylsilyl(indenyl)(n-propylamido)hafnium dichloride,
dimethylsilyl(indenyl)(n-propylamido)hafnium dimethyl,
dimethylsilyl(indenyl)(sec-butylamido)hafnium dichloride,
dimethylsilyl(indenyl)(sec-butylamido)hafnium dimethyl,
dimethylsilyl(indenyl)(ethylamido)hafnium dichloride,
dimethylsilyl(indenyl)(ethylamido)hafnium dimethyl,
dimethylsilyl(indenyl)(n-decylamido)hafnium dichloride,
dimethylsilyl(indenyl)(n-decylamido)hafnium dimethyl,
dimethylsilyl(indenyl)(benzylamido)hafnium dichloride,
dimethylsilyl(indenyl)(benzylamido)hafnium dimethyl,
dimethylsilyl(indenyl)(neopentylamido)hafnium dichloride,
dimethylsilyl(indenyl)(neopentylamido)hafnium dimethyl,
dimethylsilyl(indenyl)(methylamido)hafnium dichloride,
dimethylsilyl(indenyl)(methylamido)hafnium dimethyl,
dimethylsilyl(indenyl)(phenylamido)hafnium dichloride,
dimethylsilyl(indenyl)(phenylamido)hafnium dimethyl,
dimethylsilyl(indenyl)(2-methyl-phenylamido)hafnium dichloride,
dimethylsilyl(indenyl)(2-methyl-phenylamido)hafnium dimethyl,
dimethylsilyl(indenyl)(3-methyl-phenylamido)hafnium dichloride,
dimethylsilyl(indenyl)(3-methyl-phenylamido)hafnium dimethyl,
dimethylsilyl(indenyl)(2,6-dimethylphenylamido)hafnium dichloride,
dimethylsilyl(indenyl)(2,6-dimethylphenylamido)hafnium dimethyl,
dimethylsilyl(indenyl)(3,5-dimethylphenylamido)hafnium dichloride,
dimethylsilyl(indenyl)(3,5-dimethylphenylamido)hafnium dimethyl,
dimethylsilyl(indenyl)(2,4,6-trimethylphenylamido)hafnium dichloride,
dimethylsilyl(indenyl)(2,4,6-trimethylphenylamido)hafnium dimethyl,
dimethylsilyl(indenyl)(2-isopropyl-phenylamido)hafnium dichloride,
dimethylsilyl(indenyl)(2-isopropyl-phenylamido)hafnium dimethyl,
dimethylsilyl(indenyl)(2,6-diisopropyl-phenylamido)hafnium dimethyl,
dimethylsilyl(indenyl)(2,6-diisopropyl-phenylamido)hafnium dichloride,
dimethylsilyl(indenyl)(2-t-butyl-phenylamido)hafnium dimethyl,
dimethylsilyl(indenyl)(2-t-butyl-phenylamido)hafnium dichloride,
dimethylsilyl(indenyl)(3-t-butyl-phenylamido)hafnium dimethyl,
dimethylsilyl(indenyl)(3-t-butyl-phenylamido)hafnium dichloride,
dimethylsilyl(indenyl)(2-ethylhexylamido)hafnium dichloride,
dimethylsilyl(indenyl)(2-ethylhexylamido)hafnium dimethyl,
dimethylsilyl(indenyl)(n-hexylamido)hafnium dichloride,
dimethylsilyl(indenyl)(n-hexylamido)hafnium dimethyl,
dimethylsilyl(indenyl)(n-pentylamido)hafnium dichloride,
dimethylsilyl(indenyl)(n-pentylamido)hafnium dimethyl,
dimethylsilyl(indenyl)(2-norbornylamido)hafnium dichloride,
dimethylsilyl(indenyl)(2-norbornylamido)hafnium dimethyl,
diphenylsilyl(indenyl)(cyclododecylamido)hafnium dichloride,
diphenylsilyl(indenyl)(cyclododecylamido)hafnium dimethyl,
diphenylsilyl(indenyl)(cyclohexylamido)hafnium dichloride,
diphenylsilyl(indenyl)(cyclohexylamido)hafnium dimethyl,
diphenylsilyl(indenyl)(cyclopentylamido)hafnium dichloride,
diphenylsilyl(indenyl)(cyclopentylamido)hafnium dimethyl,
diphenylsilyl(indenyl)(n-butylamido)hafnium dichloride,
diphenylsilyl(indenyl)(n-butylamido)hafnium dimethyl,
diphenylsilyl(indenyl)(n-dodecylamido)hafnium dichloride,
diphenylsilyl(indenyl)(n-dodecylamido)hafnium dimethyl,
diphenylsilyl(indenyl)(n-propylamido)hafnium dichloride,
diphenylsilyl(indenyl)(n-propylamido)hafnium dimethyl,
diphenylsilyl(indenyl)(sec-butylamido)hafnium dichloride,
diphenylsilyl(indenyl)(sec-butylamido)hafnium dimethyl,
diphenylsilyl(indenyl)(ethylamido)hafnium dichloride,
diphenylsilyl(indenyl)(ethylamido)hafnium dimethyl,
diphenylsilyl(indenyl)(n-decylamido)hafnium dichloride,
diphenylsilyl(indenyl)(n-decylamido)hafnium dimethyl,
diphenylsilyl(indenyl)(benzylamido)hafnium dichloride, diphenylsilyl(indenyl)(benzylamido)hafnium dimethyl,
diphenylsilyl(indenyl)(neopentylamido)hafnium dichloride,
diphenylsilyl(indenyl)(neopentylamido)hafnium dimethyl,
diphenylsilyl(indenyl)(methylamido)hafnium dichloride,
diphenylsilyl(indenyl)(methylamido)hafnium dimethyl,
diphenylsilyl(indenyl)(phenylamido)hafnium dichloride,
diphenylsilyl(indenyl)(phenylamido)hafnium dimethyl,
diphenylsilyl(indenyl)(2-methylphenylamido)hafnium dichloride,
diphenylsilyl(indenyl)(2-methylphenylamido)hafnium dimethyl,
diphenylsilyl(indenyl)(3-methylphenylamido)hafnium dichloride,
diphenylsilyl(indenyl)(3-methylphenylamido)hafnium dimethyl,
diphenylsilyl(indenyl)(2,6-dimethylphenylamido) hafnium dichloride,
diphenylsilyl(indenyl)(2,6-dimethylphenylamido) hafnium dimethyl,
diphenylsilyl(indenyl)(3,5-dimethylphenylamido) hafnium dichloride,
diphenylsilyl(indenyl)(3,5-dimethylphenylamido) hafnium dimethyl,
diphenylsilyl(indenyl)(2,4,6-trimethylphenylamido) hafnium dichloride,
diphenylsilyl(indenyl)(2,4,6-trimethylphenylamido) hafnium dimethyl,
diphenylsilyl(indenyl)(2-isopropylphenylamido)hafnium dichloride,
diphenylsilyl(indenyl)(2-isopropylphenylamido)hafnium dimethyl,
diphenylsilyl(indenyl)(2,6-diisopropylphenylamido) hafnium dimethyl,
diphenylsilyl(indenyl)(2,6-diisopropylphenylamido) hafnium dichloride,
diphenylsilyl(indenyl)(2-t-butylphenylamido)hafnium dimethyl,
diphenylsilyl(indenyl)(2-t-butylphenylamido)hafnium dichloride,
diphenylsilyl(indenyl)(3-t-butyl-phenylamido)hafnium dimethyl,
diphenylsilyl(indenyl)(3-t-butyl-phenylamido)hafnium dichloride,
diphenylsilyl(indenyl)(2-ethylhexylamido)hafnium dichloride,
diphenylsilyl(indenyl)(2-ethylhexylamido)hafnium dimethyl,
diphenylsilyl(indenyl)(n-hexylamido)hafnium dichloride,
diphenylsilyl(indenyl)(n-hexylamido)hafnium dimethyl,
diphenylsilyl(indenyl)(n-pentylamido)hafnium dichloride,
diphenylsilyl(indenyl)(n-pentylamido)hafnium dimethyl,
diphenylsilyl(indenyl)(2-norbornylamido)hafnium dichloride,
diphenylsilyl(indenyl)(2-norbornylamido)hafnium dimethyl.

Additionally, such compounds or precatalysts include the dimeric species that result from dimerizing two of the monocyclopentadienyl heteroatom-containing Group 4 transition metal catalyst compounds described.

The term "cyclopentadienyl" refers to a 5-member ring comprising delocalized bonding within the ring and typically being bound to M through $\eta^5$-bonds, carbon typically making up the majority of the 5-member positions.

Activation

The monocyclopentadienyl catalyst compounds according to embodiments of the invention, may be activated for polymerization catalysis in any manner sufficient to allow coordination polymerization. This can be achieved for example when one X ligand can be abstracted and the other X will either allow insertion of the unsaturated monomers or will be similarly abstractable for replacement with an X that allows insertion of the unsaturated monomer. The traditional activators of metallocene polymerization art are suitable, those typically include Lewis acids such as aluminoxane compounds, and ionizing anion pre-cursor compounds that abstract one X so as ionize the transition metal center into a cation and provide a counter-balancing, compatible, weakly coordinating anion.

Alkyl aluminoxanes and modified alkyl aluminoxanes may be suitable as catalyst activators. Among aluminoxane components useful as catalyst activator typically may be an oligomeric aluminum compound represented by the general formula $(R''-Al-O)_n$, which may be a cyclic compound, or $R''(R''-Al-O)_n AlR''_2$, which may be a linear compound. In the general aluminoxane formula R" comprises independently a $C_1$ to $C_{10}$ alkyl radical, for example, methyl, ethyl, propyl, butyl or pentyl and "n" is an integer from 1 to 50. Or R" may comprise methyl and "n" may be at least 4. Aluminoxanes may be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an aluminoxane. Generally, however prepared, the reaction of an aluminum alkyl with limited amounts of water yields a mixture of linear and cyclic species of the aluminoxane. Methylaluminoxane and modified methylaluminoxane are contemplated. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031, EP 0 561 476 A1, EP 0 279 586 B1, EP 0 516 476 A, EP 0 594 218 A1 and WO 94/10180, each being incorporated by reference for purposes of U.S. patent practice.

When the activator is an aluminoxane, the transition metal compound to activator molar ratio may be from 1:2000 to 10:1, or from 1:500 to 10:1, or from 1:250 to 1:1 or from 1:100 to 1:1.

The term "weakly coordinating anion" as used for the ionizing, anion pre-cursor compounds may be recognized to mean an anion which either does not coordinate to the transition metal cation or which is only weakly coordinated to the cation, thereby remaining sufficiently labile to be displaced by a neutral Lewis base. "Compatible" weakly coordinating anions are those which are generally not degraded to neutrality when the initially formed complex between the monocyclopentadienyl catalyst compounds and the ionizing anion pre-cursor compounds decompose. Further, the anion generally may not transfer an anionic substituent or fragment to the cation so as to cause it to form a neutral four coordinate metallocene compound and a neutral by-product from the anion. Weakly coordinating anions useful in accordance with embodiments of this invention are those which may be compatible, stabilize the metallocene cation in the sense of balancing its ionic charge in a +1 state, yet retain sufficient lability to permit displacement by an olefinically or acetylenically unsaturated monomer during polymerization. Additionally, the anions useful in this invention may be large or bulky in the sense of sufficient molecular size to partially inhibit or help to prevent neutralization of the metallocene cation by Lewis bases other than the polymerizable monomers that may be present in the polymerization process. Typically the anion may have a molecular size of greater than or equal to 4 angstroms.

Descriptions of ionic catalysts, those comprising a transition metal cation and a weakly coordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These generally disclose a method of preparation wherein metallocenes (including monoCp metallocenes) may be protonated by anion precursors such that an alkyl/hydride group may be abstracted from a transition metal to make it both cationic and charge-balanced by the weakly coordinating anion.

The use of ionizing ionic compounds not containing an active proton but capable of producing both the active metallocene cation and a weakly coordinating anion is also known. See, EP-A-0 426 637, EP-A-0 573 403 and U.S. Pat. No. 5,387,568. Reactive cations other than the Bronsted acids include ferrocenium, silver, tropylium, triphenylcarbenium and triethylsilylium, or alkali metal or alkaline earth metal cations such as sodium, magnesium or lithium cations. A further class of weakly coordinating anion precursors suitable in accordance with embodiments of this invention include hydrated salts comprising the alkali metal or alkaline earth metal cations and a weakly coordinating anion as described above. The hydrated salts may be prepared by reaction of the metal cation-weakly coordinating anion salt with water, for example, by hydrolysis of the commercially available or readily synthesized $LiB(pfp)_4$ which yields $[Li.xH_2O] [B(pfp)_4]$, where (pfp) is pentafluorophenyl or perfluorophenyl.

Any metal or metalloid capable of forming a coordination complex which is resistant to degradation by water (or other Bronsted or Lewis Acids) may be used or contained in the anion. Suitable metals include, aluminum, gold, or platinum. Suitable metalloids include, boron, phosphorus, or silicon. The description of weakly coordinating anions and precursors thereto of the documents of the foregoing paragraphs are incorporated by reference for purposes of U.S. patent practice.

Invention catalyst precursors can also be activated with cocatalysts or activators that comprise non-coordinating anions containing metalloid-free cyclopentadienide ions. These are described in U.S. Patent Publication 2002/0058765 A1, published on 16 May 2002.

In another embodiment, an additional method of making the ionic catalysts uses ionizing anion pre-cursors which are initially neutral Lewis acids, but form the cation and anion upon ionizing reaction with the metallocene compounds, for example tris(pentafluorophenyl)boron acts to abstract a hydrocarbyl, hydride or silyl ligand to yield a metallocene cation and stabilizing weakly coordinating anion, [see EP-A-0 427 697 and EP-A-0 520 732]. Ionic catalysts for coordination polymerization may also be prepared by oxidation of the metal centers of transition metal compounds by anionic precursors containing metallic oxidizing groups along with the anion groups, see EP-A-0 495 375. Each of these documents incorporated herein by reference.

When the cation portion of an ionic weakly coordinating precursor is a Bronsted acid such as protons or protonated Lewis bases (excluding water), or a reducible Lewis acid such as ferricinium or silver cations, or alkaline metal or alkaline earth metal cations such as those of sodium, magnesium or lithium cations, the transition metal to activator molar ratio may be any ratio, or from 10:1 to 1:10, or from 5:1 to 1:5, or from 2:1 to 1:2 or from 1.2:1 to 1:1.2, or 1:1.

When the X ligands are not hydride, hydrocarbyl or silyl-hydrocarbyl, such as the chloride ligands in dimethylsilyltetramethylcyclopentadienyl)phenethylamido) titanium dichloride, and are not capable of discrete ionizing abstraction with the ionizing, anion pre-cursor compounds, the X ligands may be converted via known alkylation reactions with organometallic compounds such as lithium or aluminum hydrides or alkyls, alkyl aluminoxanes, or Grignard reagents. See EP-A-0 500 944, EP-A1-0 570 982 and EP-A1-0 612 768 for processes describing the reaction of alkyl aluminum compounds with dihalide substituted metallocene compounds prior to or with the addition of activating weakly coordinating anion precursor compounds. Accordingly, a catalytically active monocyclopentadienyl heteroatom-containing Group 4 transition metal catalyst component may be a transition metal cation stabilized and counter-balanced with a weakly coordinating anion as derived in any of the foregoing methods.

When using ionic catalysts comprising the invention Group 4 metal cations and weakly coordinating anions, the total catalyst system may generally additionally comprise one or more scavenging compounds. The term "scavenging compounds" as used herein and the claims which follow, comprises those compounds effective for removing polar impurities from the reaction environment. Impurities may be inadvertently introduced with any of the polymerization reaction components, particularly with solvent, monomer and catalyst feed, and adversely affect catalyst activity and stability. It may result in decreasing or even elimination of catalytic activity, particularly when a metallocene cation-weakly coordinating anion pair is the catalyst system. The polar impurities, or catalyst poisons include water, oxygen, or metal impurities. Steps may be taken before provision of such into the reaction vessel, for example by chemical treatment or careful separation techniques after or during the synthesis or preparation of the various components, but some minor amounts of scavenging compound may still normally be used in the polymerization process itself.

Typically the scavenging compound may be an organometallic compound such as the Group-13 organometallic compounds. Exemplary compounds include one or more of triethyl aluminum, triethyl borane, triisobutyl aluminum, methyl aluminoxane, isobutyl aluminoxane, or tri-n-octyl aluminum.

The catalyst according to embodiments of the invention may be supported for use in gas phase, bulk, slurry polymerization processes, or otherwise as needed. Numerous methods of support are known in the art for copolymerization processes for olefins, for catalysts activated by aluminoxanes. See, for example, U.S. Pat. Nos. 5,057,475 and 5,227,440. An example of supported ionic catalysts appears in WO 94/03056. A further method is that described in U.S. Pat. No. 5,643,847, and WO 96/04319. A bulk, or slurry, process utilizing supported, bis-cyclopentadienyl Group 4 metallocenes activated with aluminoxane co-catalysts is described as suitable for ethylene-propylene rubber in U.S. Pat. Nos. 5,001,205 and 5,229,478, these processes will additionally be suitable with the catalyst systems of this application. Both inorganic oxide and polymeric supports may be utilized in accordance with the knowledge in the field. See U.S. Pat. Nos. 5,422,325, 5,427,991, 5,498,582, 5,466,649, WO 93/11172 and WO 94/07928. Each of the foregoing documents is incorporated by reference for purposes of U.S. patent practice.

The catalyst systems used to prepare the compositions of embodiments of this invention may be supported using a porous particulate material, such as for example, talc, inorganic oxides, inorganic chlorides and resinous materials such as polyolefin or polymeric compounds.

The support materials may be porous inorganic oxide materials, which include those from the Periodic Table of Elements of Groups 2, 3, 4, 5, 13 or 14 metal oxides. Silica, alumina, silica-alumina, and mixtures thereof are examples. Other inorganic oxides that may be employed either alone or in combination with the silica, alumina or silica-alumina are magnesia, titania, or zirconia.

The support material may be porous silica which has a surface area in the range of from 10 to 700 $m^2/g$, a total pore volume in the range of from 0.1 to 4.0 cc/g and an average particle size in the range of from 10 to 500 μm. Or the surface area is in the range of from 50 to 500 $m^2/g$, the pore volume is in the range of from 0.5 to 3.5 cc/g and the average particle size is in the range of from 20 to 200 μm. Or the surface area is in the range of from 100 to 400 $m^2/g$, the pore volume is in the range of from 0.8 to 3.0 cc/g and the average particle size is in the range of from 30 to 100 μm. The average pore size of typical porous support materials is in the range of from 10 to 1000 Å. A support material may be used that has an average pore diameter of from 50 to 500 Å, or from 75 to 350 Å, the silica dehydrated at a temperature of from 100° C. to 800° C. anywhere from 3 to 24 hours.

Industrial Applicability

Uses may arise in fields using similar molecular weight ethylene-α-olefin copolymers of at least some ethylene crystallinity, such as linear low density and low density polyethylene copolymers of ethylene with 1-butene, 1-hexene or 1-octene. Films and packaging materials may be prepared from copolymers of embodiments of our invention by methods well-known in the art. Additionally, adhesive compositions may be prepared using embodiments of the invention copolymers as replacements for higher α-olefin content copolymers prepared with metallocene catalysts, including those described as plastomers because of their elastomeric properties. Additionally or alternatively, such copolymers may be used as base polymers that with the addition of tackifier resins, waxes or plasticizers constitute adhesive compositions useful in pressure-sensitive adhesive compositions, or hot melt adhesive compositions. See, for example, U.S. Pat. Nos. 5,530,054 or 5,548,014 and their International counterparts WO 92/12212 and WO 94/10256, each is incorporated by reference for purposes of U.S. patent practice. The copolymers of the invention may also be useful in low molecular weight embodiments as oleaginous composition modifiers, for example, fuel or lubricating oil additives

EXAMPLES

General Procedure for Copolymerizations

Ethylene (99.9%) was used as received (Matheson). Cis-2-butene (cis-2B), trans-2-butene (trans-2B) and 1-butene (1B) were purchased from Aldrich Chemical Company and were dried by passing through a column of barium oxide.

The preparation of Catalyst A, $Me_2Si(Me_4C_5)(N$-c-$C_{12}H_{23})TiCl_2$ [dimethylsilyl(tetramethylcyclopentadienyl)(cyclododecylamido)titanium-dichloride], is found in U.S. Pat. No. 5,264,405; the preparation of Catalyst B, $Me_2Si(Me_4C_5)(N$-1-adamantyl)$TiCl_2$ [dimethylsilyl(tetramethylcyclopentadienyl)(adamantylamido)titanium dichloride], is found in U.S. Pat. No. 5,955,625, both incorporated herein by reference. Methyl aluminoxane (30 wt. % solution in toluene) was purchased from Albemarle Chemical. Toluene was dried by passing through purification columns of copper catalyst to remove oxygen and alumina to remove moisture. The product was characterized by $^1H$, $^{13}C$, APT (Attached Proton Test) and DEPT (Distortionless Enhancement by Polarization Transfer) NMRs with 5 mm switchable broadband probes on Varian INOVA 300 spectrometer. The amount of 2-butene in the copolymers were determined from the proton NMR by comparing the integration of the methyl peak with that of the rest of the aliphatic peaks. Molecular weights were determined by Waters Associates Gel Permeation Chromatograph, using three Shodex GPC AT-80 M/S columns in series differential refiactive index detector and polyethylene as standards. $M_w$ is the weight average molecular weight of the polymer; $M_n$ the number average molecular weight of the polymer; $MWD=M_w/M_n$, which is also sometimes referred to as the polydispersity of the polymer. Thermal analysis was done a TA Instruments DSC by first heating the sample from −100° C. to 150° C. at 10° C./min, then cooling at 10° C./min from 150° C. to −100° C. and finally again heating to 150° C. at 10° C./min. The second heat results have been reported.

Unless other wise noted, toluene (in cases where solvent was used) with the reported amount of methylaluminoxane solution was placed in a 300 mL Parr Reactor under argon. 2-butene was first collected in a pre-weighed vessel. It was then transferred into the reactor by cooling the reactor to −25° C. to −30° C. The amount of 2-butene added to the reactor was determined by taking the weight of the vessel before and after the transfer. The reactor was warmed to room temperature by warm water. The catalyst was added as a solution in toluene by a back pressure of ethylene. The reaction was run with a constant pressure of ethylene for the predetermined length of time. Pressures reported are differential pressures (psid), meaning that the pressure reported is the difference in pressure from before ethylene was charged, to the pressure after the ethylene had been charged. At the end of the time period, the reactor was vented and the reaction was quenched with methanol. The polymer was isolated by adding to an acidic solution of methanol, followed by filtration. In cases where the polymer did not precipitate out as a solid that could be filtered (sticky mass), it was isolated by first stirring the solution in methanol for several hours and then allowing the polymer to settle down. The liquids were then decanted off and the polymer was washed with more aliquots of methanol. It was finally dried under vacuum at 40° C.

New polymer products where characterized by proton and $^{13}C$ NMR. Assignments for the new polymers are as follows:

For copolymers of ethylene with cis-2-butene: $^1H$-NMR{orthodichlorobenzene (ODCB)-$d_4$, ppm}: 1.12 (br), 1.36, 1.55, 1.63 (broad), 5.49 (br, olefinic end group). $^{13}C$-NMR {ODCB-$d_4$, ppm}: 16.9 ppm ($CH_3$ by DEPT), 23.1, 28.4, 32.5, 30.3, 30.6, 32.5 and 34.7 ppm ($CH_2$ by DEPT), 38.3 (CH by DEPT).

For copolymers of ethylene with trans-2-butene: $^1H$-NMR {ODCB-$d_4$, ppm}: 0.76 (d, J=6.3 Hz), 1.27 (s), 4.88 (m, olefinic end groups), 5.21 (broad m, olefinic end groups), 5.4 (broad, olefinic end groups), 5.72 (broad m). $^{13}C$-NMR {ODCB-$d_4$, ppm}: 15.0, 28.1, 30.0, 30.3, 35.3, 37.4.

Polymerization conditions and results are described in Tables 1–6 (Examples 1–22) and in Example 23.

TABLE 1

Copolymerizations of Ethylene with Cis- and Trans-2-Butenes

| Run | 2-Butene g | $\Delta P_E$, psid | Reactor Temp °C. | Polymer (g) | Activity, g polymer/mol metal·hr | Mol % 2-Butene incorporated | $M_w$:MWD | DSC ° C. |
|---|---|---|---|---|---|---|---|---|
| 1[a] | Cis, 20.4 | 16 | 28 | 3.7 | $2.9 \times 10^5$ | 28 | 22,000; 2.6 | −48 ($T_g$) |
| 2[b] | Cis, 29.2 | 22 | 25 | 0.5 | $0.4 \times 10^5$ | 33 | 16,000; 2.0 | −53 ($T_g$) |
| 3 | Cis, 47.5 | 35 | 26 | 1.2 | $0.9 \times 10^5$ | 30 | 21,700; 2.0 | −45 ($T_g$), 124 ($T_m$) |
| 4[c] | Cis, 47.6 | 50 | 25 | 10.1 | $4.0 \times 10^5$ | 31 | 19,000; 2.0 | −54 ($T_g$) |
| 5 | Cis, 47.9 | 75 | 32 | 8.9 | $7.1 \times 10^5$ | 19 | 69,300; 2.3 | −48 ($T_g$) 29, 121, 125 ($T_m$) |
| 6 | Cis, 50.1 | 100 | 28 | 8.6 | $6.9 \times 10^5$ | 15 | 74,700; 1.9 | −44 ($T_g$) |
| 7[d,e] | Cis, 23.0 | 50 | 25 | 1.6 | $1.2 \times 10^5$ | 27 | 33,400; 2.4 | 46, 124 ($T_m$) −49 ($T_g$), 127 ($T_m$) |
| 8[d] | Cis, 23.8 | 50 | 0 | 0.5 | $0.4 \times 10^5$ | 21 | 46,600; 1.7 | −50 ($T_g$), 126 ($T_m$) |
| 9[d] | Cis, 23.8 | 500 | 25 | 10 | $7.7 \times 10^5$ | 9 | 104,700; 8.5 | 119 ($T_m$) |
| 10[c] | Trans, 49.4 | 50 | 26 | 1.2 | $0.4 \times 10^5$ | 8 | 19,000; 1.9 | 86 ($T_m$) |

Standard reaction conditions unless otherwise indicated: 300 mL Parr reactor, 12.6 μmol catalyst A in 3 mL toluene; activator, 30 wt % MAO; M:Al (molar) = 1:620; reaction time, 1 hour; reaction temperature, 35° C.
[a]Toluene (75 mL) added as a reactor diluent.
[b]Toluene (50 mL) added as a reactor diluent.
[c]Time, 2 hours.
[d]100 mL Parr reactor was used.
[e]Time, 0.5 hours Catalyst activities and polymer characterization for copolymerizations with internal olefin isomers are compared with those for 1-butene in Table 2.

TABLE 2

Comparison of 2-Butene Isomers with 1-Butene

| Run | Butene | Activity, g polymer g/mol metal·hr (× 10⁶) | Copolymer Mol % butene incorporated | Mw (10³); MWD | $T_g$, $T_m$ (° C.) |
|---|---|---|---|---|---|
| 4[a] | cis-2B | 0.40 | 31 | 19; 2.0 | −54 ($T_g$) |
| 10[a] | trans-2B | 0.04 | 8 | 19; 1.9 | 86 ($T_m$) |
| 11[b] | 1B | 3.4 | 81 | 138; 2.8 | −32 ($T_g$) |

[a]Run conditions for examples 4 and 10 are found in Table 1.
[b]Run conditions for run 11:300 mL Parr reactor, 12.6 μmol catalyst A in 3 mL of toluene; activator, 30 wt % MAO; M:Al (molar) = 1:620; reaction time, 1 hour; 1B, 50.2 gm; ethylene pressure, 50 psid; reaction temperature, 35° C.

The compositions of the copolymers from Example 3, 5 and 6 were determined by comparing the proton NMR methyl/methine integrals (butene-based) against the total integral (butene- and ethylene-based). The results are tabulated in Table 3. For comparison, a copolymer of 1-butene and ethylene described in run 11 of Table 2 has only 1,2-disubstituted olefins as chain ends detectable by proton NMR.

TABLE 3

End-Group Analysis of Ethylene and Cis-2-Butene Copolymers

| | Copolymer | | Chain Ends/1000C | | | |
|---|---|---|---|---|---|---|
| Run | mol % cis-2-butene | $M_w$; MWD | Vinyl | 1,2-disubstituted | Trisubstituted | Vinylidene |
| 6 | 15 | 74,700; 1.9 | 4 | 2 | 92 | 3 |
| 5 | 18 | 69,300; 2.3 | 7 | 3 | 84 | 6 |
| 3 | 31 | 21,700; 2.0 | 5 | 3 | 87 | 6 |

Terpolymers of ethylene with cis- and trans-2-butenes were also synthesized. Examples are put forth in Table 4.

TABLE 4

Terpolymerizations of Ethylene with Cis- and Trans-2-Butene

| Run | Feed (mol ratio) cis-2B:trans-2B | Activity g polymer/ mol metal·h (× 10⁶) | Copolymer mol % butene incorporated | Copolymer cis-2B:trans-2B (mole ratio) | Mw (10³); MWD | $T_g$, $T_m$ (° C.) |
|---|---|---|---|---|---|---|
| 12 | 87:13 | 0.13 | 26 | 100:0 | 29; 1.9 | −50 ($T_g$) 115, 124 ($T_m$) |
| 13 | 52:48 | 0.06 | 19 | 93:7 | 23; 1.8 | −51 ($T_g$) 23, 124 ($T_m$) |
| 14 | 10:90 | 0.01 | 12 | 54:46 | 7.9; 1.9 | —[a] |

Standard reaction conditions: 300 mL Parr reactor, 12.6 μmol catalyst A in 5.6 mL toluene; activator, 30 wt % MAO; M:Al (molar) = 1:620; total 2-butenes, 50 g; ethylene pressure, 50 psid; reaction time, 1 hour; reaction temperature, 35° C.
[a]No $T_m$ was observed, only very broad $T_g$'s.

Comparative polymerization runs were conducted with catalyst B and are tabulated in Table 5. Catalyst B showed no evidence of incorporating either trans-2-butene or cis-2-butene in the presence of ethylene.

TABLE 5

Polymerization of Ethylene in the presence of Cis- or Trans-2-Butene

| Run | 2-Butene (g) | $\Delta P_E$ psid | Polymer (g) | Activity, g polymer/mol metal·hr | Mol % 2-Butene incorporated | $T_m$ (° C.) |
|---|---|---|---|---|---|---|
| 16 | Trans-2B, 23.2 g | 100 | 0.24 | $0.1 \times 10^5$ | n.d.[a] | 133.5 |
| 17 | Cis-2B, 24.2 g | 100 | 0.59 | $0.3 \times 10^5$ | n.d.[a] | 134.7 |

Standard reaction conditions: 100 mL Parr reactor; 22 μmol catalyst B in 10 mL toluene; activator, 30 wt % MAO; M:Al (molar) = 1:500; time: 1 hour; reaction temperature, 25° C.
[a]none detectable.

The catalysts of this invention are capable of copolymerizing 2-butenes with either propylene (P) or 1-butene (1B). Examples are set forth in Table 6.

TABLE 6

Copolymerizations of 2-Butenes with Propylene and 1-Butene.

| Run | 2-Butene (g) | Comonomer (g) | Polymer (g) | Activity, g polymer/mol metal·hr | Mol % 2-Butene incorporated | $M_w$; MWD | $T_g$ (° C.) |
|---|---|---|---|---|---|---|---|
| 18 | Cis-2B, 26 | P, 24 | 4.9 | 3.8×10⁵ | 9 | 61,300; 2.0 | −5.5 ($T_g$) |
| 19 | Trans-2B, 23 | P, 22 | 14.5 | 11.2×10⁵ | 10 | 159,600; 2.1 | −5.0 ($T_g$) |
| 20 | None | P, 24 | 17.0 | 13.1×10⁵ | 6.3 | 278,00; 3.4 | −5.7 ($T_g$) |
| 21 | Cis-2B, 27 | 1B, 24 | 0.1 | 0.1×10⁵ | 3.5 | 2000;2.0 | −34.8 ($T_g$) |
| 22 | Trans-2B, 26 | 1B, 25 | 0.6 | 0.5×10⁵ | 1.3 | 6200;2.7 | −28.8 ($T_g$) |

Standard reaction conditions: 100 mL Parr reactor; 13 µmol of catalyst A in 10 mL toluene; activator, 30 wt % MAO; M:Al (molar) = 1:500; reaction time: 1 hour; reactor temperature, 25° C.;

Example 23

This polymerization was run in a 1-liter autoclave reactor equipped with a paddle stirrer, an external water jacket for temperature control, a regulated supply of dry nitrogen and ethylene, and a septum inlet for the introduction of other solvents, monomers, transition metal compound and activator solutions. The reactor was dried and degassed thoroughly before use. The run consisted of injecting 350 ml of toluene, 5 ml 10 wt. % methylalumoxane (Ethyl Corp.), 47.2 g of liquid cis-2-butene, and 1.39 mg of $Me_2Si(Me_4C_5)(N\text{-}c\text{-}C_{12}H_{23})TiCl_2$ (Catalyst A, 1 ml of a 13.9 mg in 10 ml toluene solution) into the reactor. The reactor was then rapidly heated to 80° C., and ethylene was introduced (65 psid) into the reactor, and was semi-continuously fed to retain constant reactor pressure. The polymerization run was limited to 40 minutes. The reaction was stopped by rapidly cooling and venting the system. The solvent was evaporated off by a stream on air. An ethylene-2-butene copolymer was recovered (57.6 g, Mw=66,900 Daltons, Mwd=2.30, 2.0 methyl branches/1000 C by FTIR, 0.2 mol % 2-butene).

We claim:

1. A process for the preparation of substantially random ethylene copolymers derived from ethylene and at least one vicinally disubstituted olefin monomer, comprising contacting said at least one vicinally disubstituted olefin monomer, ethylene, and optionally one or more additional coordination polymerizable monomers, in the substantial absence of geminally disubstituted olefins, with a catalyst system comprising a monocyclopentadienyl heteroatom- containing Group 4 transition metal precatalyst, wherein said at least one vicinally disubstituted olefin monomer does not include cyclic olefins wherein the olefinic group is entirely within the cyclic structure.

2. The process of claim 1, wherein said additional coordination polymerizable monomers, if present, comprise at least one of $C_3$–$C_{30}$ α-olefins, $C_6$–$C_{30}$ vinylaromatic olefins, $C_6$–$C_{30}$ substituted α-olefins, $C_4$–$C_{30}$ diolefins, $C_5$–$C_{30}$ cyclic olefins or cyclic diolefins, or $C_3$–$C_{30}$ acetylenically unsaturated monomers.

3. The process of claim 2, wherein said at least one vicinally disubstituted olefin monomer is described by the general formula:

(R¹)CH=CH(R²)

where R¹ and R² independently comprise hydrocarbyl or silyl-hydrocarbyl groups containing one or more carbon or silicon atoms.

4. The process of claim 3, wherein said R¹ and R² comprise linear, branched or cyclic substituted or unsubstituted hydrocarbyl groups comprising from 1–100 carbon.

5. The process of claim 3, wherein said R¹ and R² comprise 30 or less carbon or silicon atoms or combinations thereof, with the proviso that, R¹ and R² comprise hydrocarbyl or silyl hydrocarbyl moieties.

6. The process of claim 3, wherein said R¹ and R² additionally comprise non-carbon or non-silicon atoms, selected from one or more of B, O, S, Se, Te, N, P, Ge, Sn, Pb, As, F, Cl, Br, or I.

7. The process of claim 1, wherein said at least one vicinally disubstituted olefin monomer comprises one or more of cis and/or trans (and/or E and/or Z) isomers of 2-butene, 2-pentene, 2-hexene, 3-hexene, 2-heptene, 3-heptene, 2-octene, 3-octene, 4-octene, 2-nonene, 3-nonene, 4-nonene, 2-decene, 3-decene, 4-decene, 5-decene, 2-undecene, 3-undecene, 4-undecene, 5-undecene, 2-dodecene, 3-dodecene, 4-dodecene, 5-dodecene, 6-dodecene, 4-methyl-2-pentene, 4-methyl-2-hexene, 5-methyl-2-hexene, 5-methyl-3-hexene, or 5 phenyl-2-hexene.

8. The process of claim 1, wherein said at least one vicinally disubstituted olefin monomer comprises one or more of cis and/or trans 2-butene.

9. The process of claim 1, wherein said monocyclopentadienyl heteroatom-containing Group 4 transition metal precatalyst comprises a cation counter-balanced with a weak coordinating anion.

10. The process of claim 1, wherein said monocyclopentadienyl heteroatom containing Group 4 transition metal precatalyst is activated with alkyl aluminoxane or modified alkyl aluminoxane.

11. The process of claim 1, wherein said monocyclopentadienyl heteroatom-containing Group 4 transition metal precatalyst comprises a substituted Group 15 heteroatom covalently bound both to the Group 4 transition metal center and, through a bridging group, to a ring carbon of the cyclopentadienyl group containing ligand.

12. The process of claim 1, wherein said monocyclopentadienyl heteroatom containing Group 4 transition metal precatalyst comprises one or more of dimethylsilyl(tetramethylcyclopentadienyl) (cyclododecylamido)titanium dichloride, dimethylsilyl(tetramethylcyclopentadienyl) (cyclododecylamido)titanium dimethyl, dimethylsilyl(tetramethylcyclopentadienyl) (cyclohexylamido)titanium dichloride, dimethylsilyl(tetramethylcyclopentadienyl)
(cyclohexylamido)titanium dimethyl,
dimethylsilyl(tetramethylcyclopentadienyl)(n-
butylamido)titanium dichloride,
dimethylsilyl(tetramethylcyclopentadienyl)(n-
butylamido)titanium dimethyl,
dimethylsilyl(tetramethylcyclopentadienyl)(sec-
butylamido)titanium dichloride,
dimethylsilyl(tetramethylcyclopentadienyl)(sec-
butylamido)titanium dimethyl,
dimethylsilyl(tetramethylcyclopentadienyl)
(phenylamido)titanium dichloride, or
dimethylsilyl(tetramethylcyclopentadienyl)
(phenylamido)titanium dimethyl.

13. A polymer produced by the process of claim 1.

14. A process for polymerizing olefins, comprising:

contacting at least one vicinally disubstituted olefin monomer represented by the general formula:

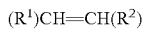

$(R^1)CH=CH(R^2)$ where $R^1$ and $R^2$ independently comprise 30 or less carbon or silicon atoms, with the proviso that, $R^1$ and $R^2$ independently comprise hydrocarbyl or silyl-hydrocarbyl moieties, wherein said at least one vicinally disubstituted olefin monomer does not include cyclic olefins wherein the olefinic group is entirely within cyclic structure;

and ethylene, in the presence of a precatalyst represented by the general formula:

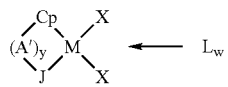

wherein:

M comprises Zr, Hf or Ti;

Cp comprises a cyclopentadienyl ring which, said Cp substituted with from zero to five substituted groups R, when y is zero, and from one to four substituted groups R, when y is one; and each substituted groups R comprises, independently, a radical selected from one of hydrocarbyl, silyl-hydrocarbyl or germyl-hydrocarbyl having from 1 to 30 carbon, silicon or germanium atoms, substituted hydrocarbyl, silyl-hydrocarbyl or germyl-hydrocarbyl radicals wherein one or more hydrogen atoms is replaced by one or more of halogen radical, an amido radical, a phosphido radical, an alkoxy radical, an aryloxy radical or a radical containing a Lewis acidic or basic functionality; $C_1$ to $C_{30}$ hydrocarbyl-substituted metalloid radicals, wherein the metalloid is selected from the one of Group 14 of the Periodic Table of Elements; halogen radicals; amido radicals; phosphido radicals; alkoxy radicals; or alkylborido radicals; or, Cp comprises a cyclopentadienyl ring in which at least two adjacent R-groups are joined together and along with the carbon atoms to which they are attached form a $C_4$ to $C_{20}$ ring system which is one of saturated, partially unsaturated or aromatic, and/or substituted or unsubstituted, the substitutions being selected as one or more R group as defined above;

J comprises a Group 15 or 16 heteroatom substituted with one R' group when J is a group 15 element and y is one, or a group 16 element and y is zero, or with two R' groups when J is a group 15 element and y is zero, or is unsubstituted when J is Group 16 element and y is one; and each substituent group R' comprises, independently, a radical selected from: hydrocarbyl, silyl-hydrocarbyl or germyl-hydrocarbyl radicals having 1 to 30 carbon, silicon or germanium atoms; substituted hydrocarbyl, silyl-hydrocarbyl or germyl-hydrocarbyl radicals, wherein one or more hydrogen atoms is replaced by one or more of halogen radicals, amido radicals, phosphido radicals, alkoxy radicals, aryloxy radicals; or alkylborido radicals with the proviso that all R's are bonded to J through a 1°, 2°, or aromatic carbon atom, and wherein said R's are not directly bonded to a silicon or germanium atom;

each X comprises independently a monoanionic ligand selected from one of hydride; substituted or unsubstituted $C_1$ to $C_{30}$ hydrocarbyl; alkoxide; aryloxide; amide; halide or phosphide; Group 14 organometalloids; or both X's together form an alkylidene, a cyclometallated hydrocarbyl or other dianionic ligand;

y is 0 or 1; and when y=1, A' is a bridging group covalently bonded to both Cp and J, comprising at least one Group 13, 14 or 15 element selected from carbon, silicon, boron, germanium, nitrogen or phosphorous with additional substituents R as defined above so as to complete the valency of the Group 13, 14 or 15 element(s);

L is a neutral Lewis base other than water, selected from olefin, diolefin, aryne, amine, phosphine, ether, sulfide, diethylether, tetrahydrofuran, dimethylaniline, aniline, trimethylphosphine, or n-butylamine; and, w is a number from 0 to 3; and wherein said precatalyst is activated with an activator.

15. The process of claim 14, wherein said activator is selected from one of methylaluminoxane or modified methylaluminoxane.

16. The process of claim 14, wherein said vicinally disubstituted olefin comprises one or more of cis and/or trans (and or E and/or Z) isomers of 2-butene, 2-pentene, 2-hexene, 3-hexene, 2-heptene, 3-heptene, 2-octene, 3-octene, 4-octene, 2-nonene, 3-nonene, 4-nonene, 2-decene, 3-decene, 4-decene, 5-decene, 2-undecene, 3-undecene, 4-undecene, 5-undecene, 2-dodecene, 3-dodecene, 4-dodecene, 5-dodecene, 6-dodecene, 4-methyl-2-pentene, 4-methyl-2-hexene, 5-methyl-2-hexene, 5-methyl-3-hexene, or 5 phenyl-2-hexene, and wherein said R' comprises an aliphatic, alicyclic or aromatic hydrocarbyl or substituted hydrocarbyl radical that is bonded to J through a 1°, 2°, or aromatic carbon atom.

17. The process of claim 16, wherein said precatalyst comprises one or more of dimethylsilyl(tetramethylcyclopentadienyl)
(cyclododecylamido)titanium dichloride,
dimethylsilyl(tetramethylcyclopentadienyl)
(cyclododecylamido)titanium dimethyl,
dimethylsilyl(tetramethylcyclopentadienyl)
(cyclohexylamido)titanium dichloride,
dimethylsilyl(tetramethylcyclopentadienyl)
(cyclohexylamido)titanium dimethyl,
dimethylsilyl(tetramethylcyclopentadienyl)(n-
butylamido)titanium dichloride,
dimethylsilyl(tetramethylcyclopentadienyl)(n-
butylamido)titanium dimethyl,
dimethylsilyl(tetramethylcyclopentadienyl)(sec-
butylamido)titanium dichloride, dimethylsilyl(tetramethylcyclopentadienyl)(sec-butylamido)titanium dimethyl, dimethylsilyl(tetramethylcyclopentadienyl)(phenylamido)titanium dichloride, or dimethylsilyl(tetramethylcyclopentadienyl)(phenylamido)titanium dimethyl.

18. The process of claim 17, wherein said vicinally disubstituted olefin comprises one or more of cis and/or trans (and or E and/or Z) isomers of 2-butene, wherein said precatalyst comprises dimethylsilyl(tetramethylcyclopentadienyl)(cyclododecylamido)titanium dichloride.

19. A polymer produced by the process of claim 14.

20. A process for the preparation of substantially random α-olefin copolymers derived from an α-olefin and at least one vicinally disubstituted olefin monomer, comprising contacting said at least one vicinally disubstituted olefin monomer, said α-olefin, and optionally one or more additional coordination polymerizable monomers, with a catalyst system comprising a monocyclopentadienyl heteroatom-containing Group 4 transition metal precatalyst, and wherein said α-olefin is one or more of propylene, 1-butene, 4-methyl-1-pentene, 1-hexene, or 1-octene.

21. The process of claim 20, wherein said additional coordination polymerizable monomers, if present, comprise at least one of $C_3$–$C_{30}$ α-olefins, $C_6$–$C_{30}$ vinylaromatic olefins, $C_6$–$C_{30}$ substituted α-olefins, $C_4$–$C_{30}$ diolefins, $C_5$–$C_{30}$ cyclic olefins or cyclic diolefins, or $C_3$–$C_{30}$ acetylenically unsaturated monomers.

22. The process of claim 20, wherein said vicinally disubstituted olefin comprises one or more of cis and/or trans (and or E and/or Z) isomers of 2-butene, 2-pentene, 2-hexene, 3-hexene, 2-heptene, 3-heptene, 2-octene, 3-octene, 4-octene, 2-nonene, 3-nonene, 4-nonene, 2-decene, 3-decene, 4-decene, 5-decene, 2-undecene, 3-undecene, 4-undecene, 5-undecene, 2-dodecene, 3-dodecene, 4-dodecene, 5-dodecene, 6-dodecene, 4-methyl-2-pentene, 4-methyl-2-hexene, 5-methyl-2-hexene, 5-methyl-3-hexene, or 5 phenyl-2-hexene.

* * * * *